(12) United States Patent
Katrib

(10) Patent No.: US 12,184,918 B2
(45) Date of Patent: *Dec. 31, 2024

(54) GATEWAY DEVICE

(71) Applicant: GeoPost, Inc., Los Angeles, CA (US)

(72) Inventor: Ramy Katrib, Studio City, CA (US)

(73) Assignee: GeoPost, Inc., Los Angeles, CA (US)

( * ) Notice: Subject to any disclaimer, the term of this patent is extended or adjusted under 35 U.S.C. 154(b) by 239 days.

This patent is subject to a terminal disclaimer.

(21) Appl. No.: 17/685,992

(22) Filed: Mar. 3, 2022

(65) Prior Publication Data

US 2022/0191572 A1   Jun. 16, 2022

Related U.S. Application Data

(63) Continuation-in-part of application No. 17/010,821, filed on Sep. 2, 2020, now Pat. No. 11,425,789.

(60) Provisional application No. 62/895,396, filed on Sep. 3, 2019.

(51) Int. Cl.
*H04N 21/262* (2011.01)
*H04L 65/70* (2022.01)
*H04W 76/10* (2018.01)

(52) U.S. Cl.
CPC ....... *H04N 21/26216* (2013.01); *H04L 65/70* (2022.05); *H04W 76/10* (2018.02)

(58) Field of Classification Search
CPC .. H04W 76/10; H04L 65/607; H04L 65/4069; H04L 67/02; H04N 19/70; H04N 19/50; H04N 19/39; H04N 7/30
See application file for complete search history.

(56) References Cited

U.S. PATENT DOCUMENTS

| | | |
|---|---|---|
| 5,654,959 A | 8/1997 | Baker et al. |
| 6,885,859 B2 | 4/2005 | Karaoguz et al. |
| D664,143 S | 7/2012 | Chaturvedi et al. |

(Continued)

OTHER PUBLICATIONS

Portions of prosecution history of U.S. Appl. No. 17/010,821, filed Jun. 29, 2022, Katrib, Ramy.

(Continued)

*Primary Examiner* — Iqbal Zaidi
(74) *Attorney, Agent, or Firm* — Makoui Law, PC; Ali Makoui

(57) ABSTRACT

A gateway device is provided. The gateway device comprises a plurality of RF transceivers. Each RF transceiver is for providing a network connection between the gateway device and a corresponding wireless communication network in a plurality of wireless communication networks. The gateway device comprises a processor for receiving raw video recorded by a video camera connected to the gateway device, receiving an identification of a set of one or more destination devices to receive a livestream video from the gateway device, determining a quality of the network connections between the gateway device and the plurality of wireless communication networks, selecting a wireless communication network with a highest quality network connection for communicating with the set of destination devices, encoding the raw video into a compressed video stream, and livestreaming the compressed video stream to the set of destinations devices through the RF transceiver corresponding to the selected wireless communication network.

21 Claims, 41 Drawing Sheets

(56) References Cited

U.S. PATENT DOCUMENTS

| | | |
|---|---|---|
| 8,576,814 B2 | 11/2013 | Aono |
| 8,699,389 B2 | 4/2014 | Ogura |
| 8,908,705 B2 | 12/2014 | Zhang |
| 9,025,532 B2 | 5/2015 | Schlipf |
| 9,025,549 B2 | 5/2015 | Morinaga et al. |
| 9,253,762 B2 | 2/2016 | Asai et al. |
| 9,479,997 B2 | 10/2016 | Scahill |
| 9,516,354 B1 | 12/2016 | Verheem et al. |
| 9,686,362 B2 | 6/2017 | Choi et al. |
| 9,686,370 B2 | 6/2017 | Walker et al. |
| 9,730,070 B2 | 8/2017 | Volpiano |
| 10,009,838 B2 | 6/2018 | Park et al. |
| 10,289,504 B2 | 5/2019 | Fang |
| 2018/0128749 A1* | 5/2018 | Goodman ................ F24F 11/38 |
| 2019/0058853 A1* | 2/2019 | Brudnak .............. G05D 1/0044 |
| 2020/0109954 A1* | 4/2020 | Li ...................... G01C 21/3852 |
| 2021/0068203 A1 | 3/2021 | Katrib |

OTHER PUBLICATIONS

Author unknown "5G Home Router 1A User Guide," Verizon, 2019 (month unknown but before Sep. 2019), pp. 3-4.

* cited by examiner

GATEWAY DEVICE

CLAIM OF BENEFIT TO PRIOR APPLICATIONS

This application is a continuation-in-part of U.S. patent application Ser. No. 17/010,821, published as U.S. Patent Publication 2021/0068203. U.S. patent application Ser. No. 17/010,821 claims the benefit of U.S. Provisional Patent Application Ser. No. 62/895,396, filed on Sep. 3, 2019. The contents of U.S. patent application Ser. No. 17/010,821, published as U.S. Patent Publication 2021/0068203, and U.S. Provisional Patent Application 62/895,396 are hereby incorporated by reference.

BACKGROUND

Every day, a massive amount of movie and virtual reality (VR) content is produced and emerging markets such as augmented reality (AR) and VR are pushing the boundary of how the users experience the media. The transfer of the media from the production stage to the postproduction facilities has become a major challenge.

The footage shot during production are often transported from the production set to the postproduction facilities by physical means such as vehicles and airplanes. Digital transfer of files from the production set to the postproduction facilities requires locating a gateway (or modem-router) with the Internet connection close to a film production set. The traditional gateways are, however, not made with the file transfer and real time collaboration needs of movie, AR, and VR production in mind.

BRIEF DESCRIPTION OF THE DRAWINGS

The various embodiments of the present gateway device now will be discussed in detail with an emphasis on highlighting the advantageous features. These embodiments depict the novel and non-obvious gateway device shown in the accompanying drawings, which are for illustrative purposes only. These drawings include the following figures, in which like numerals indicate like parts:

FIG. 23 is a schematic front view of an electronic device that displays a portion of an example user interface showing of a portion of a project's event history, according to various aspects of the present embodiments;

FIG. 24 is a schematic front view of an electronic device that displays a portion of the user interface of FIG. 23 after a person searches the event ledger using one or more search criteria, according to various aspects of the present embodiments;

FIG. 26 is a schematic front view of an electronic device that displays a portion of the user interface showing comments exchanged during the course of a project, according to various aspects of the present embodiments;

DETAILED DESCRIPTION

Figure 1A:
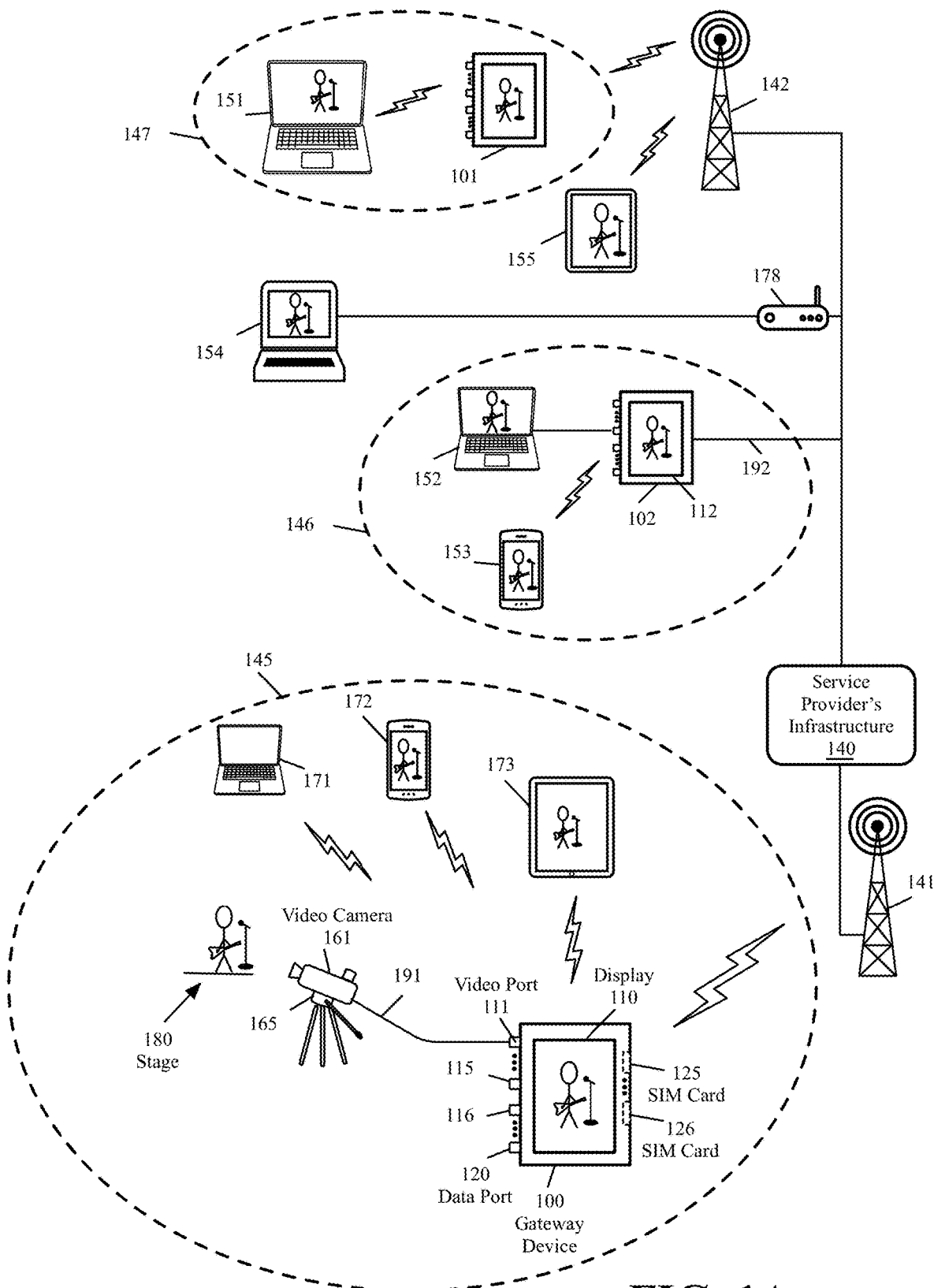
FIG. 1A is a functional block diagram illustrating an example system where a gateway device creates a local network and connects the local network to one or more other networks, according to various aspects of the present disclosure.

One aspect of the present embodiments includes the realization that the prior gateway (or modem-router) devices do not meet the needs of modern movie and VR production and postproduction environments. In a physical or virtual movie production stage, large amount of raw video files are recorded. The recorded video data has to be transferred to postproduction facilities that are often far from the production set. The prior art gateways that provide Internet connectivity simply receive packetized data and transfer the packets to their destination and lack the functionalities to meet the needs of the movie industry.

The present embodiments, as described in detail below, solve the above-mentioned problems by providing a gateway device with novel functionalities to address the movie industry's production and postproduction needs. The gateway device may provide video ports for directly connecting video cameras to the gateway device. The gateway device may natively compress, encrypt, and livestream video content being recorded by video cameras. The gateway device may accommodate the physical movie production environments as well as virtual production environments such as virtual stages and virtual cameras.

The gateway device may provide data ports for transferring large pre-recorded raw video files to destinations ranging from private computers to cloud storage facilities. The gateway device may provide a high-quality color display for displaying livestreamed video content as well as displaying a user interface for configuring the gateway device and displaying different status and metrics data. The gateway device may provide color calibration tools for calibrating the display of the gateway device. The gateway device may provide color coordination tools to ensure the gateway device and one or more corroborating electronic devices display the same colors for the same pixels of the displayed frames.

The gateway device may provide time-stamped immutable records of video content creation, video content edits, livestreaming, video file transfers, color calibrations, color coordination between devices, gateway configuration, etc. The records may, for example, be stored as blockchain ledgers. The gateway device, in some embodiments, may use the existing decentralized cryptocurrency/bitcoin infrastructure for storing the blockchain ledgers.

The video and data ports of the gateway device, in some embodiments, are replaceable and/or exchangeable. For example, a video port may be removed and replaced by a data port or by another video port of the same or different type. A data port may be removed and replaced by a video port or by another data port of the same or different type. The video and data ports, in some embodiments, may be connected to a backplane that recognizes different types of video and data ports that are inserted into empty port slots and harmonizes the differences between different types of video and data ports. The backplane may receive data from different ports with different standards and may convert them into data packets, for example, Internet protocol (IP) packets.

The gateway device may include one or more radio-frequency (RF) transceivers (also referred to as RF modules). Each RF transceiver may include an RF transmitter and an RF receiver. It should be noted that, although the term transceiver is used herein in several examples, the gateway device may include separate RF transmitter and RF receiver units in some embodiments. Each RF transceiver may transmit and receive through one or more antennas.

The RF transceivers may connect the gateway device to wireless networks, such as, for example, and without limitations, cellular networks, satellite communication networkers, terrestrial microwave networks, wireless local area networks (WLANs), etc. The RF transceivers may include one or more short range wireless RF transceivers, such as, for example, and without limitations, Wi-Fi transceivers, Bluetooth transceivers, etc. The gateway device may provide connectivity through cellular towers, satellite links, wired Internet service provider (ISP) lines, cable Internet, third party hotspots, Wi-Fi, Bluetooth, and/or mobile devices or mesh networks that may have cellular connectivity.

The RF transceivers, in some embodiments, are replaceable and/or exchangeable. For example, and without limitations, each RF transceiver may be a printed circuit board assembly (PCBA) in some embodiments. An RF transceiver, in some embodiment, may be removed and replaced by another RF transceiver. In some embodiments, a video port, a data port, or an RF transceiver may be inserted into any empty port slot in the gateway device. The backplane, in these embodiments, recognizes different types of video ports, data ports, and RF transceivers that are inserted into empty port slots and harmonizes the differences between different types of video and data ports. The backplane may receive data from different ports and different RF transceivers with different standards and may convert them into data packets, for example, Internet protocol (IP) packets.

In some embodiments, the gateway device may utilize network slicing. The gateway device may connect to different service providers infrastructure. A service provider may assign multiple slices with different priorities and different weighted characteristics. For each application, the gateway device may use a network slice of a particular service provider where the slice may be designed for a particular type of traffic (e.g., optimized throughput, latency, quality of service (QoS), etc.).

In some of embodiments, the gateway device may be configured to be part of a software-defined wide area network (SD-WAN). The gateway devices may be used by an entity, such as, a company, a government institution, an educational institution, etc., with offices and locations across a wide geographic area. The use of SD-WAN allows the entity that uses the gateway devices to define a private network over a public network, such as the Internet. For each application, the gateway device may be part of an SD-WAN with policies that manage data paths, bandwidth, latency, QoS, etc.

The gateway device may include one or more subscriber identification cards to identify the subscriber that is using the gateway device. The subscriber identification cards may be, for example, and without limitations, subscriber identification module (SIM) cards. The gateway device, in some embodiments, may be configured to simultaneously communicate data using multiple networks of different service providers. The gateway device, in some embodiments, may be a ruggedized mobile gateway with weatherproof enclosure, shatterproof display, rechargeable and/or replaceable batteries, etc.

The remaining detailed description describes the present embodiments with reference to the drawings. In the drawings, reference numbers label elements of the present embodiments. These reference numbers are reproduced below in connection with the discussion of the corresponding drawing features.

Some of the present embodiments provide a gateway device to create a local network and connect the local network to one or more other networks. The gateway device provides novel functionalities for livestreaming, data transfer, and collaboration during film production and postproduction. The terms film or movie in this specification are used interchangeably and broadly refer to moving images recorded and shown in motion pictures, television (TV) productions, AR, VR, video games, etc.

Figure 1B:
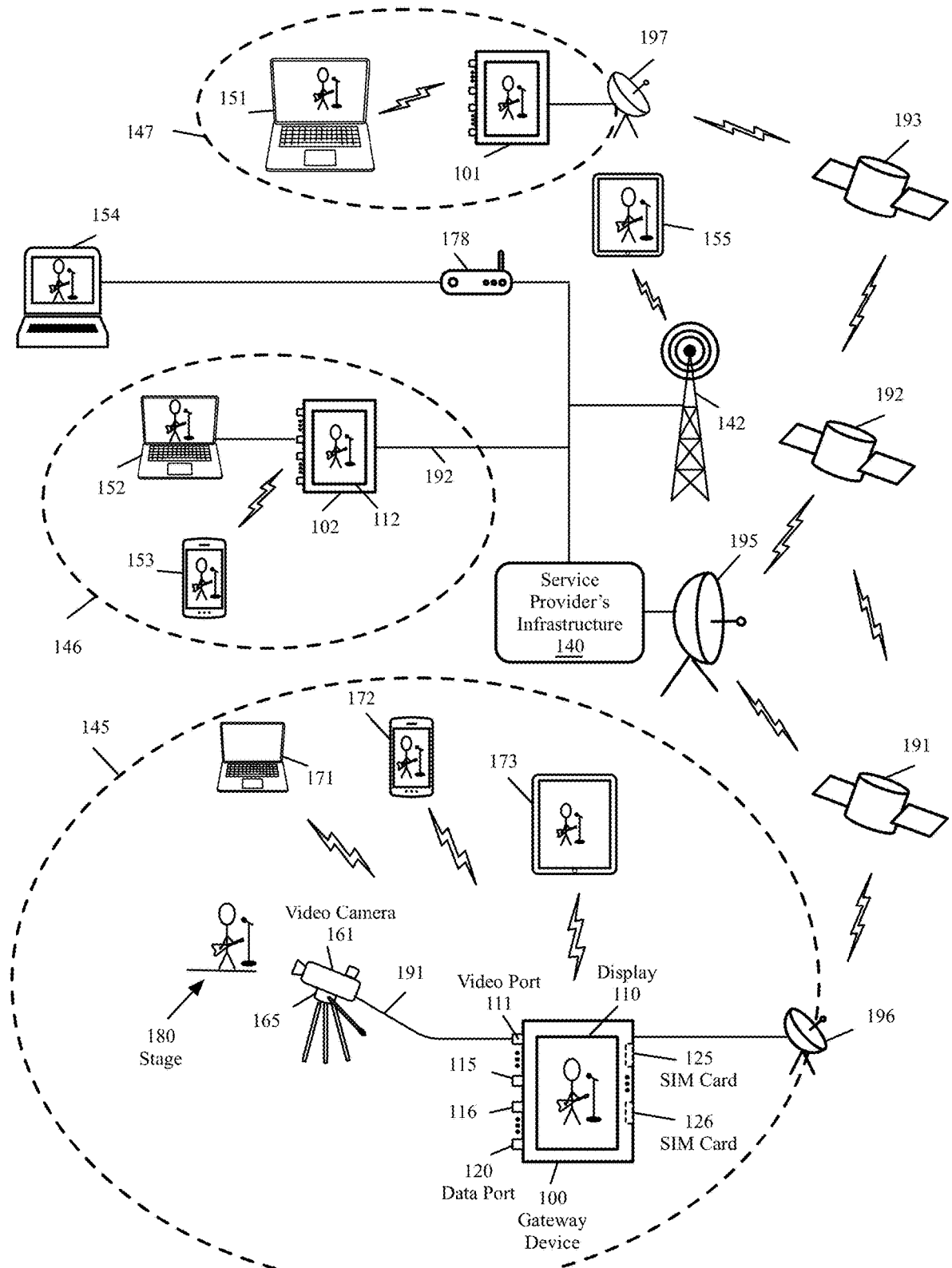
FIG. 1B is a functional block diagram illustrating an example of the system of FIG. 1A, where at least one of the networks is a satellite network, according to various aspects of the present disclosure.

FIG. 1A is a functional block diagram illustrating an example system where a gateway device creates a local network and connects the local network to one or more other networks, according to various aspects of the present disclosure. FIG. 1B is a functional block diagram illustrating an example of the system of FIG. 1A, where one of the networks is a satellite network, according to various aspects of the present disclosure.

With reference to FIGS. 1A-1B, a gateway device 100 may create and control a local network 145. Several electronic devices such as one or more video cameras 161 and one or more computing devices 171-173 may be connected to, and communicate with, the gateway device 100 through wireless and/or wired connections.

The gateway device 100 may, in some embodiments, be a combination of a modem and a router, commonly referred to as a modem-router device (or modem-router combination device). A modem modulates carrier signals to encode digital information for transmission and demodulates received signals to decode digital information. A router forwards data packets (e.g., IP packets) between networks. A typical use for a router is to create a local area network (LAN) where the router may assign a local IP address to each device in the LAN and may control the packet traffic on the network. A typical use for a modem is to connect a network (e.g., a local network created by a router) to an ISP.

With further reference to FIGS. 1A-1B, the gateway device 100 may include one or more subscriber identification cards 125-126 to identify the subscriber that is using the gateway device 100. The subscriber identification cards may be, for example, and without limitations, SIM cards 125-126. A SIM card 125-126 may store an identity (e.g., an international mobile subscriber identity (IMSI)) of the gateway device 100 in order to connect the gateway device 100 to a service provider's infrastructure 140 (e.g., through a cellular base station (or cellular tower) 141, a satellite dish/antenna 196, etc.). The service provider's infrastructure may be connected to the Internet backbone (not shown) and some of the infrastructure shown in the figures may belong to different service providers. For example, the ground based satellite dish 195 and the wireless tower 142 may belong to the same or to different service providers.

Other type of subscriber identification cards may store other types of identity of the gateway device 100 to connect the gateway device 100 to a service provider's infrastructure 140. A wireless service provider (also referred to as a cellular company, mobile network operator, or mobile network carrier) is a provider of wireless communication services that owns or controls infrastructure such as cellular radio towers, base stations, trunk lines, back haul infrastructure, satellites, etc., to provide wireless services to end users. The gateway device 100 may include one or more transceivers, one or more antennas, and/or one or more baseband processors for wireless communication.

A transceiver for communicating with a satellite, in some embodiments, may include a Block Up Converter (BUC) for uplink data transfer and a Low Noise Block Converter (LNB) for down link communication. The BUC converts the RF signals from a lower frequency to higher to transmit to the satellite. The LNB receives the RF signals from the satellite and converts them to lower frequency signals that are processed by the gateway device 100.

In the embodiments that the gateway device 100 includes multiple SIM cards 125-126, each SIM card may store an identification for a different wireless service provider. If the connection to a first wireless service provider's infrastructure fails, or the performance of the connection falls below a threshold, the gateway device 100 may establish another connection to a different wireless service provider's infrastructure using a different SIM card.

In addition to, or in lieu of wireless connections through cell towers, the gateway device 100, in some of the present embodiments, may provide connections through satellite links with a satellite 191-193 (FIG. 1B), for example and without limitations, where there are no cellular tower connectivity available. As described below, when a cellular (or satellite) connection is not available (or the connection performance is below a certain bandwidth or speed threshold), the gateway device 100 may provide connectivity through other available methods such as connecting to an ISP network through a wired connection, connecting to third party routers or hotspot devices, connecting to one of the wireless devices 171-173 that may have cellular connectivity through a different cellular provider, connecting to a mesh network, etc.

The cellular network provided by the service provider infrastructure 140 may be a highspeed network such as, for example, and without limitations, a fifth generation (5G) network. Since the gateway device 100 is designed to provide connectivity in the field, the gateway device 100, in some embodiments, is capable of connecting to any available cellular network such as 5G networks, 5G millimeter wave (mm wave) networks, fourth generation (4G) networks, long term evolution (LTE), third generation (3G) networks, etc., by incorporating different RF transceivers.

The 5G network connectivity of the gateway device 100 provides the ability for high bandwidth and low latency data transfer for the large volume of content generated in media production. The higher bandwidth and lower latencies are dependent on the availability of the newer radio networks and mm wave technologies, and the service available at the location where the gateway device 100 is being used.

The gateway device 100, in some embodiments, may include multiple transceivers to support different radio frequency spectrums and/or different communication protocols. In some embodiments, the gateway device 100 may simultaneously transit and/or receive through several transceivers of different network types. For example, and without limitations, the gateway device 100, in some embodiments, may simultaneously transmit and receive through a wireless cellular network such as a 5G mm network, through a wireless satellite network, and through a local short-range LAN, such as Bluetooth or Wi-Fi.

In addition to, or in lieu of including multiple transceivers, the gateway device 100, in some embodiments, may include a backplane that recognizes different types of transceivers. In the embodiments that support different 5G transceivers, the bandwidth rate may depend on the 5G transceivers installed in the unit, the antennas installed, and the service available at the location where the gateway device 100 is being used. The gateway device 100, in some embodiments, may have several transceivers for several different types of networks. In these embodiments, transmission may failover from one transceiver to another transceiver based on a failover priority. Further details of the gateway device backplane is described below with reference to FIG. 12.

In some embodiments, the gateway device 100 may adapt to the application for which the gateway device 100 is being used and/or to the environment at the location where the gateway device 100 is being used. In some of these embodiments, the gateway device 100 may utilize network slicing. For example, 5G network slicing architecture enables multiplexing of independent logical networks on the same physical network, where each slice works as an end-to-end network tailored to fulfill different requirements of a particular application. In a 5G network, each slice may have weighted characteristics. These include weighting on the bandwidth, latency, reliability, data security, QoS, etc. For example, the 911 slice may have a 100% weighting on reliability. Therefore, if a catastrophic event occurs, all other slices may be dropped allowing all 911 traffic to be passed without any interruption. As another example, livestream video data may be sent over a higher bandwidth slice than text messages.

The gateway device 100 may connect to different service providers infrastructure 140. A service provider may assign multiple slices with different priorities and different weighted characteristics. For each application, the gateway device 100 may use a network slice of a particular service provider where the slice may be designed for the type of traffic desired (e.g., optimized throughput, latency, reliability, data security, QoS, etc.).

As an example, the camera 161 in the local network 145 may record performance on the stage 180. The camera may record a large amount of raw, uncompressed video data. There may also be audio recording done by the camera 161 or by other equipment (not shown) on the stage. The gateway 100 may receive the raw video data files and the audio data files and may transmit them over the service provider's infrastructure 140 to one or more electronic devices 101-102, 155, 178, etc. The gateway device may be configured to transmit and receive data over several different network slices with different bandwidths, different latencies, and different QoS. For this particular performance recording, the gateway device 100 may be configured to transmit the large raw video data files over a first slice with a larger bandwidth and transmit the audio data files over a second slice with a smaller bandwidth.

As another example, the gateway device 100 may be used to livestream video content to several destination. In one destination, a high quality video may be shown to paid audience. In other destinations, the video content may be sent to cloud destination for storage (e.g., as described below with reference to FIGS. 10A and 10B). The gateway device 100 may be configured to send the high quality video over a first slice with a higher bandwidth, lower latency, and higher QoS and send the video content to the cloud storage over a second slice that has a lower bandwidth, a higher latency, and a lower QoS compared to the first slice.

In the embodiments that the gateway device 100 may have multiple subscriber identifications cards (e.g., multiple SIM cards), the gateway device 100 may simultaneously use network slices of different service providers based on the communication requirements of a particular application (e.g., bandwidth, latency, QoS, etc.). The gateway device 100, in some embodiments, may be configured to send different data types (e.g., raw data recorded by cameras, livestreaming video data, voice data, text messages, voice calls, emergency 911 calls) on different slices. The characteristics of each slice (e.g., bandwidth, latency, QoS, etc.) may be configured to match the transmission requirements of each data type. For example, a first slice may be used to transmit high dynamic range (HDR) audio and video content, and a second slice may be used to transmit standard dynamic range (SDR) audio and video content. The first slice may be configured to have a higher bandwidth and a lower latency than the second slice.

In some embodiments, the gateway device 100 may be configured to be part of an SD-WAN. The gateway devices 100 may be used by an entity, such as, a company, a government institution, an educational institution, etc., with offices and location across a wide geographic area. The use of SD-WAN allows the entity to define a private network over a public network, such as the Internet.

The SD-WAN may be configured such that the gateway device 100 may send different data types (e.g., raw data recorded by cameras, livestreaming video data, voice data, text messages, voice calls) on different SD-WAN paths. The characteristics of each path (e.g., bandwidth, latency, QoS, etc.) may be configured to match the transmission requirements of each data type. The SD-WAN may be configured such that the gateway device 100 may transmit and receive the same type of data over different network paths.

The same use cases described above for the gateway devices 100 that use slices are applicable to the gateway devices 100 that use SD-WAN. For example, the gateway device 100 may be configured to transmit and receive data over several different network SD-WAN paths with different bandwidths, different latencies, and different QoS. The difference between using the slices and the SD-WAN is that the slices configuration are dependent on the service provider, while the SD-WAN is independent of the service provide.

For the performance recording example described above, the gateway device 100 may be configured to transmit the large raw video data files over a first SD-WAN path with a larger bandwidth and transmit the audio data files over a second SD-WAN path with a smaller bandwidth. For the livestreaming video content described above, the gateway device 100 may be configured to send the high quality video over a first SD-WAN path with a higher bandwidth, lower latency, and higher QoS and send the video content to the cloud storage over a second SD-WAN path that has a lower bandwidth, a higher latency, and a lower QoS compared to the first SD-WAN path. A first SD-WAN path may be used to transmit HDR audio and video content and a second SD-WAN path may be used to transmit SDR audio and video content. The first SD-WAN path may be configured to have a higher bandwidth and a lower latency than the second SD-WAN path.

The gateway device 100, in some embodiments, may split data files (or data streams) into smaller files (or smaller streams) and may send the split files (or streams) concurrently through different network paths (e.g., different slices, different SD-WAN paths, etc.), to deliver the content faster. The split files (or streams) may go through different service provider networks, such as, cellular networks, satellite networks, etc., and may be reassembled at the destination. One example use of the split files is the use of Dynamic Adaptive Streaming over HTTP (DASH), also known as MPEG-DASH. As long as the required bandwidth is available, the MPEG-DASH data may be transmitted over the same communication path. When the bandwidth is below a threshold, the data files may be split and may be transmitted over multiple network paths to deliver the content faster. Each split file, in some embodiments, may be separately time-stamped to indicate the transmission and reception times of the file.

The use of multiple RF transceivers, the use of the replaceable RF transceivers, the use of network slicing, and/or the use of SD-WAN by the gateway device 100 provides the technical advantage of being able to adapt to the requirements of particular applications, being able to adapt to the available infrastructure at a particular location, and being able to evolve with the technology.

The gateway device 100 may provide connectivity through a network that may include several satellites 191-193. As shown in FIG. 1B, some of the gateway devices of the present embodiments, such as the gateway devices 100-101 of FIG. 1B may connect to the network using the satellite dishes (or antenna) 196-197, respectively. Other gateway devices may connect to the network by wire (as shown for the gateway 102 of FIG. 1B) or wirelessly to a cell tower 142 (not shown in FIG. 1B).

The gateway devices 100-101 may be connected to the corresponding satellite dishes through a subminiature version A (SMA) connector. The satellite dishes, in some embodiments, may be motorized to make aiming adjustments towards a satellite. Example of satellite networks may include, without limitations, Starlink operated by SpaceX, HughesNet provided by Hughes Network System, and Viasat provided by Viasat Inc.

The gateway device 100 may include a display 110. The display 110 may be a high-resolution display to facilitate monitoring and/or editing of video content. The display 110, in some embodiments, may be a touchscreen display, such as, for example, and without limitations, a projective capacitance touch display. The gateway device 100 may be a ruggedized mobile device for use in the field. For example, the gateway device 100 may include a weatherproof enclosure and the display 110 may be covered by a shatterproof hardened glass cover. In addition to, or in lieu of a power cord, the gateway device may include rechargeable and/or replaceable batteries.

The gateway device 100 may include one or more communication ports. The communication ports may include video ports and/or data ports. As shown in FIGS. 1A-1B, the gateway device 100 may include the video ports 111-115. Examples of video ports include, without limitations, high-definition multimedia interface (HDMI) ports, mini HDMI ports, digital visual interface (DVI) ports, video graphics array (VGA) ports, and DisplayPort ports. The gateway device 100 may include one or more data ports 116-120. Examples of data ports include, without limitations, Ethernet ports, universal serial bus (USB) ports (e.g., USB-A, USB-B, USB-C ports), fiber ports, Thunderbolt ports, small form-factor pluggable (SFP) ports, etc.

Video cameras may include video ports but not data ports. One technical advantage of the video ports 111-115 on the gateway device 100 is allowing video cameras 161 that have video ports, but not data port, to directly connect to the gateway device 100 through a wired connection 191. Unlike the gateway device 100, the prior art gateway devices do not have video ports and cannot be directly connected to video cameras that do not have data ports.

The gateway device 100 may include one or more RF transceivers for short range communication. The electronic devices 171-173 may connect to the gateway device 100 through wireless connections such as, for example, and without limitations, Wi-Fi or Bluetooth. The electronic devices 171-173 may connect by wire to the gateway device's video ports 111-115 or data ports 116-120. The electronic devices 171-173 may be, for example, and without limitations, client devices such as cellular phones (e.g., smartphones), laptop computers, tablet devices, desktop computers, personal digital assistant (PDA) devices, etc.

The gateway device 100, in some embodiments, may be connected to accessories such as keyboard or external hard drives through a wireless link (e.g., through a Bluetooth or Wi-Fi link) and/or may be connected through a wired connection to a data port 116-120. One or more of the electronic devices 171-173 may be authenticated and authorized to remotely control the gateway device 100 and/or to receive and display the information being displayed on the gateway device's display 110. In the example of FIG. 1A, the electronic devices 172 and 173 may be displaying the same video content and/or the same status messages as the gateway device 100, while the electronic device 171 may be using the gateway device 100 for other tasks such as, for example, and without limitation, accessing the Internet, exchanging emails, exchanging different type of files with remote destinations, etc.

Figure 2:
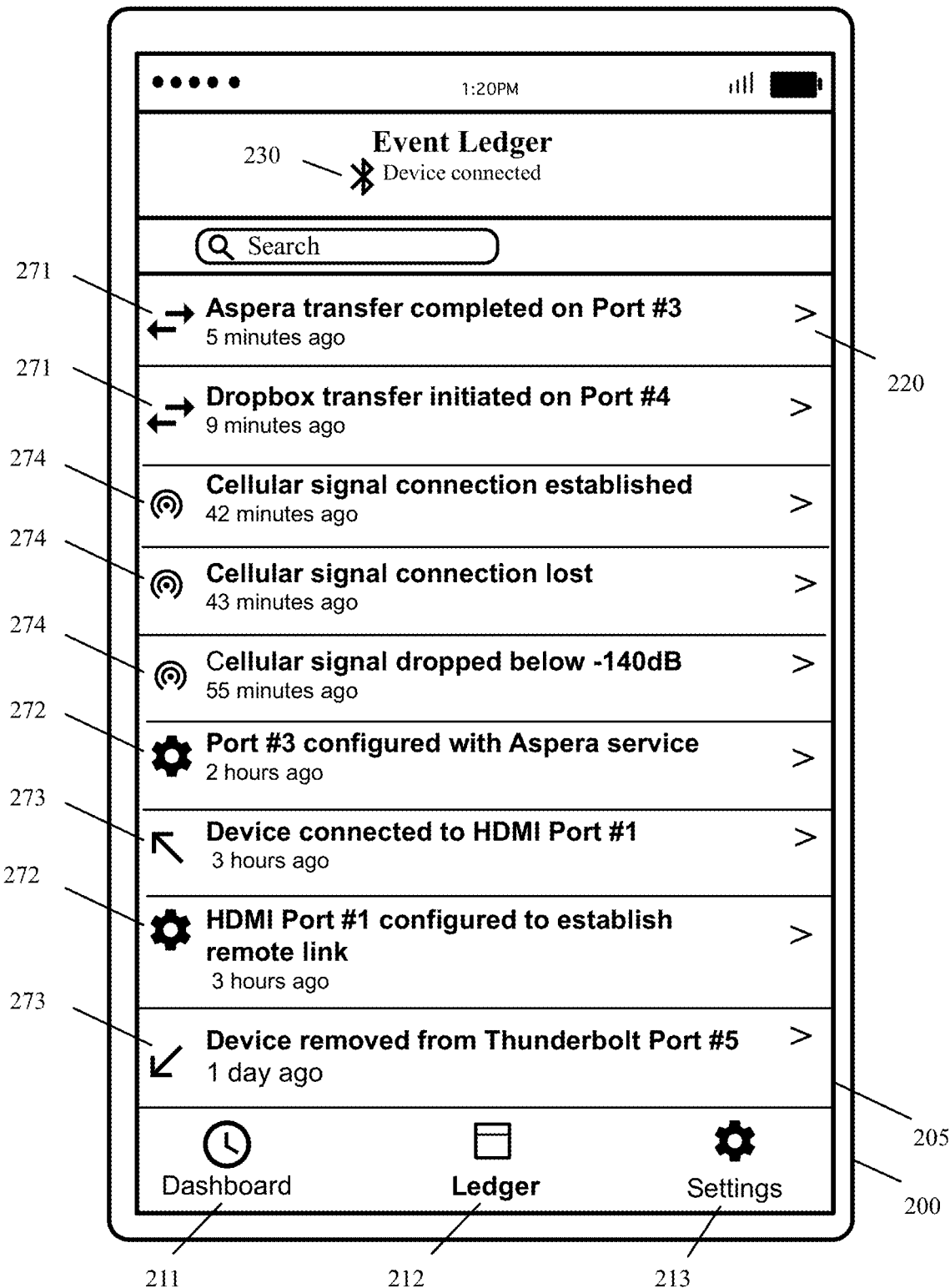
FIG. 2 is a schematic front view of an electronic device that is authenticated and configured to remotely control and/or to display similar information as displayed by a gateway device, according to various aspects of the present embodiments.

FIG. 2 is a schematic front view of an electronic device that is authenticated and configured to remotely control and/or to display similar information as displayed by a gateway device, according to various aspects of the present embodiments. With reference to FIG. 2, the electronic device 200 may be an electronic device, such as the electronic devices 171-173, in a local network, such as the local network 145, that is created and controlled by a gateway device such as the gateway device 100 of FIGS. 1A or 1B. The electronic device 200 may be an electronic device, such as the electronic devices 151-155, that are outside the local network, such as the local network 145, that is created and controlled by the gateway device 100 of FIG. 1A or 1B.

With reference to FIG. 2, the electronic device 200 may be authenticated and authorized to display the same status and metric information as the gateway device 100. As shown, the display 205 of the electronic device 200 may display several options 211-213 for displaying information and configuring the gateway device 100 of FIG. 1A. In the example of FIG. 2, the option 212 is selected to display a ledger of different activities performed by the gateway device 100. The ledger may show a chronological summary of different activities. Further details of an activity may be displayed, for example, by selecting an icon 220 next to each activity.

The electronic device 200 may be wirelessly connected (as shown by 230) to the gateway device 100, for example and without limitations, through Bluetooth or Wi-Fi connections, and may display similar information as the display of the gateway device 100. Alternatively, the electronic device 200 may be outside the local network of the gateway device 100 and may be connected to the gateway device 100 through one or more external networks. In this example, the activities performed by the gateway device 100 include transferring data 271 by different applications running on the gateway device 100, configuring 272 different ports, connecting and disconnecting 273 devices to different ports, establishing and losing 274 cellular connections, etc.

The dashboard option 211 may be used to display different performance metrics of the gateway device 100. The setting option 213 may be used to configure the gateway device 100, for example, and without limitations, to configure different ports, to select different applications for livestreaming or data transfer, to configure different RF transceivers, etc.

The setting option 213 may be used to configure the gateway device 100. For example, and without limitations, the electronic device 200 may send one or more signals to the processor of the gateway device 100 to manipulate transfer of media production content by assigning different network slices to different content types, by assigning different SD-WAN paths to different content types, by stopping or starting the transfer of different data content based on the changing capabilities of the network, etc.

For example, the gateway device 100 may be used in the field with no human operators present with the expertise to control the gateway device 100. A user interface, such as the user interface of FIGS. 2 and 3, may be used on a remote electronic device 200, such as mobile device or a desktop computer. A person at the user interface of the remote electronic device 200 may realize that the upload capability for the camera raw files is highly restrained for various reasons. The person may then make a decision to pause the upload of the camera raw files and let a higher priority data content, such as audio data to be uploaded.

Figure 3:
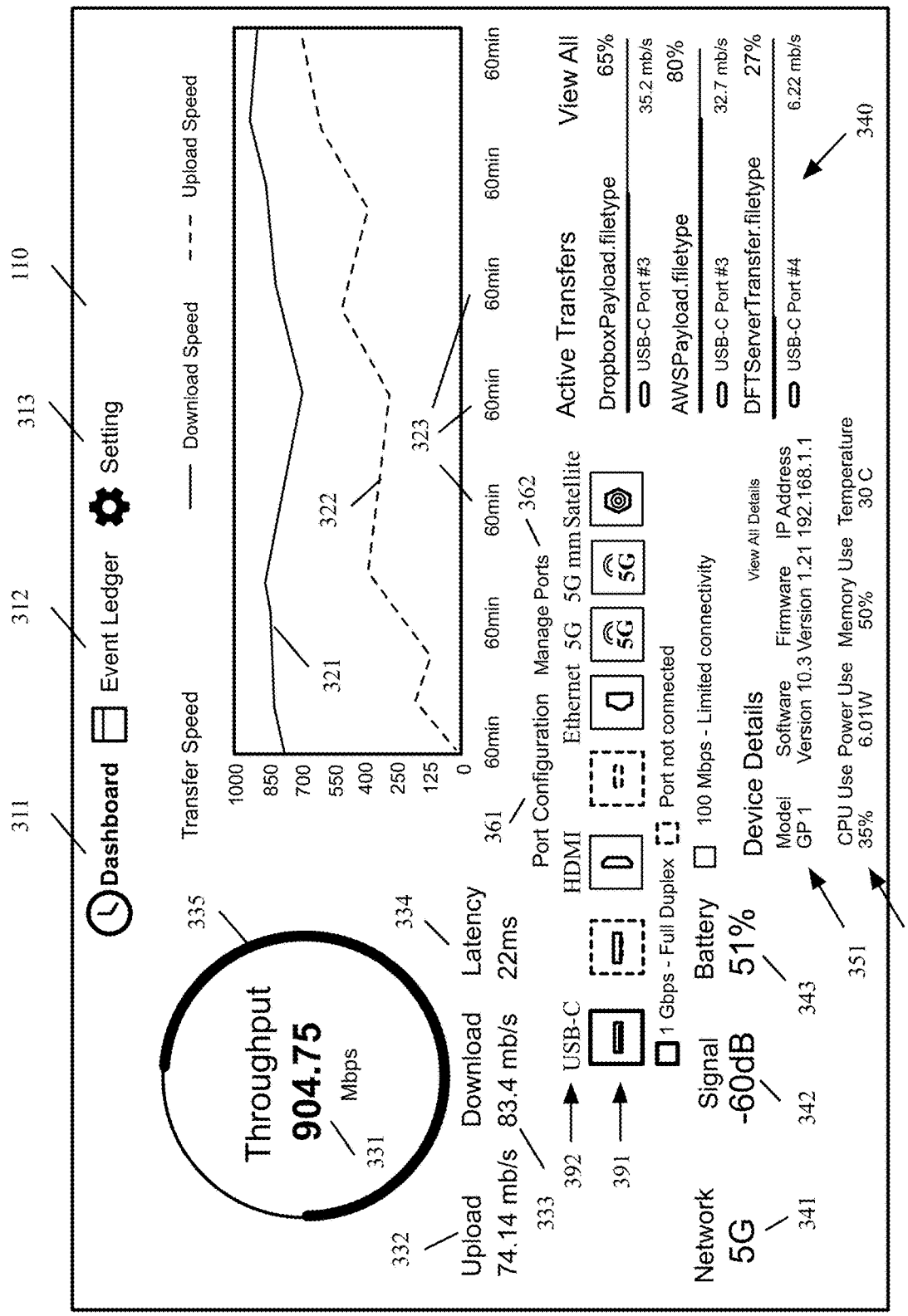
FIG. 3 is a schematic front view of an electronic device that displays an example user interface dashboard, according to various aspects of the present embodiments.

FIG. 3 is a schematic front view of an electronic device that displays an example user interface dashboard, according to various aspects of the present embodiments. The electronic device may be the gateway device 100 or an electronic device (e.g., an electronic device in a local network that is created and controlled by the gateway device), which is authenticated and configured to remotely control and/or to display similar information as displayed by the gateway device.

With reference to FIG. 3, the display 110 may include several options 311-313 for displaying information and configuring the gateway device 100 of FIG. 1A. The option 311 is highlighted to indicate the dashboard is being displayed. The dashboard may display different performance metrics and status information. In the user interface example of FIG. 3, the dashboard may display the upload and download transfer speeds over a time period. The download speed 321 and the upload speed 322 may be displayed as graphs over a period of time. The time period, in this example, is divided into several 60 minutes intervals 323.

With further reference to FIG. 3, the display 110 may display the current values of the throughput 331, the upload speed 332, the download speed 333, and the latency 334. The current value of the throughput may also be graphically displayed (as shown by 335) against a maximum throughput. A similar graphical representation may also be displayed for the upload speed, the download speed, and the latency.

The dashboard may display (as shown by 340) the status of the active transfers. The dashboard may display the network type 341 (in this example, a 5G network), the signal strength 342, and the percentage of the gateway device's battery power remained 343. The dashboard may display the gateway device's details 351 such as the device model, the software version, the firmware version, and the IP address. The dashboard may display (as shown by 352) the resource usage and the current temperature of the gateway device. The dashboard may display different port configurations 361, for example by showing the type of port that is currently inserted in each port slot of the gateway device.

As discussed below, some of the present embodiments allow dynamic configuration of the ports by removing one type of port from a port slot and inserting and configuring another type of port in the port slot. In some embodiments, the user interface may identify the type of each port 392 that is currently inserted in each port slot 391. The port slots that are currently empty may be shown with dashed lines and the slots that currently include a port may be shown with solid lines. The example of FIG. 3 shows eight port slots 391 and six ports 392. In the example of FIG. 3, two of the port slots include data ports (USB-C and Ethernet), one port slot includes a video port (HDMI), two port slots include wireless RF transceivers (5G and 5G mm), and one port slot includes a satellite transceiver. The two slots that are currently empty are shown with dashed lines. Other embodiments may include fewer or more port slots than eight.

The user interface may also provide an option 362 to manage the ports For example, in response to receiving a selection of the option 362, some embodiments may display a menu for configuring the ports. For example, and without limitations, the menu may display a list of port slots and may indicate which slot is currently empty and which slot includes a port. The menu may display the type of the ports that currently occupy each slot. In some embodiments, the menu may also display the application(s) that is/are currently using a port.

The menu may be used by a person such as an administrator or a current user of the gateway device to reconfigure the ports. For example, the user may mark a port as unused or empty (e.g., prior to or after the port is removed from the port slot). After a new port is inserted into the empty slot, the user may identify the type of the port that is inserted (e.g., by selecting a port type from a drop down menu, typing the port type, etc.).

In addition to, or in lieu of the menu for configuring ports, the user interface, in some embodiments, may allow an option to individually select each port slot 391 (e.g., by double clicking or right clicking on a port slot icon 391. In response, a pop up menu may be displayed to allow the user to mark a port as unused or empty (e.g., prior to or after the port is removed from the port slot). After a new port is inserted into the empty slot, the port icon may be selected again in order to identify the type of the port that is inserted. As described below with reference to FIGS. 12-13, in some embodiments, removing and/or inserting a port into a port slot results in an automatic update of all system tables and user interfaces related to port management without the need for a person to enter the information through a user interface. Once the system tables are updated, the operating system of the gateway device may use the corresponding driver for the port that is inserted in a port slot.

Referring back to the example of FIGS. 1A-1B, the video camera 161 may be recording the live performance of one or more actors or performers on a filming location such as a filming stage 180 (or filming set). The video camera 161 may be recording humans, animals, and/or objects at any indoor or outdoor filming location. The video camera 161 may be connected to a video port 111 of the gateway device 100 by a wired connection 191. Although the gateway device 100 is shown at a distance from the video camera 161, a practical use case may be attaching the gateway device 100 to the video camera 161, or to a tripod 165 that supports the camera 161, to allow easy movement of the video camera 161.

The gateway device 100 may include software for compressing, encrypting, and/or livestreaming the raw video captured by the video camera 161. The ability of the gateway device to compress, encrypt, and/or livestream video content provides the advantage over the prior art gateways that simply receive packets from a source device and transmit the packets to one or more destinations.

The gateway device 100 may include one or more processing units (or processors) that may receive a selection of a video port to which the camera 161 is/will be connected and a selection of a particular livestreaming application software to livestream the video content captured by the camera 161. The gateway device 100 may receive a signal each time a device is connected to or disconnected from a port (e.g., as shown by the status message 273 of FIG. 2).

Figure 4:
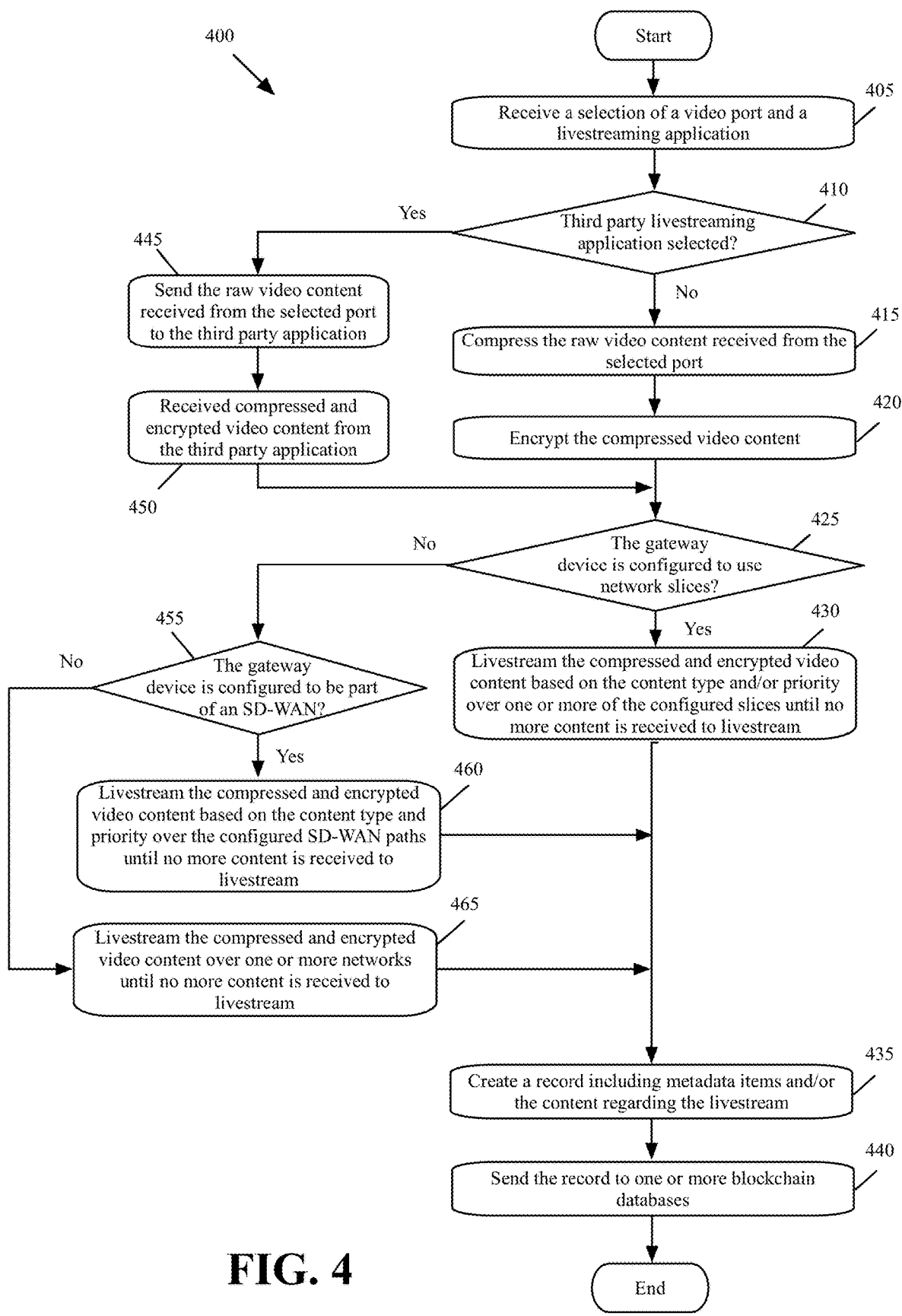
FIG. 4 is a flowchart illustrating an example process for receiving and transmitting content by a gateway device, according to various aspects of the present embodiments.

FIG. 4 is a flowchart illustrating an example process 400 for receiving and transmitting content by a gateway device, according to various aspects of the present embodiments. In some of the present embodiments, the process 400 may be performed by one or more processing units of a gateway device 100-102 (FIGS. 1A-1B).

With reference to FIG. 4, at block 405, a selection of a video port and a livestreaming application may be received. For example, the gateway device 100 may receive (at block 405) a selection of port 111 for receiving raw video content from the camera 161. The gateway device may also receive (at block 405) a selection of a native or a third party video streaming video application. For example, the gateway device 100 may include one or more processing units and machine readable media, such as non-volatile storage, and may store one or more native or third party streaming applications. The third party video streaming applications may include, for example, and without limitations, network device interface (NDI), YouTube Live, Facebook Live, Twitch, and similar applications.

At block 410, a determination may be made whether a third party livestreaming application is selected. When it is determined (block 410) that a third party livestreaming application is not selected, the processing may proceed to block 415, which is described below.

Otherwise, when it is determined (at block 410) that a third party livestreaming application is selected, the raw video data received from the selected port may be sent (at block 445) to the selected third party application. As described above, the gateway device 100 may include one or more processing units and machine readable media, such as non-volatile storage, and may store one or more third party streaming applications. Once a third party application is selected for livestreaming, the application may be activated by the processing unit and the raw video content received from the camera may be sent to the third party application.

The third party application may then compress and encrypt the video content. The compressed and encrypted video content may be received (at block 450) from the third party application. The processing may then proceed to block 425, which is described below. When it is determined (block 410) that a third party livestreaming application is not selected, the raw video content received from the selected port may be compressed (at block 415). The compressed video may then be optionally encrypted (at block 420).

A determination may be made (at block 425) whether the gateway device is configured to use network slices. When it is determined (block 4425) that the gateway device is not configured to use network slices, the processing may proceed to block 455, which is described below. Otherwise, the compressed and optionally encrypted video content may be livestreamed (at block 430) based on the content type and/or priority over one or more of the configured slices until no more content is received to livestream. For example, the content may be sent over one or more slices based on the required bandwidth, latency, QoS, priority, etc., of the content. The processing may then proceed to block 435, which is described below.

When it is determined (block 425) that the gateway device is not configured to use network slices, a determination may be made (at block 455) whether the gateway device is configured to be part of an SD-WAN. When it is determined (block 4455) that the gateway device is not configured to be part of an SD-WAN, the processing may proceed to block 465, which is described below. Otherwise, the compressed and optionally encrypted video content may be livestreamed (at block 460) based on the content type and/or priority over one or more of the configured SD-WAN paths until no more content is received to livestream. For example, the content may be sent over one or more SD-WAN paths based on the required bandwidth, latency, QoS, priority, etc., of the content. The processing may then proceed to block 435, which is described below.

When it is determined (block 455) that the gateway device is not configured to be part of an SD-WAN, the compressed and optionally encrypted video content may be livestreamed (at block 465) over one or more networks until no more content is received to livestream. For example, the embodiments that the gateway device may include multiple SIM cards and may be configured to simultaneously send and receive data over multiple networks, the content may be livestreamed over several networks (e.g., wireless, satellite, landline, etc.).

A record may then be created, at block 435, including metadata items regarding the livestream. Examples of such metadata may include, for example, and without limitations, one or more of the starting time of the livestream, the ending time of the livestream, an identification of the camera recording the content, an identification of the gateway device receiving the content, an identification of the software application used for compressing, encrypting, and streaming the content, information regarding any color calibrations performed on the gateway device's display, an identification of the destination devices and/or the links used by the destination devices to receive the livestreamed content, etc.

In addition to metadata, some embodiments may also create a record of the content that is received and transmitted by the gateway device. For example, the gateway device may provide a user-selectable option for storing any files (e.g., and without limitations, video files, audio files, document files, image files, etc.). Once the option is selected, all contents are recorded and stored by the gateway device.

The record(s) may then be sent (at block 440) to one or more blockchain databases. The process 400 may then end. A blockchain is a growing list of records (or blocks) that are cryptographically linked together. Each block may include a cryptographic hash of the previous block, a timestamp, and transaction data (in the example of FIG. 4, the transaction data may be the metadata corresponding to the livestreamed video content). A blockchain is typically managed by a peer-to-peer network and creates an open, immutable, and distributed ledger.

Although the example of FIG. 4 was described with reference to a livestreaming application, the gateway device of some embodiments may create records, including metadata items and/or the actual content, regarding other actions taken by the gateway device. For example, and without limitations, the users may create projects, may create, edit, and/or delete files, may corroborate with other persons, may exchange messages, documents, images, video clips, and/or audio clips, may change the configuration of the software and the hardware of the system, etc.

Metadata records of all activates performed on the electronic devices of the present embodiments may be created and may be stored as blockchain records. Examples of such metadata may include, for example, and without limitations, one or more of the starting time of each event, the ending time of each event, the identification of the hardware components/devices and/or software applications used during each event, the identification of the gateway device (if any) used, the resolution of the display monitor(s) used, the identification of the destination devices and/or the communication links used by the destination devices, etc.

In addition to metadata, some embodiments may also create a record of the content that is received, transmitted, edited, acted upon, and/or otherwise manipulated during different events. For example, all content files (e.g., and without limitations, video files, audio files, text files, binary files, documents, images, etc.) and/or any messages (e.g., and without limitations, emails, text messages, chats, etc.) may be stored as blockchain records, as described above. Storing the actual content, in some embodiments, may be user selectable.

Some aspects of the present embodiments utilize the existing decentralized cryptocurrency/bitcoin infrastructure for storing the blockchain ledgers. The cryptocurrency/bitcoin infrastructure includes a network of communicating nodes running cryptocurrency/bitcoin software. Network nodes may validate transactions (in the example of video content, the record of any livestreaming, re-broadcasting, storing, editing, and transmitting of the video content), add them to their copy of the ledger, and then broadcast these ledger additions to other nodes.

In the example of FIGS. 1A-1B, the gateway device 100 may receive raw video data captured by the video camera 161 through the wired link 191 and the video port 111. The gateway device 100 may compress the raw video data (e.g., the video footage and the associated metadata (if any)). The gateway device 100 may encrypt the compressed video data and may livestream the compressed (and encrypted) video data through a wireless link to a nearby cellular tower 141. The livestream may then be broadcast through the service provider infrastructure 140 and/or additional cellular towers 142 to one or more destination devices 101-102 and 151-155. The livestream may also be broadcast to one or more of the electronic devices 171-173 in the local network 145.

Livestreaming (or live streaming) refers to simultaneously recording and broadcasting of multimedia. The terms video content, video data, and multimedia in this specification are used interchangeably and refer to the content, such as video, audio, images, animation, text, etc., that may be recorded by a physical or virtual camera.

With further reference to FIGS. 1A-1B, the gateway device 100 may livestream the video data as a series of packets. Protocols such as transmission control protocol (TCP) or file transfer protocol (FTP) may send the packets in random order and may re-send the lost packets and may not be suitable for livestreaming video data. In some of the present embodiments, the gateway device 100 may use protocols such as, for example, and without limitations, real-time transfer protocol (RTP), real-time streaming protocol (RTSP), real-time transport control protocol (RTCP), etc., to livestream the video data packets. These protocols may be added as layers over protocols such as IP that may be used to transport packets over the networks such as the Internet.

Livestreaming of video data allows the destination devices 101-102, 151-155, and 172-173 to display and use the content, as the content is being captured by the video camera 161 in real-time. The availability of fast network connections such as 5G, 5G mm, satellite, or fiber may facilitate and may improve the quality of the livestreamed content. For example, the compression algorithm may use more frames per second to improve the quality of the compressed video content.

The destination devices 101-102, 151-155, and 172-173 may receive notifications for a time and date of the livestreaming event and may be provided with a link to receive and display the livestream video data. The destination devices 172-173 that are in the local network 145 of the gateway device 100 may be configured to display the same content as the content displayed in the gateway device's display 110.

The livestream video data may be password protected and the destination devices may have to provide identification (e.g., username and password and/or biometric information such as fingerprints or face identification) to be authenticated prior to receiving the livestream data. The livestream video data may be transmitted as a multicast, which allows a single stream to be received by many destination devices.

Alternatively, when fewer destination devices are predicted, a unicast stream may be sent where each destination device may receive a separate video stream.

The destination devices 151-155 may be client devices such as, for example, and without limitations, cellular phones (e.g., smartphones), laptop computers, tablet devices, desktop computers, personal digital assistant (PDA) devices, or other electronic devices. In the example of FIGS. 1A-1B, some of these destination locations may include gateway devices 101-102, that are similar to the gateway device 100. As shown in the example of FIG. 1A, the gateway device 101 may wirelessly receive the livestream video data from a cellular tower 142 and may wirelessly transmit the livestream video data to the electronic device 151, which is a connected to the local network 147 that is created and controlled by the gateway device 101. As shown in the example of FIG. 1B, the gateway device 101 may receive the livestream video data, through the satellite dish 197, from a satellite 193 and may wirelessly transmit the livestream video data to the electronic device 151, which is a connected to the local network 147 that is created and controlled by the gateway device 101.

As described above, the gateway devices of the present embodiments, may be connected to the provider infrastructure through a wired line. For example, the gateway device 112 (FIGS. 1A-1B) is connected to the service provider's infrastructure 140 through a wired connection 192 (e.g., when the wireless service provider is also an ISP provider). Alternatively, the gateway device may be connected to an ISP infrastructure other than a cellular provider (e.g., to a cable network) through a wired line (not shown).

In this example, the electronic device 152 is connected to the gateway device 102 through a wired connection and the electronic device 153 is connected to the gateway device 102 through a wireless connection. Both of the electronic devices 152 and 153 are in a local network 146 created and controlled by the gateway device 102. The electronic device 152 is displaying the livestreamed video while the user of the electronic device 153 has decided to view the livestreamed video on the display 112 of the gateway device 102.

As shown, several electronic devices 154 and 155 may also receive the livestream video data without being connected to a gateway device similar to the gateway device 100. For example, the electronic device 155 may receive the livestream video data directly through the cellular tower 142 and the electronic device 154 may receive the livestream video data through a prior art gateway device 178.

Receiving the livestream through the gateway devices 101-102 provided by the embodiments of the present invention provides several advantages. For example, when both the transmitting party and the receiving party have the gateway devices of the present invention, the two parties may collaborate in real time, for example and without limitations, by exchanging content, coordinating color calibration of the displays, etc.

The gateway device 100, in some embodiments, may provide color calibration tools for calibrating the display of the gateway device. The gateway device may provide color coordination tools to ensure the gateway device and a corroborating electronic device display the same colors for the same pixels of a displayed frame. Color calibration for an individual display may be performed to ensure the display is calibrated to match a common standard color space. Color coordination (or color management) may be performed to ensure, when the same frame is displayed on different devices, each device displays the same color components and the same intensity for the same pixels.

A destination electronic device may edit the livestream content and send back the edited content in real-time to one or more corroborating electronic devices, including the gateway device 100 and the electronic devices 171-173 that are physically at the production location. The electronic device that edits the livestream content may belong to, for example and without limitations, an editor, an effect artist, or any personnel who may be doing postproduction work. Postproduction may include activities such as the editing of raw footage to replace backgrounds with alternative backgrounds, cutting scenes, inserting transition effects, working with voice and sound actors, dubbing, etc.

Figure 5A:
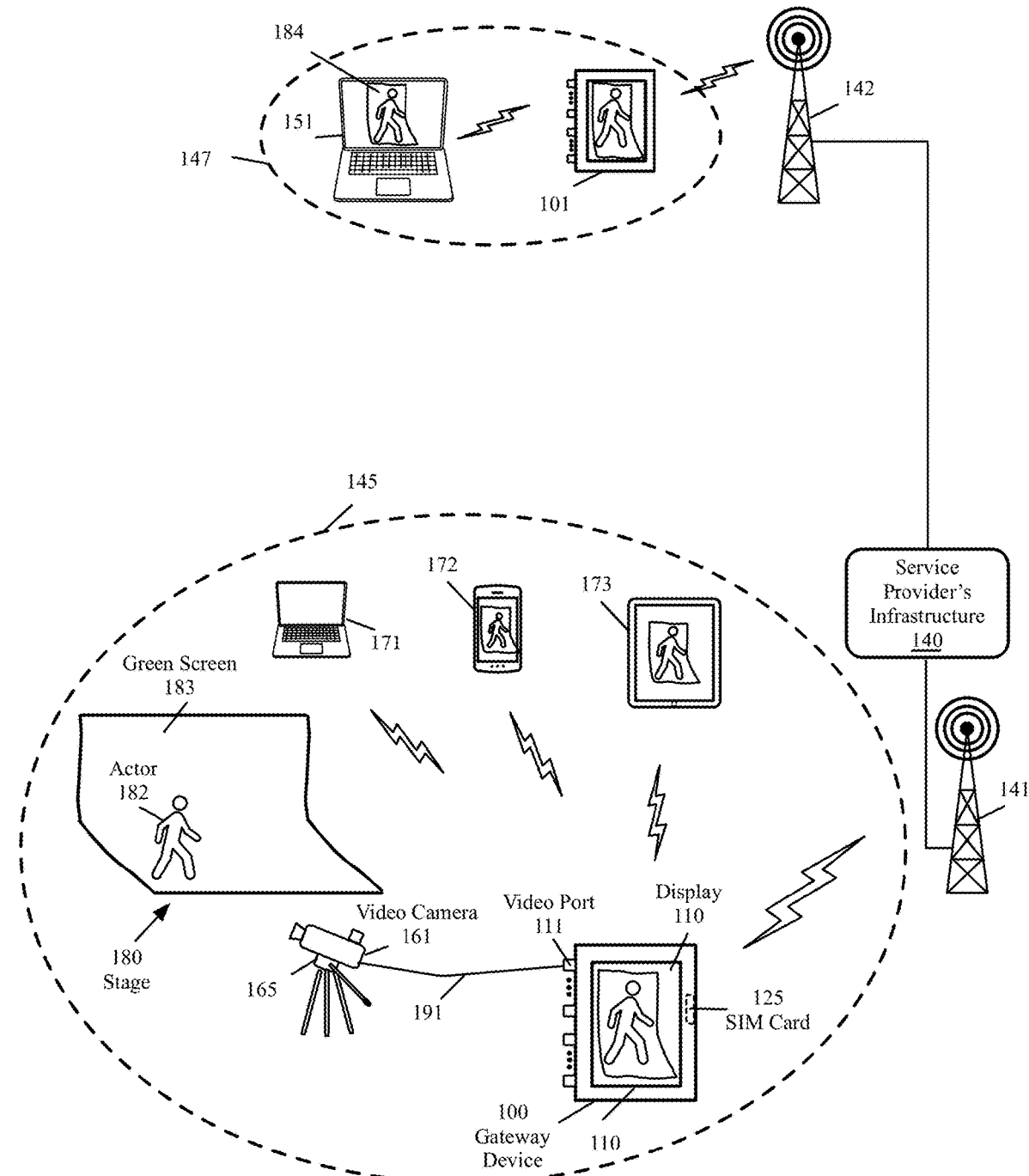
FIGS. 5A and 5B are functional block diagrams illustrating an example system where the gateway devices are used for real-time collaboration during film production, according to various aspects of the present disclosure.
Figure 5B:
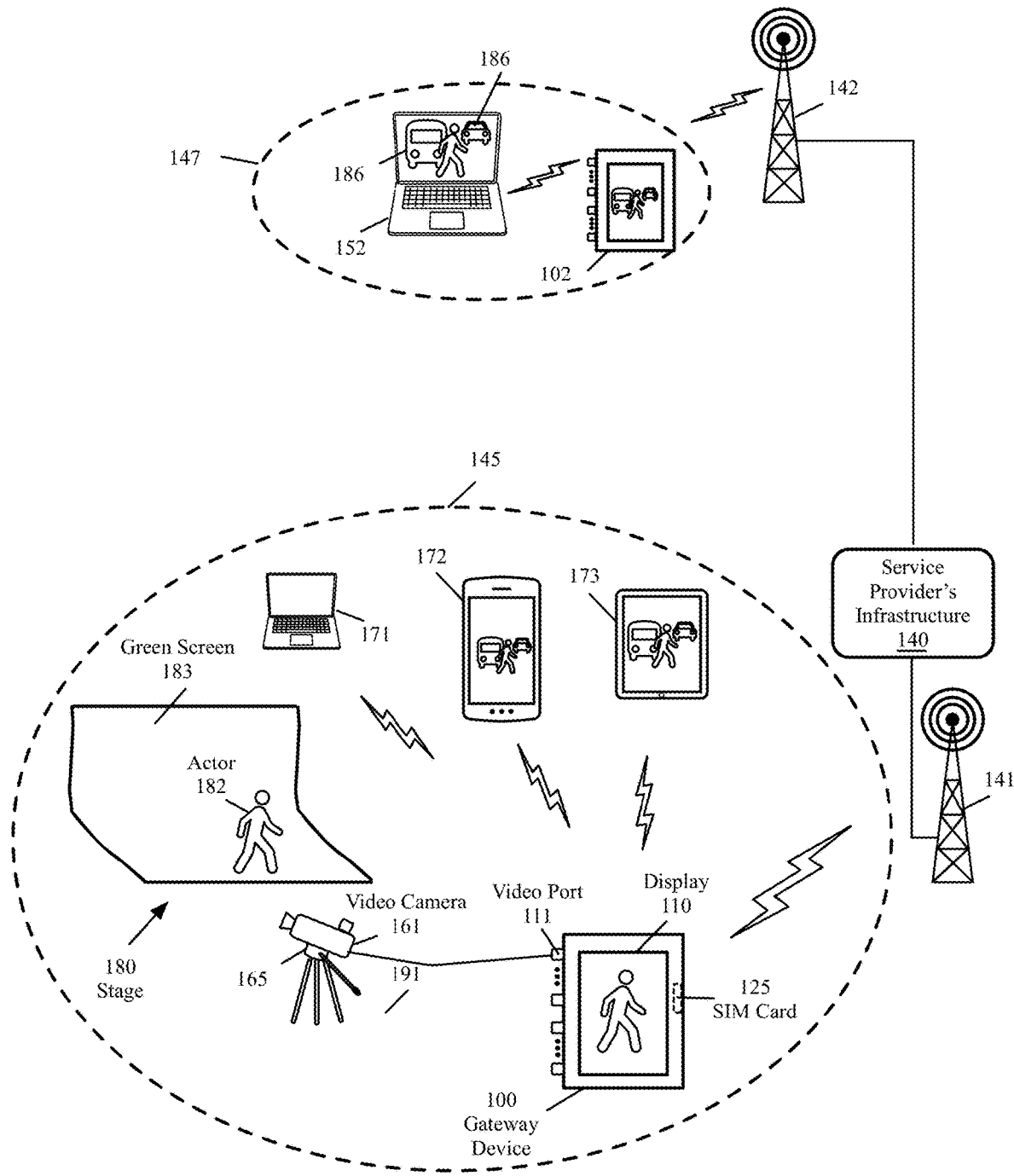

FIGS. 5A and 5B are functional block diagrams illustrating an example system where the gateway devices are used for real-time collaboration during film production, according to various aspects of the present disclosure. The gateways devices 100-101, the video camera 161, the service provider's network components 140-142, and the electronic devices 151 and 171-173 are as described above with reference to FIG. 1A.

In the example of FIGS. 5A-5B, a green screen 183 is set up in the background of the filming stage 180. Uniformly colored screens, such as green or blue screens, are used for compositing (or layering) two video streams together. The technique, referred to as chroma key compositing (or chroma keying), is used to remove the background from the subject of a video. As long as the subject(s) 182 in the foreground do not have the same color as the background screen 183, the background may be replaced during postproduction with any desired background.

With reference to FIG. 5A, the video captured by the video camera 161 is livestreamed to one or more destination devices, including the electronic device 151. The prior art gateways receive content packets and forward them to a destination, without storing the content. Unlike the prior art gateways, the gateways devices 100-101 of some of the present embodiments, may store a copy of the video content that is being livestreamed. For example, the content may be stored in permanent storage associated with the gateway device.

The electronic device 151 may request the gateway device 101 to send (or the gateway device 101 may be configured to automatically send) a copy of the stored content to the electronic device 151. In addition, or alternatively, the electronic device 151 may include video editing software that may store a copy of the livestreamed video content. The user of the electronic device 151 may then edit the content and send the edited content back to the gateway 100 in order for the production personnel in the field to see the edited content.

With reference to FIG. 5B, the user of the electronic device 152 may, for example, be an effect artist, and may edit the video content to add effect on it by replacing the image 184 (FIG. 5A) of the green screen 183 with different content 186. The electronic device 152 may then send back the edited content through the gateway devices 101 and 100 back to the local network 145 where the filing is being shot.

Figure 5C:
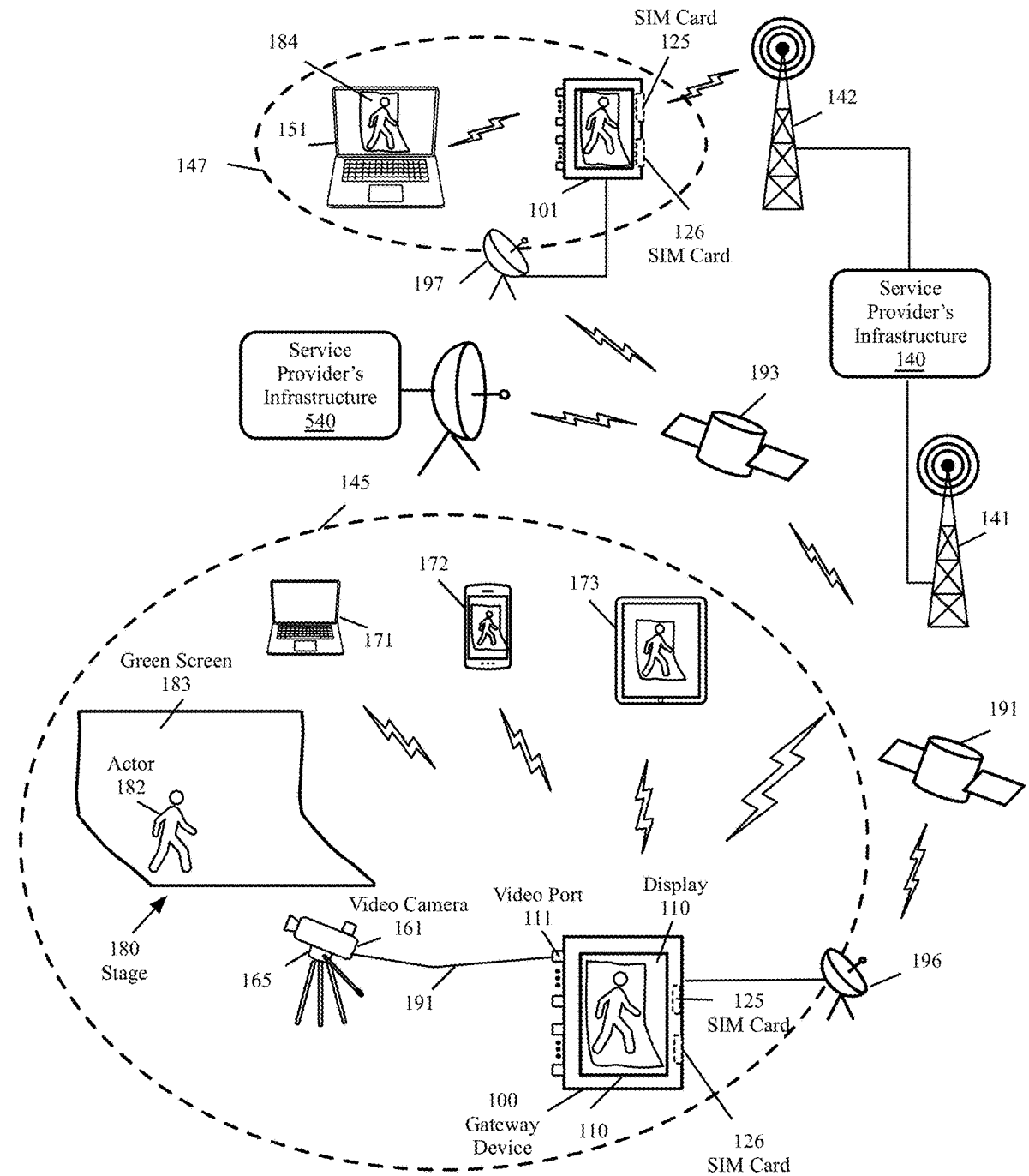
FIGS. 5C and 5D are functional block diagrams illustrating an example system where the gateway devices are used for real-time collaboration during film production and communicate with each other over networks serviced by multiple service providers, according to various aspects of the present disclosure.
Figure 5D:
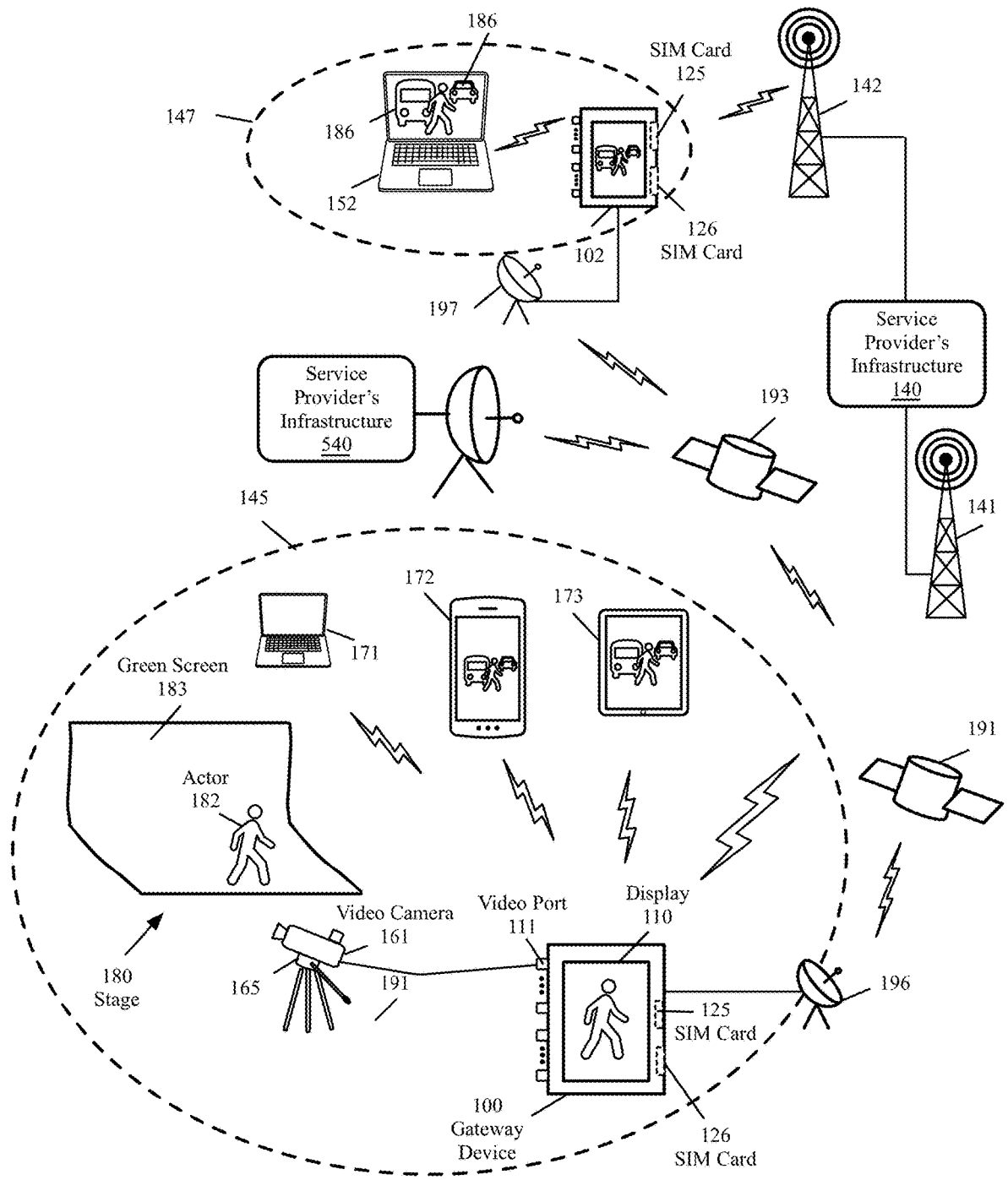

FIGS. 5C and 5D are functional block diagrams illustrating an example system where the gateway devices are used for real-time collaboration during film production and communicate with each other over networks serviced by multiple service providers, according to various aspects of the present disclosure. FIGS. 5C and 5D may be similar to FIGS. 5A and 5B, respectively, except that the gateway devices 100 and 101 in FIGS. 5C and 5D include multiple identification cards 125-126 (e.g., multiple SIM cards) and simultaneously communicate with each other over multiple networks.

In the example of FIGS. 5C-5D, the gateway device 100 may be configured to send the particular content (e.g., the live video content) over the network that includes the satellites 191-193 and the service provider infrastructure 540. For example, at the location where the gateway 100 is being used, the satellite network may have a better bandwidth. The gateway device 101 is configured to send the particular content (e.g., the edited video content) over the network that includes wireless network that includes the cellular tower 141. For example, at the location where the gateway 101 is being used, the wireless network may have a better bandwidth. Both gateways 100 and 101 may be configured to receive content over either of the two networks.

The electronic devices 172 and 173 may receive and display the edited content, giving their users the opportunity to see what the end results may look. The electronic devices that receive the edited content may display the edited content as a single screen or as a split screen along with the unedited content.

Figure 6:
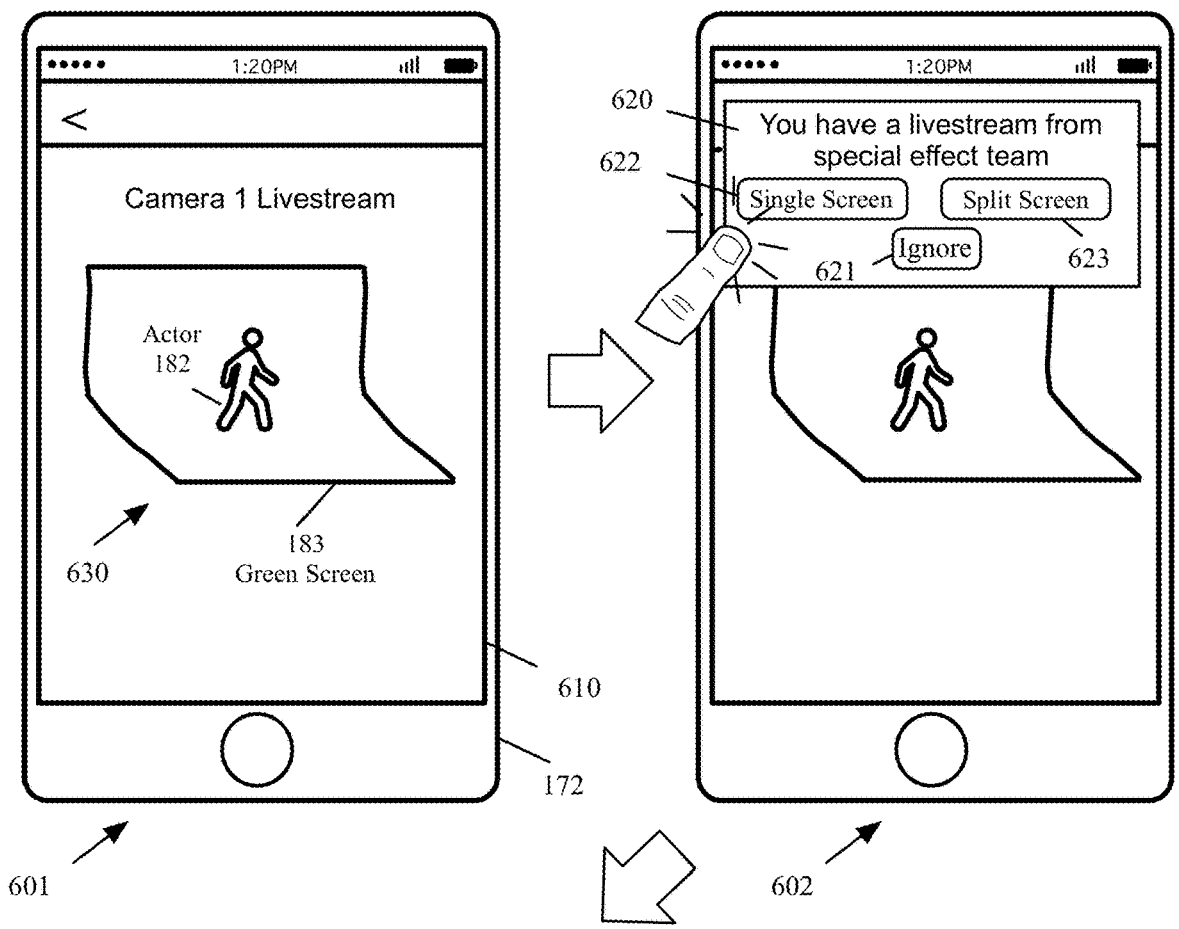
FIG. 6 is a schematic front view of an electronic device that displays the edited version of livestream video content, according to various aspects of the present embodiments.
Figure 6:
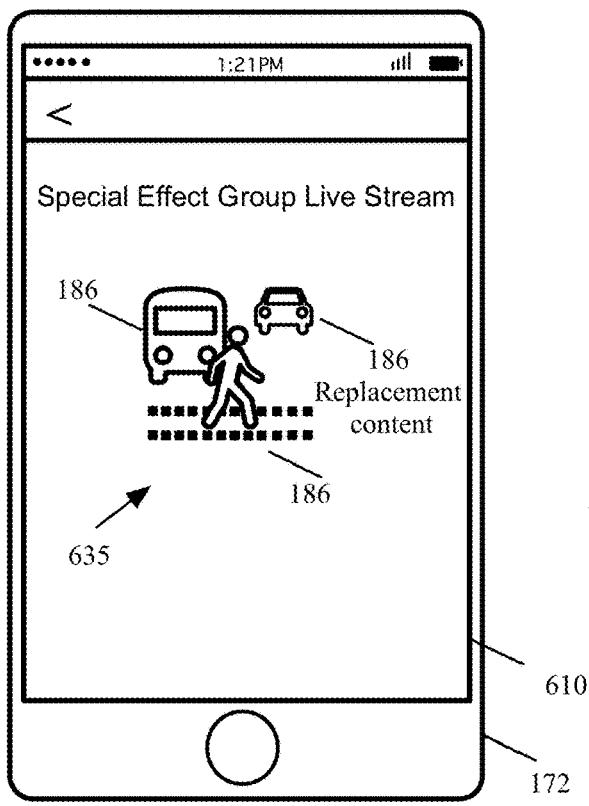

FIG. 6 is a schematic front view of an electronic device that displays the edited version of livestream video content, according to various aspects of the present embodiments. The figure illustrates, through three stages 601-603, an electronic device 172 displaying livestream content from a filming camera, receiving a notification 620 about receiving an edited version of the livestream, and displaying the edited livestream.

With reference to FIG. 6, stage 601 shows the livestream 630 from a video camera (e.g., the video camera 161 of FIG. 5A) being displayed on a display (e.g., a touch screen) 610 of the client device 172. The client device 172 may, for example and without limitations, belong to a member of a production team participating in recording a scene on the stage 180 of FIGS. 5A-5B.

In stage 602, the client device 172 may receive a notification message 620 about a livestream being available from the special effect team. For example, the livestream may be an edited version of the livestream 630 and may have been received from the electronic device 152 of FIGS. 5A-5B as a livestream. The notification 620 may provide an option 621 for ignoring the notification, an option 622 for displaying the new livestream (in this example the edited version of the livestream 630 received from the special effect team), and an option 623 to display both the unedited and the edited versions of the livestream on a split screen.

As shown in stage 602, the client device 172 may receive a section of the option 622 for displaying the livestream received from the special effect team. In stage 603, the edited version 635 of the livestream that is received from the special effect team is displayed on the display 610 of the client device 172. The edited version 635 may be a livestream that is sent from the gateway device 102 (FIGS. 5A-5B) associated with the electronic device 152 and the local network 147.

Figure 7:
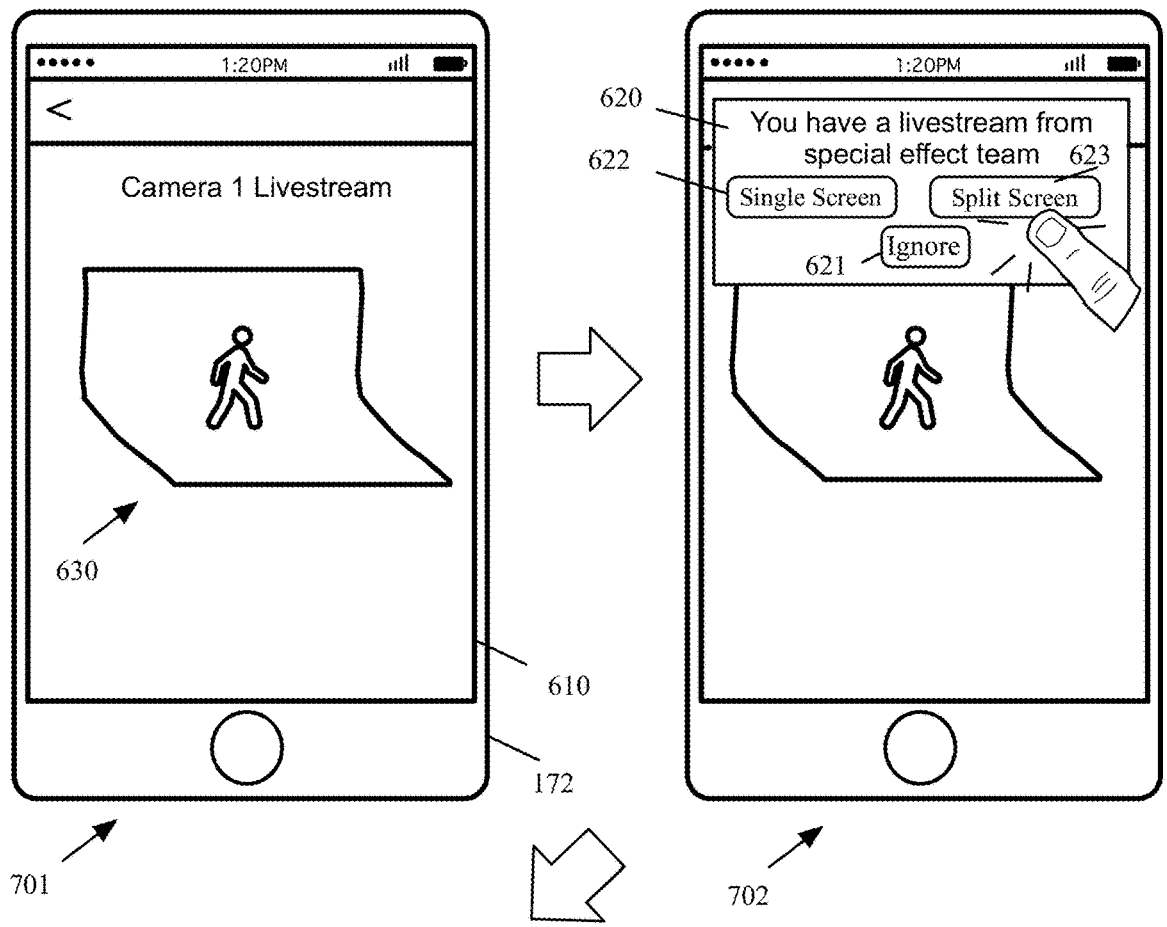
FIG. 7 is a schematic front view of an electronic that simultaneously displays the unedited and edited versions of livestream video content on a split screen, according to various aspects of the present embodiments.
Figure 7:
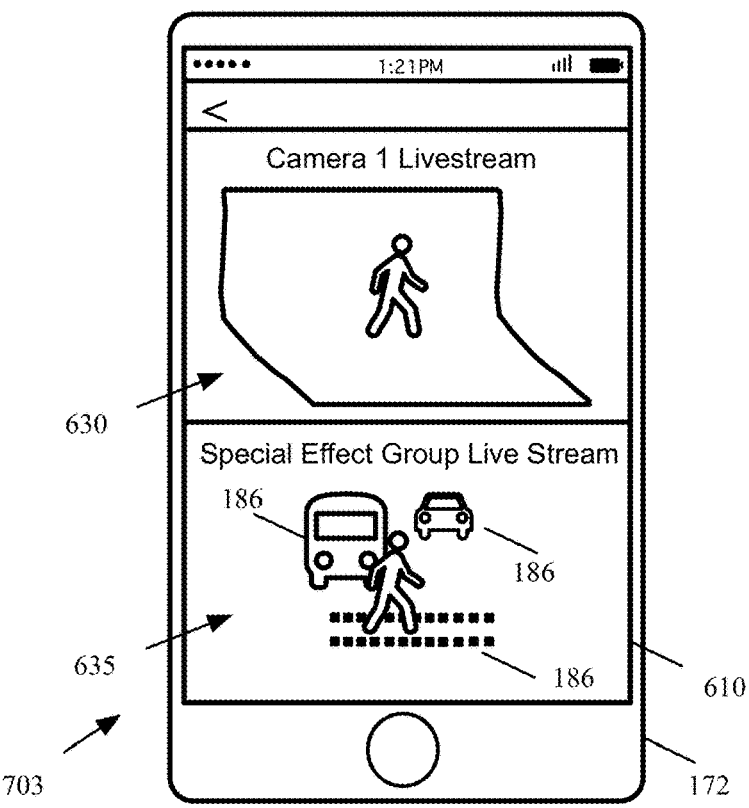

FIG. 7 is a schematic front view of an electronic device that simultaneously displays the unedited and edited versions of livestream video content on a split screen, according to various aspects of the present embodiments. The figure illustrates, through three stages 701-702, a client device 172 displaying livestream content from a filming camera, receiving a notification 620 about receiving an edited version of the livestream, and displaying both the unedited and edited versions of the livestream. on a split screen.

With reference to FIG. 7, stage 701 is similar to stage 601 of FIG. 6. In stage 702, the client device 172 may receive a notification message 620 about a livestream being available from the special effect team. For example, the livestream may have been received from the electronic device 152 of FIGS. 5A-5B. The notification 620 may provide similar options 621-623 as stage 602 of FIG. 6.

As shown in stage 702, the client device 172 may receive a section of the option 623 for simultaneously displaying the unedited and the edited versions of the livestream on a split screen. In stage 703, both the unedited version 630 and the edited version 635 of the livestream are being displayed on the display 610 of the client device 172. The livestream 630 is broadcasted by the gateway 100 and the livestream 635 is broadcasted by the gateway 101 and is transmitted to the client device 172 by the gateway device 100.

Although the examples of FIGS. 6-7 show the display of a client device 172, the gateway device 100 may also show similar options 621, 622, and 623 and upon the selection of an option, the gateway device 100 may perform the corresponding action of ignoring the notification, displaying the edited version of the livestreamed video content, or simultaneously displaying both the edited and unedited version.

In the past, the production video content had to be recorded and either be physically shipped to or digitally transmitted through non-real time means to the postproduction facilities, often long after the filming of a particular scene had ended. In the example of FIGS. 5A-7, the production personnel (e.g., the users of electronic devices 172 and 173) are able to see how the green screen may be replaced and how the replacement content 186 may look while filming is still going on, giving them an opportunity to improve upon what being filmed, which is often a big problem with green screen shots.

Figure 8:
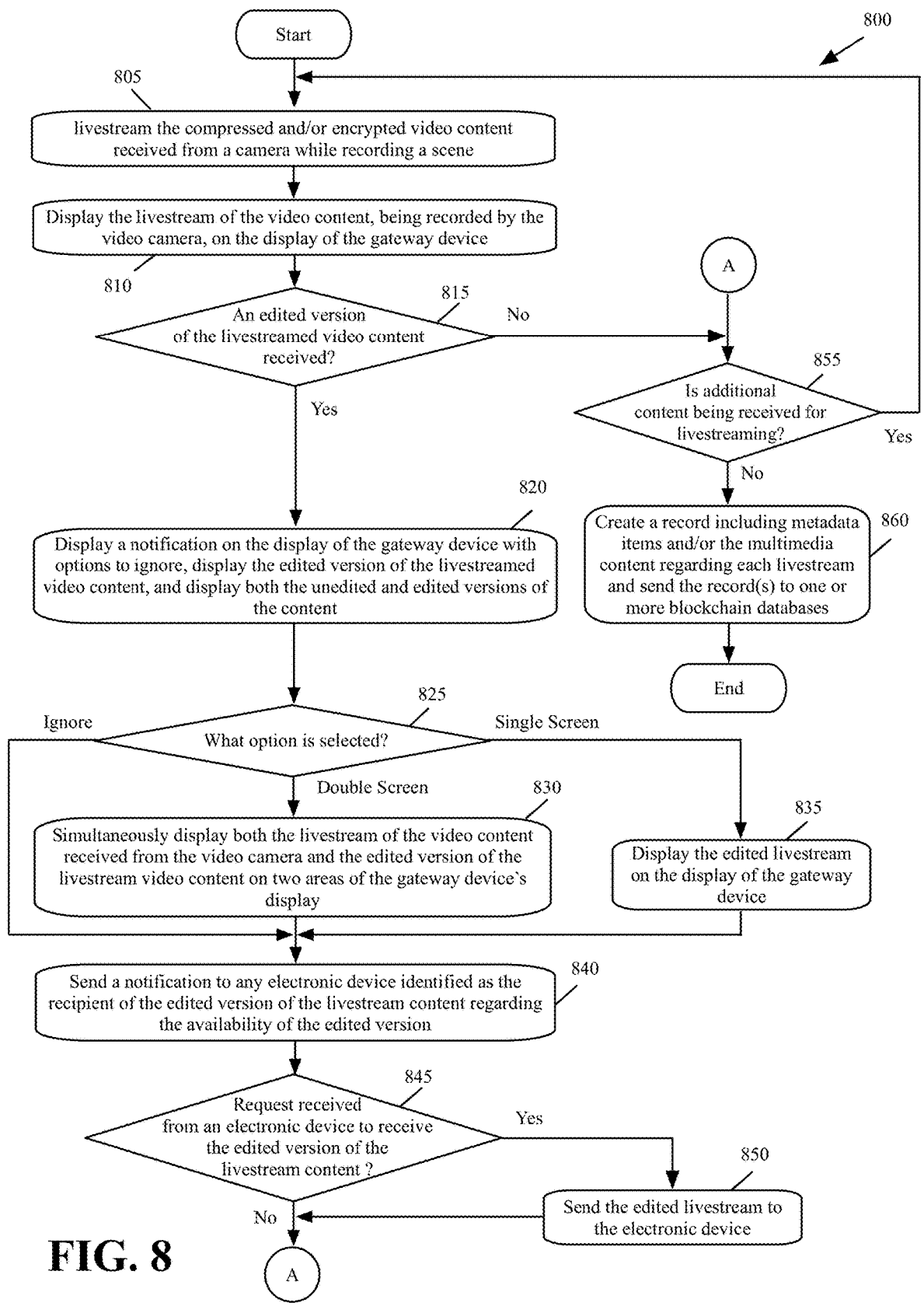
FIG. 8 is a flowchart illustrating an example process for receiving and transmitting a livestream of edited content by a gateway device, according to various aspects of the present embodiments.

FIG. 8 is a flowchart illustrating an example process 800 for receiving and transmitting a livestream of edited content by a gateway device, according to various aspects of the present embodiments. In some of the present embodiments, the process 800 may be performed by one or more processing elements of a gateway device 100-102 (FIGS. 1, and 5A-5B).

With reference to FIG. 8, the process 800 may livestream (at block 805) the compressed and/or encrypted video content received from a camera while recording a scene. For example, the gateway device 100 of FIG. 1A may receive raw video content received from the camera 161 that is attached to the gateway device 100 and may livestream it as described with reference to process 400 of FIG. 4.

The livestream of the video content, being recorded by the video camera, may be displayed, at block 810, on the display of the gateway device. For example, the gateway device 100 may display the content being recorded by the video camera 161 on the display 110 of the gateway device 100.

At block 815, a determination may be made whether an edited version of the livestream video content is received. For example, with reference to FIG. 5B, the gateway device 102 may receive edited content from the electronic device 152 and may broadcast the livestream. The gateway device 100 may determine (at block 815) whether a livestream of such edited content is received.

When a determination is made that an edited version of the livestream video content is not received, a determination may be made (at block 855) whether additional content is being received for livestreaming. When additional content is being received for livestreaming, the process 800 may proceed back to block 805, which was described above. Otherwise, a record may be created (at block 860) that may include metadata items and/or the multimedia content regarding each livestream and the record(s) may be sent (at block 860) to one or more blockchain databases. For example, the process 800 may create and send the records as described above with reference to blocks 430-435 of FIG. 4. The process 800 may then end.

When a determination is made (at block 815) that an edited version of the livestream video content is received, a notification may be displayed (at block 820) on the display of the gateway device with options to ignore, display the edited version of the livestreamed video content, and display both the unedited and edited versions of the content. For example, the gateway device 100 may display the notification 620 and the options 621-623 as described above with reference to FIGS. 6-7.

At block 825, the option that is selected may be determined. When it is determined (at block 825) that the ignore option is selected, the processing may proceed to block 840, which is described below. When it is determined (at block 825) that the single screen option is selected, the edited livestream may be displayed (at block 835) on the display of the gateway device. For example, the edited livestream 635 may be displayed on the display of the gateway device as described above with reference to stage 603 of FIG. 6. The processing may then proceed to block 840, which is described below.

When it is determined (at block 825) that the double screen option is selected, both the compressed livestream of the video content received from the video camera and the edited version of the livestream video content may simultaneously be displayed (at block 830) on two areas of the gateway device's display. For example, the livestream 630 of the content being recorded by the camera and the edited livestream 635 may be displayed on the display of the gateway device as described above with reference to stage 703 of FIG. 7.

At block 840, a notification may be sent to any electronic device identified as the recipient of the edited version of the livestream content regarding the availability of the edited version. For example, the gateway device 100 may identify the electronic devices 172-173 in the local network 145 of FIG. 5B as the recipients of the edited livestream and may send (at block 840) a notification to the electronic devices 172-173 that an edited livestream has been received.

At block 845, a determination may be made whether a request is received from an electronic device to receive the edited version of the livestreamed content. For example, in response to the receiving of a notification from gateway device 100 regarding the availability of the edited livestream, a client device such as the client device 172 of FIGS. 5A-7 may display a notification such as the notification 620 of FIGS. 6-7 and may send a request to the gateway device to receive the edited livestream if a selection of the option 622 or the option 623 is received as shown in stages 602 of FIG. 6 and stage 702 of FIG. 7.

When a determination is made (at block 845) that a request is not received from an electronic device to receive the edited version of the livestreamed content, the processing may proceed to block 855, which was described above. Otherwise, the edited livestream may be sent (at block 850) to the electronic device. For example, the gateway 100 (FIG. 5B) may send the edited livestream received from the gateway 101 to the electronic device 172. The processing may then proceed to block 855, which was described above.

Figure 9A:
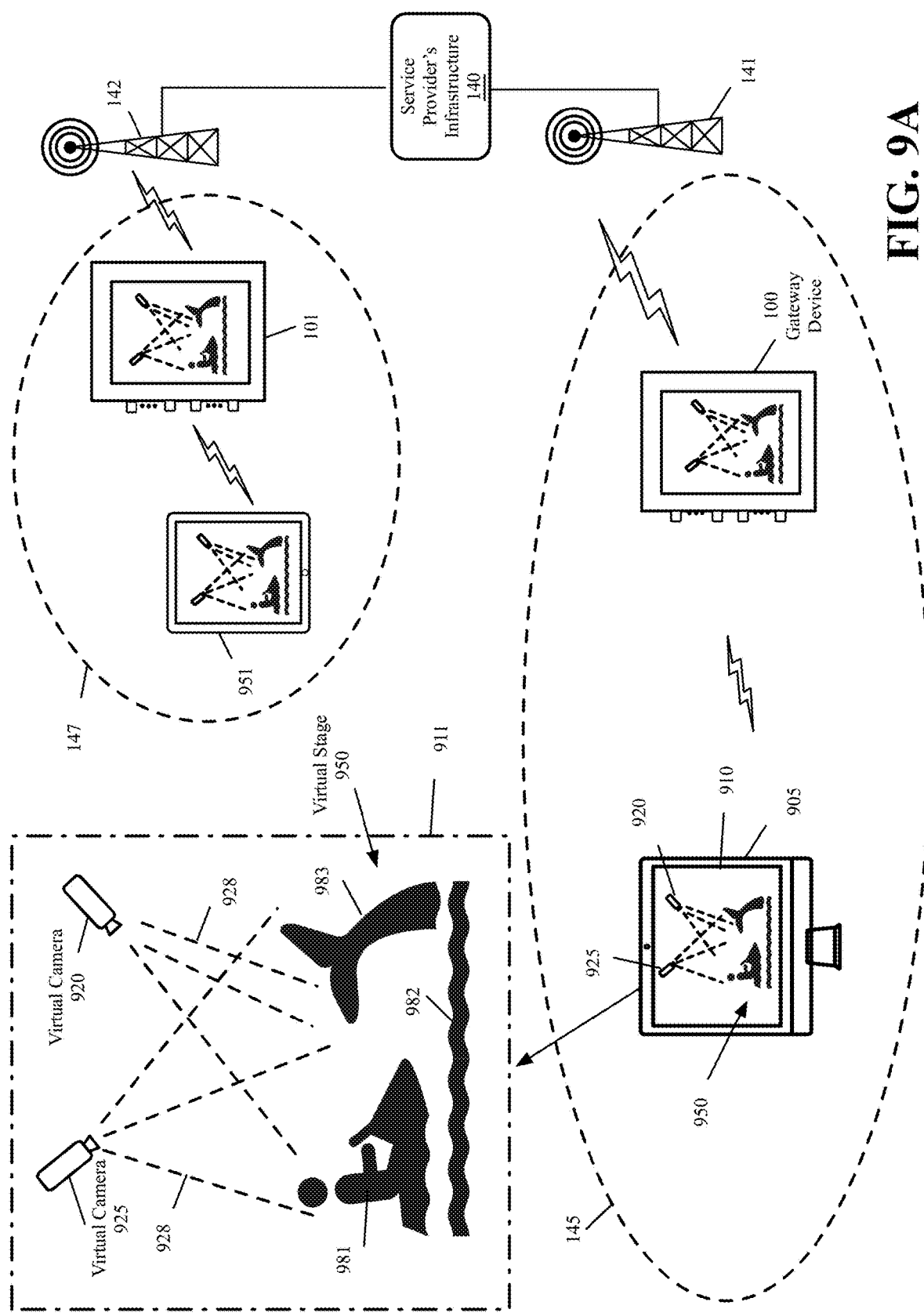
FIG. 9A is a functional block diagram illustrating an example system where a gateway device provides support for virtual productions environments and communicates over a cellular network, according to various aspects of the present disclosure.
Figure 9B:
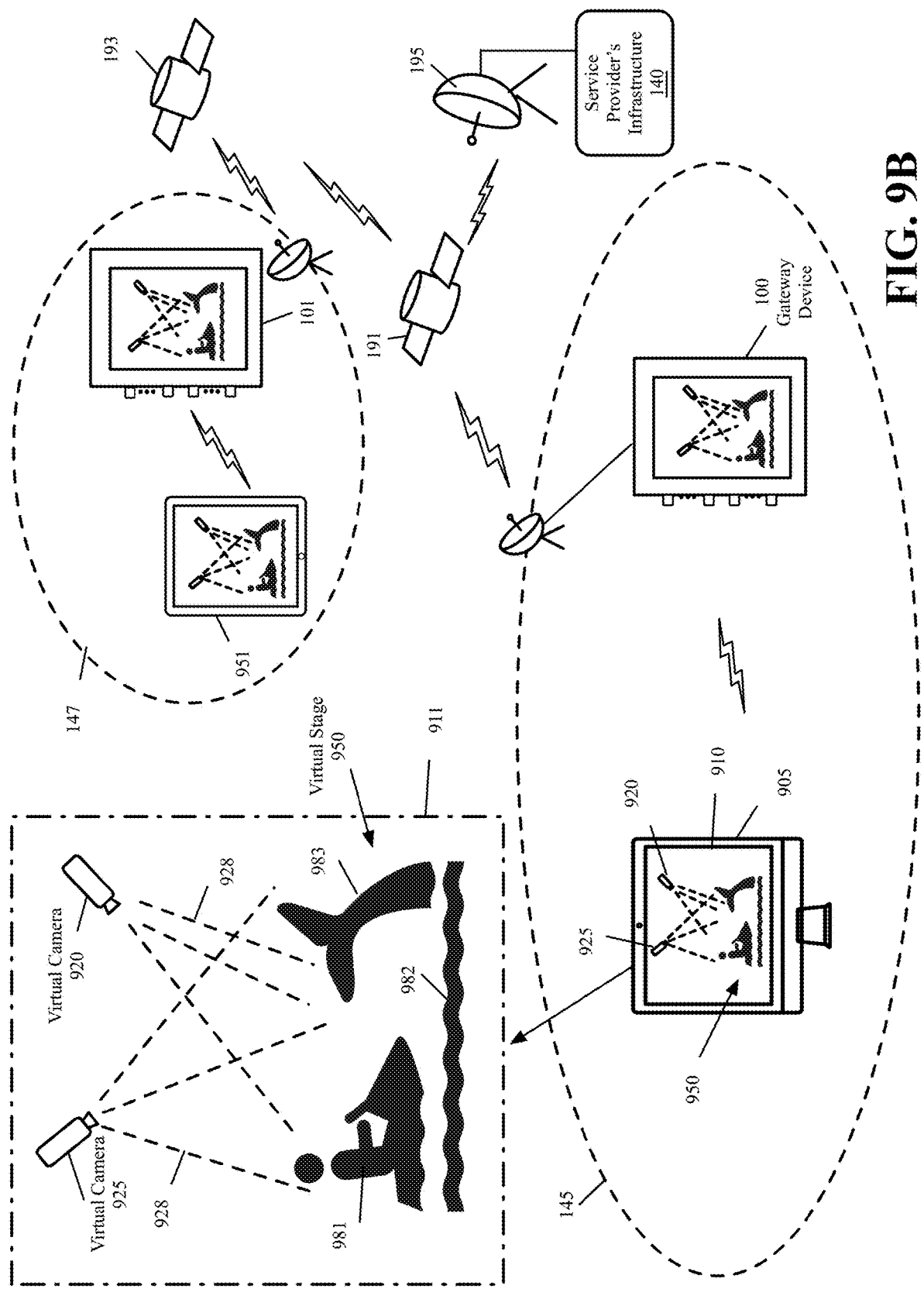
FIG. 9B is a functional block diagram illustrating an example system where a gateway device provides support for virtual productions environments and communicates over a satellite network, according to various aspects of the present disclosure.

In addition to accommodating the physical movie production environments, the gateway device may accommodate virtual production environments such as virtual stages and virtual cameras. A virtual production environment may be used for producing video games, computer graphics, AR production, VR production, etc. FIG. 9A is a functional block diagram illustrating an example system where a gateway device provides support for virtual productions environments and communicates over a cellular network, according to various aspects of the present disclosure. FIG. 9B is a functional block diagram illustrating an example system where a gateway device provides support for virtual productions environments and communicates over a satellite network, according to various aspects of the present disclosure.

Two-dimensional (2D) and three-dimensional (3D) virtual production environments may include a virtual stage 950 and one or more virtual cameras 920-925 to provide different views of the virtual stage 950. The position and shape of the objects 981-983 in the virtual stage may be changed by a computer program and/or by inputs received through a user interface of the electronic device that is providing the virtual production environment.

In the example of FIGS. 9A-9B, the gateway device 100 may include an engine (e.g., implemented by hardware, software, and/or firmware) for providing the virtual production environment. The electronic device 905 may be authenticated and authorized to remotely control the virtual production environment provided by the gateway device 100. In addition to, or alternatively, the electronic device 905 may include an engine (e.g., implemented by hardware, software, and/or firmware) for providing the virtual production environment. In either scenario, the electronic device 905 may be connected through the gateway device 100 and one or more network (such as the cellular network of FIG. 9A or the satellite network of FIG. 9B) to one or more corroborating electronic devices 951. The electronic device(s) 951 may be connected to other gateway devices 101 through local networks such as the local network 147.

With reference to FIGS. 9A-9B, the expanded view 911 shows the details of the virtual stage 950, the virtual camera 920-925, and the virtual objects 981-983 that are displayed on the display 910 of the electronic device 905. The virtual stage 950 may simulate real or imaginary scenes. The virtual stage 950 may be rendered based on the virtual cameras' 920-925 views (shown by the dashed lines 928). Each virtual camera may define a viewpoint and a perspective of the view on the virtual objects within the virtual stage. Several corroborating electronic devices 950 and 951 may be producing, editing, and/or exchanging video content with each other.

The scenes rendered in the virtual work environment may be used in movies, TV programs, video games, etc. The scenes rendered in the virtual work environment may be used in producing AR, which is an interactive experience of a real-world environment where the objects that reside in the real-world are enhanced by computer-generated perceptual information. The scenes rendered in the virtual work environment may be used in producing VR, which is a simulated experience that may be similar to or different from the real world. The gateways 100-101 may, in some embodiments, be used to play video games in real-time with many remote participants.

Figure 10A:
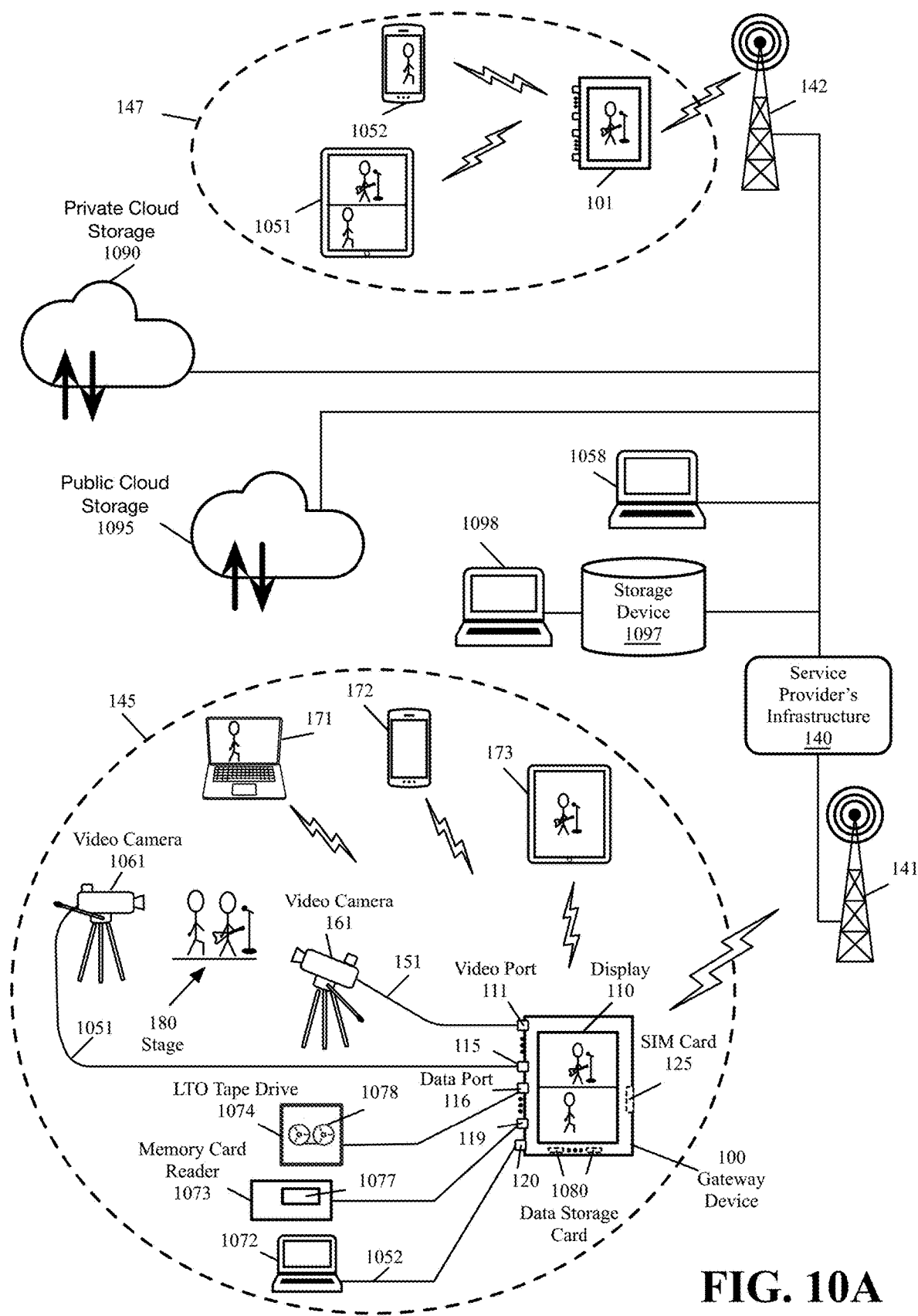
FIG. 10A is a functional block diagram illustrating an example system where a gateway device connects a local network to one or more other networks and performs livestreaming and transfer of pre-recorded raw data from a video production stage to one or more destinations, according to various aspects of the present disclosure.
Figure 10B:
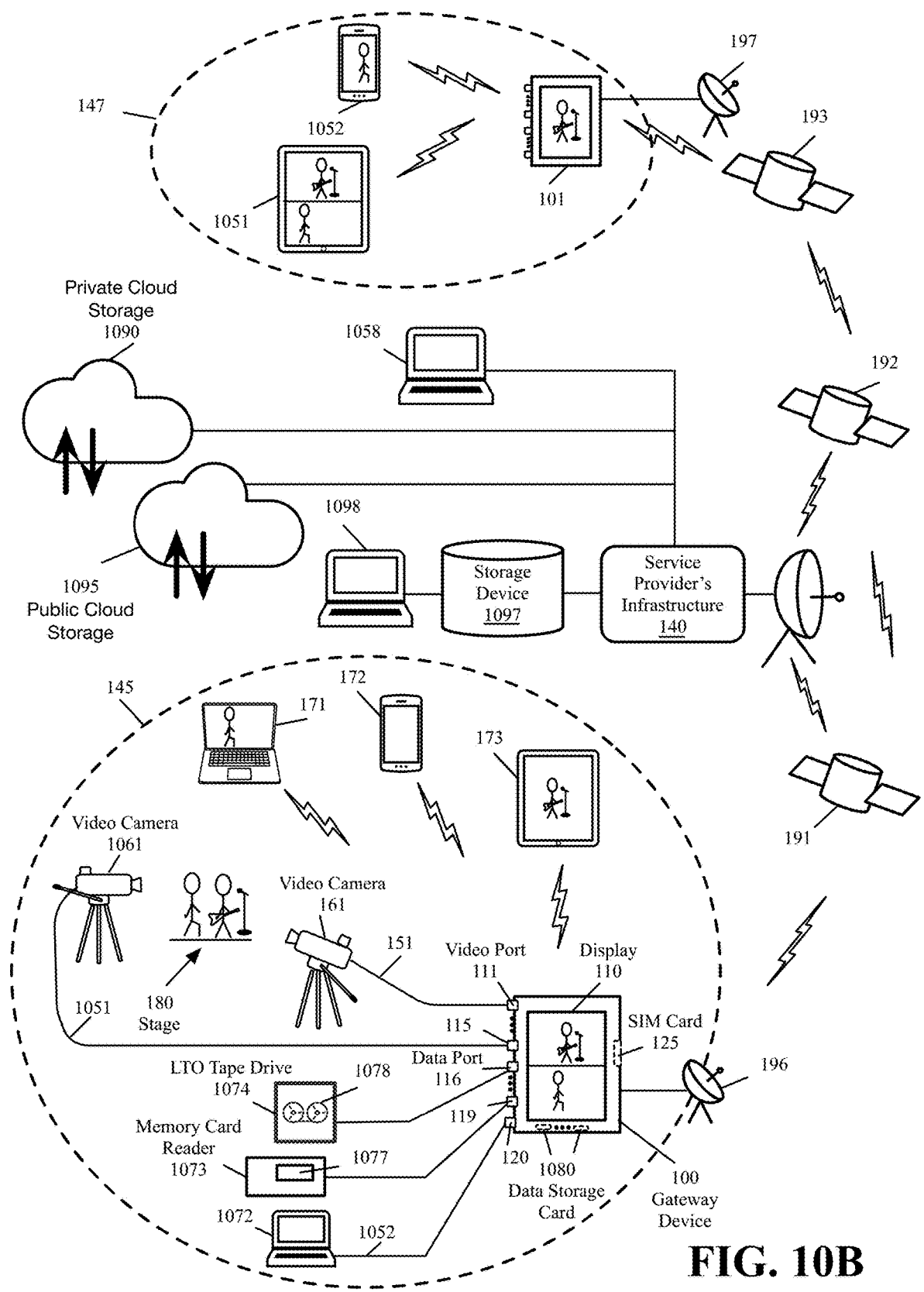
FIG. 10B is a functional block diagram illustrating an example of the system of FIG. 10A, where at least one of the networks is a satellite network, according to various aspects of the present disclosure.

FIG. 10A is a functional block diagram illustrating an example system where a gateway device connects a local network to one or more other networks and performs livestreaming and transfer of pre-recorded raw data from a video production stage to one or more destinations, according to various aspects of the present disclosure. FIG. 10B is a functional block diagram illustrating an example of the system of FIG. 10A, where at least one of the networks is a satellite network, according to various aspects of the present disclosure. The gateway devices 100-101, the components 140-142 of the wireless service provider, and the electronic devices 171-173 are similar to the corresponding devices in FIG. 1A.

With reference to FIGS. 10A-10B, a second video camera 1061 is also recording the performance on the stage 180 from a different angel. The video camera 1061 may be connected to a video port 115 of the gateway device 100 by a wired connection 1051 or may wirelessly communicate with the gateway device 100 if the video camera 1061 has high-speed wireless communication capability. The electronic device 1072 may be connected by a wired connection 1052 to a data port such as the data port 120 of the gateway device 100 for transferring large pre-recorded raw video content.

With further reference to FIGS. 10A-10B, a memory card reader 1073 may be connected to a data port, such as the data port 119, and a linear tape-open (LTO) tape drive 1074 may be connected to a data port, such as the data port 116. The data port 116 may be a high speed data port such as, for example, and without limitations, a Thunderbolt data port, a fiber data port, a USB-C data port, SFP port, etc. The memory card reader 1073 may include a memory card 1077 containing footage recorded from the stage 180 by a video camera, such as the video camera 161, or the video camera 1061. The video cameras' memory cards may be backed up in LTO tapes 1078 per media and entertainment industry requirements. The gateway device 100 may include one or more removable data storage cards 1080, such as, for example, and without limitations, one or more secure digital cards (SD-cards), one or more nonvolatile memory express (NVMe) cards, one or more solid-state drive (SSD) cards, etc.

The LTO is a magnetic tape data storage technology that is developed as an open standard. The LTO consortium oversees the development, licensing, and certification of the LTO tapes and LTO drives. The LTO tapes are used by the media and entertainment industry to store the raw data captured by cameras on set. The LTO tapes are designed to provide reliability and durability (e.g., in the order of 20 to 30 years of shelf life). An LTO tape is enclosed in a cartridge that has a memory chip inside. The LTO drives include a cartridge memory reader.

In the past, the memory cards containing video footage recorded by the video cameras were sent to a backup facility that would back up the memory cards into the LTO tapes. The LTO tapes where then sent to other destinations (e.g., to an editor) to start the postproduction process. Backing up the memory cards, generating the LTO tapes, and sending the LTO tapes to postproduction facilities have been a disconnected and time consuming process. In contrast, some of the present embodiments provide for simultaneous backing up of the video cameras' memory cards into the LTO tapes and transmission of the memory card contents to one or more destinations while the memory cards are being backed up.

In the example of FIGS. 10A-10B, the LTO drive 1073 may include an LTO tape 1078 that is used to back up the contents of a memory card 1077 inserted in the memory card reader 1073. The gateway device 100 may provide a user interface to allow the selection of one or more files stored in the memory card 1077 to be backed up on the LTO tape 1078. The gateway device 100 may receive the raw video content stored in the memory card 1077 through the data port 119 and store the raw video content in the LTO tape 1078 through the data port 116. The gateway device 100 may store the raw video content in the LTO tape with checksum verification (e.g., MD5 or XXhash checksums).

The gateway device 100 may simultaneously (e.g., as the raw video content is being recorded to the LTO tape 1078) send the raw video content received from the memory card 1077 and/or from the removable data storage cards 1080 to one or more destinations such as the storage device 1097, the electronic device 1058, the private cloud storage 1090, and/or the public cloud storage 1095. The examples of public cloud storage services include, without limitations, Google Cloud Platform public storage service, Amazon S3 public cloud storage, and Microsoft Azure public storage service. The gateway device 100 may create a record including metadata items regarding the transferred raw data and may send the record(s) to one or more blockchain databases. For example, gateway device 100 may create and send the records as described above with reference to blocks 430-435 of FIG. 4.

The gateway device 100 may simultaneously livestream several video contents by compressing, encrypting, and broadcasting the video data being captured by several cameras such as, for example, and without limitations, the cameras 161 and 1061. The destination devices may display one or both livestreams. For example, the gateway device 100 itself may be configured by a user such as an administrator to display both livestreams. Some of the electronic devices, such as the electronic device 1051 may also simultaneously display both livestreams.

Some of the gateway devices such as the gateway device 101 and some of the electronic devices such as the electronic device 173 may be configured to only display the livestream of the video content captured by the camera 161. Some of the gateway devices (not shown) and some of the electronic devices such as the electronic devices 171 and 1052 may be configured to only display the livestream of the video content captured by the camera 1061.

With further reference to FIGS. 10A-10B, the gateway device 100 may receive data files from one or more electronic devices such as the electronic device 1072, wirelessly or through data ports such as the data port 120. The gateway device 100 may send the data files to one or more destinations such as the storage device 1097 (which may be connected to one or more electronic devices 1098 in a home, an office, a datacenter, etc.), the electronic device 1058 (which may be in a home, in an office, in a datacenter, etc.), the private cloud storage 1090, and/or the public cloud storage 1095. The data files may be sent through one or more networks, such as, for example, and without limitations, the cellular network of FIG. 10A and/or the satellite network of FIG. 10B.

The gateway device 100 may create a record including metadata items regarding the transferred data files and/or the contents of the transferred files, and may send the record(s) to one or more blockchain databases. For example, the gateway device 100 may create and send the records as described above with reference to blocks 430-435 of FIG. 4.

Figure 11:
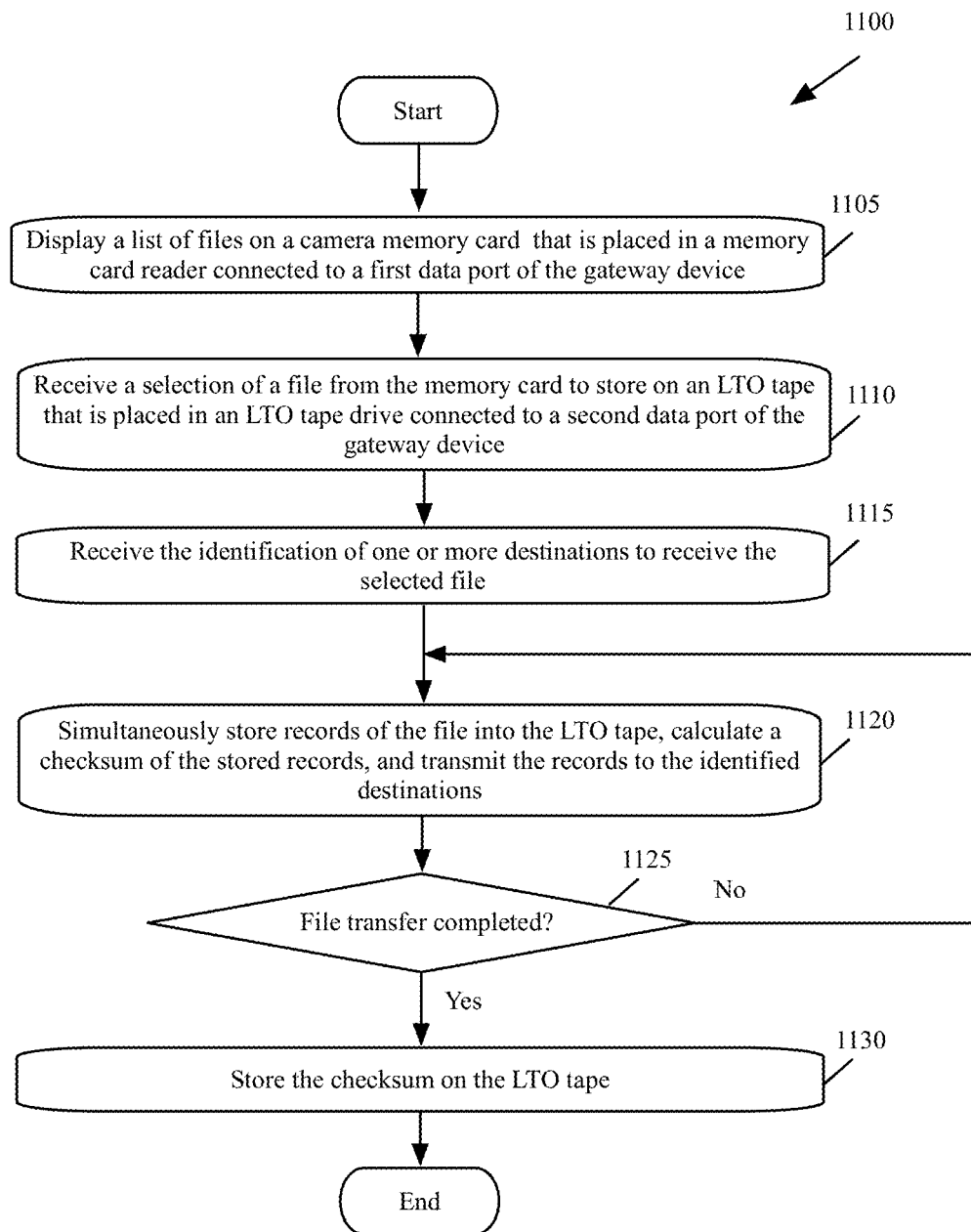
FIG. 11 is a flowchart illustrating an example process for simultaneously backing up a file from a video camera's memory card to an LTO tape and transmitting the file to one or more destinations by a gateway device, according to various aspects of the present embodiments.

FIG. 11 is a flowchart illustrating an example process 1100 for simultaneously backing up a file from a video camera's memory card to an LTO tape and transmitting the file to one or more destinations by a gateway device, according to various aspects of the present embodiments. In some of the present embodiments, the process 1100 may be performed by one or more processing elements of a gateway device 100-101 (FIGS. 10A-10B).

With reference to FIG. 11, a list of files on a camera memory card that is placed in a memory card reader connected to a first data port of the gateway device may be displayed (at block 1105). For example, the list of the files on the memory card 1077 (FIGS. 10A-10B) in the memory card reader 1073 connected to the data port 119 may be displayed on the display 110 of the gateway 100.

The process 1100 may receive (at block 1110) a selection of a file from the memory card to store on a tape storage such as an LTO tape that is placed in an LTO tape drive connected to a second data port of the gateway device. For example, the process may receive a selection of a file, through a user interface of the gateway 100, to be stored on the LTO tape 1078 that is placed in the LTO tape drive 1074 connected to the data port 116.

The process 1100 may receive (at block 1115) the identification of one or more destinations to receive the selected file. For example, the process 1100 may receive the identification of one or more of the public cloud storage 1090, the private cloud storage 1095, the storage device 1097, and/or the electronic device 1058 of FIGS. 10A-10B to receive the selected file.

The process 1100 may then simultaneously store (at block 1120) records of the selected file into the LTO tape, calculate a cumulative checksum of the stored records, and transmit the records to the identified destinations. The process 1100 may then determine (at 1125) whether the file transfer is completed. If not, the process may proceed back to block 1120 to continue the file backup and transfer. Otherwise, the process may store (at block 1130) the checksum on the LTO tape. The process 1100 may then end.

It should be noted that, the gateway device of the present embodiments may be simultaneously livestreaming one or more video streams at the same time as the process 1100 is performed. For example, the gateway device may simultaneously livestream one or more video streams while the gateway device, at block 1120, stores the records of the file into the LTO tape, calculates the checksum of the stored records, and transmit the records to the identified destinations.

The video ports 111, the data ports 116-120, and the RF transceivers of the gateway device 100, in some embodiments, may be replaceable and/or exchangeable. For example, a video port may be removed and replaced by a data port or by another video port of the same or different type. A data port may be removed and replaced by a video port or by another data port of the same or different type. An RF transceiver may be removed and replaced by another RF transceiver. In some embodiments, a video port, a data port, or an RF transceiver may be removed from a corresponding port slot and a video port, a data port, or an RF transceiver may be inserted into the empty port slot.

Figure 12:
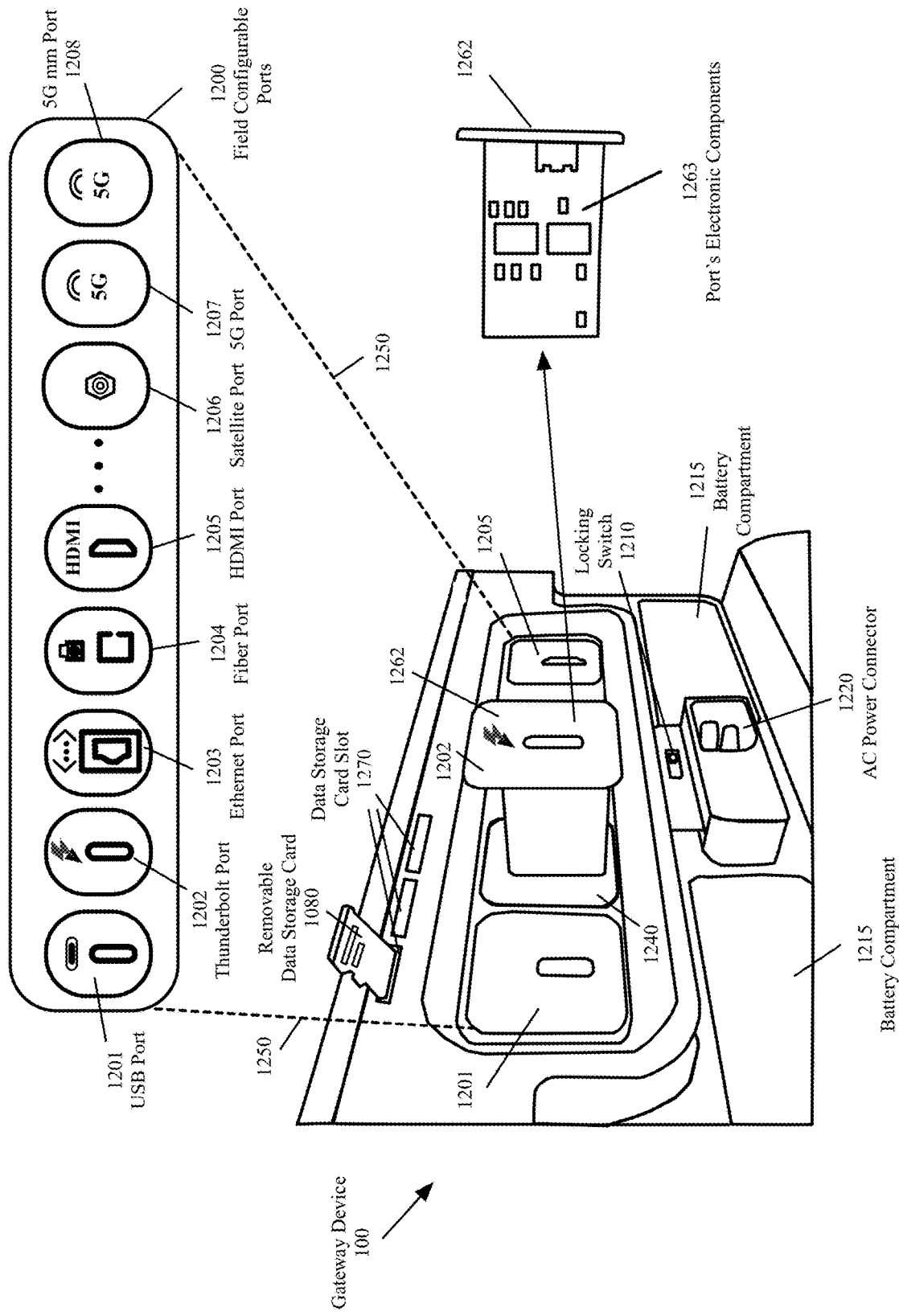
FIG. 12 is a back perspective view of a portion of a gateway device illustrating an example of a set of ports that may be used to receive video ports, data ports, or RF transceivers, according to various aspects of the present embodiments.

FIG. 12 is a back perspective view of a portion of a gateway device illustrating an example of a set of ports that may be used to receive video ports, data ports, or RF transceivers, according to various aspects of the present embodiments. As shown in the expanded view 1250, the gateway device 100 may include a set of field configurable ports 1200. In the example of FIG. 12, the set of field configurable ports 1200 may include a USB port 1201, a thunderbolt port 1202, an Ethernet port 1203, a fiber port 1204, an HDMI port 1205, a satellite transceiver 1206, a 5G transceiver 1207, and a 5G mm transceiver 1208.

The RF transceiver may be, for example, and without limitations, cellular (e.g., 3G, 4G, LTE, 5G, 5G mm), satellite, Wi-Fi, Bluetooth, etc., transceivers. The RF transceivers may be swapped based on the particular application and particular location where the gateway device 100 is being used. Multiple RF transceivers may be used by a gateway device at the same time.

The use of replaceable RF transceiver modules provides the following technical advantages. The RF transceiver technologies change and improve over time and it provides an advantage not to lock into one version. Modularizing allows for field unit communication capabilities to be easily updated. For example, the frequencies and antenna counts of Wi-Fi have changed over time, improving speed and distances. The outdoor Wi-Fi uses millimeter wave and may run at up to 20 Gbit/s.

As another example, the cellular wireless technology has improved over the years and different technologies, such as, at 3G, 4G, LTE, 5G, 5G mm wave have become available. Additional technologies may become available in future. Modularized solutions for communication via satellite may become available. As another example, technologies are regional. The cellular services and technologies for Asia Pacific (APAC), Europe, Middle East, and Africa (EMEA), and North, Central, and South America (AMER) vary and require different RF transceivers.

The gateway device 100, in some of the present embodiments, may use standardized card form factors with a single RF transceiver board design to support multiple technologies. The Wi-Fi and cellular modules currently exist in standardized form factors such as mini peripheral component interconnect express (PCIe) and M.2.

Although five audio/video ports are shown in the example of FIG. 12, other embodiments may include more than five audio/video ports, may include less than five audio/video ports, may include different types of audio/video ports, and/or may include multiple audio/video ports of the same type. Although three RF transceivers are shown in the example of FIG. 12, other embodiments may include more than three RF transceivers, less than three RF transceivers, and/or may include different types of RF transceivers.

The gateway device 100 may include a locking mechanism 1210 that may be used to lock the ports 1201-1208 and the associated electronic components in their associated port slots. The locking mechanism 1210 may be, for example, and without limitations, a locking switch used to unlock the ports 1201-1208, the RF transceiver connectors 1206, and the associated electronic components such that a port and the associated electronic components, or an RF transceiver connector and the associated electronic components, may be removed.

Instead of having the locking mechanism 1210, in some embodiments, the ports 1201-1208 and the RF transceiver connectors 1206 may be inserted into the slots by applying pressure. The ports 1201-1208 and the RF transceiver connectors 1206 may be removed from the slots by pulling the ports 1201-1208 and the RF transceiver connectors 1206 from their corresponding slots.

As shown in the example of FIG. 12, the thunderbolt port 1202 may be removed from its slot 1240, for example, and without limitations, by pressing on the front of the port enclosure 1262 after the locking switch 1210 is unlocked. Removing a port and the associated electronic components may create an empty port slot 1240 that may receive another port and the associated electronic as described above.

For example, the thunderbolt port 1202 may be removed and replaced by an HDMI port in order to allow two cameras with HDMI outputs to be directly connected to the gateway device 100. In this example, if more than two cameras are being used on a movie set, other ports, such as the USB port 1201, the Ethernet port 1203, and/or the fiber port 1204 may also be removed and replaced with HDMI ports to allows several cameras to be connected to the gateway device 100.

As another example, in some settings such as the example of FIGS. 10A-10B, multiple data ports may be needed to simultaneously transmit multiple files. In this example, some of the existing ports may be removed to empty the corresponding slots and the required data ports (e.g., and without limitations USB-C ports, fiber ports, etc.) may be inserted in the emptied slots. In general, the gateway device 100 may be configured in the field to include any combination of data ports and video ports by unlocking the locking switch 1210, pulling out the ports that are not needed, and inserting the needed ports. Removing one type of port and replacing it with another type of port may be done in the field without any special tools and/or without changing the backplane hardware (other than the ports that are being removed from or installed in the port slots).

As another example, when the gateway device 100 may be used in different locations and different media production projects may require different bandwidth and latencies. In this example, some of the RF transceiver connectors 1206 may be removed and may be replaced by different types of RF transceiver connectors to meet the requirements of the particular media production projects and the infrastructure available at each location.

The video and data ports, in some embodiments, may be connected to a backplane that recognizes different types of video and data ports that are inserted into the empty port slots and harmonizes the hardware and software differences between different types of video and data ports. The backplane may receive data from different ports with different standards and may convert them into data packets, for example, Internet protocol (IP) packets. The backplane recognizes different types of RF transceivers that are inserted into the empty port slots and harmonizes the hardware and software differences between different types of RF transceivers. The backplane may receive data from different RF transceivers with different standards and may convert them into data packets, for example, Internet protocol (IP) packets. The backplane may include a group of electrical connectors that may be used to connect the PCBAs of the video ports, the data ports, and the transceivers to the rest of the gateway device components.

In some embodiments, the backplane may use a peripheral bus such as, for example, and without limitations, a Peripheral Component Interconnect Express (PCI Express) bus. In some embodiments, a port's electronic components 1263 (e.g., a printed circuit board) may include an adapter to convert the port's signals into a set of signals recognized by the gateway device's peripheral bus. In these embodiments, when a port is inserted in a slot, the adapter that is included in the port's electronic components may convert the port's signals into the set of signals that is recognized by the gateway device's backplane and/or gateway device's software. In other embodiments, the backplane may include an adapter that may convert the signals generated by each port type to a set of signals recognized by the gateway device's peripheral bus.

The gateway device 100, in some embodiments, may be configured to generate one or more signals when a port or an RF transceiver is pulled out of a slot and/or when a port or an RF transceiver is inserted in a slot. The signal may identify the slot number and/or the type of the port or RF transceiver that is being pulled out or inserted in the slot.

The field configurable video port, data ports, and RF transceivers 1200 may be configured to meet the needs of a user or the needs of a production team in a particular day and/or for a particular project. For example, the field configurable ports 1200 also allows the gateway device of the present embodiments to be configured in the field, to include only video ports, only data ports, or a combination of video and data ports.

In some embodiments, any slot may be used to insert a video port, a data port, or an RF transceiver. In other embodiments, a subset of the slots may be used to insert video ports and data ports, and the rest of the slots may be used to insert RF transceivers.

FIG. 12 further illustrates that the gateway device 100 may include one or more battery compartments 1215. The batteries, in some embodiments, may be rechargeable. In addition to, or in lieu of the batteries, the gateway device 100 may include an AC power connector 1220 for connecting to an AC source through a power cable. Many features of gateway 100 such as the anti-scratch shatter-proof touchscreen, the ruggedized weatherproof enclosure, the rechargeable batteries, the field reconfigurable ports, etc., makes the gateway device of the present embodiments an ideal gateway for field environments.

With continued reference to FIG. 12, the gateway device 100 may include one or more data storage card slots 1270. The data storage card slots 1270 may be configured to receive removable data storage cards 1080, such as, for example, and without limitations, SD-cards, NVMe cards, and/or SSD cards. Although three data storage card slots 1270 are shown in the example of FIG. 12, other embodiments may include more than three data storage card slots or less than three data storage card slots.

Figure 13:
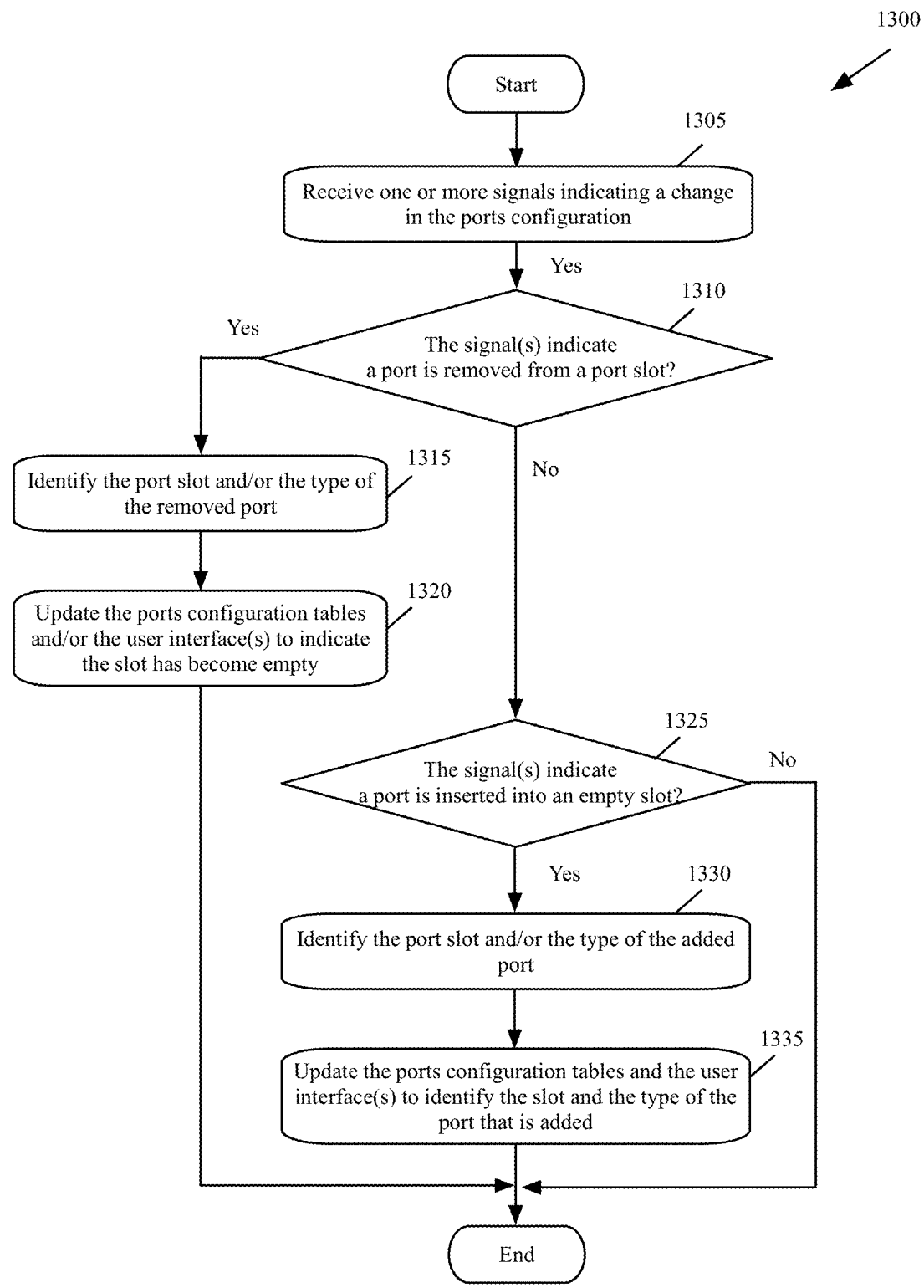
FIG. 13 is a flowchart illustrating an example process for reconfiguring the communication ports of an electronic device, according to various aspects of the present embodiments.

FIG. 13 is a flowchart illustrating an example process 1300 for reconfiguring the communication ports of an electronic device, according to various aspects of the present embodiments. In some of the present embodiments, the process 1300 may be performed by one or more processing units of a gateway device 12 (FIG. 12).

With reference to FIG. 13, one or more signals may be received (at block 1305) indicating a change in the electronic device's ports configuration. The one or more signals may be received from the backplane of the gateway device and/or from a user interface. For example, as described above with reference to FIG. 12, one of the video or data ports 1201-1205 or one of the RF transceivers 1206-1208 may be pulled out of a slot or a video port, a data port, or an RF transceiver may be inserted in an empty slot. The removing or the inserting of the port's electronic may generate a signal indicating the removal or the insertion of the port's electronic.

As another example, the one or more signals may be received (at block 1305) from a user interface. For example, a user interface, such as the user interface of FIG. 3, may be used to indicate a change in the port configuration. As described above with reference to FIG. 3, option 362 may be used to indicate that a port slot is unused or empty, for example, prior to or after a port is removed from the port slot. The option 362 may also be used to identify the type of the port that is inserted into an empty spot. In addition to, or in lieu of the menu for configuring ports, the user interface of FIG. 3, in some embodiments, may allow an option to individually select each port slot 391 and mark the port as empty or unused and/or to identify the type of a port inserted into an empty slot. As yet another example, some of the one or more signals may be received (at block 1305) from the backplane and some of the one or more signals may be received from a user interface. For example, the signal(s) related to removing a port from a slot may be received from the backplane and the signal(s) related to inserting a port may be from a user interface, or vice versa.

With further reference to FIG. 13, a determination may be made (at block 1310) whether the signal(s) indicate a port is removed from a port slot. When the signal(s) do/does not indicate that a port is removed from a port slot, the processing may proceed to block 1325, which is described below. Otherwise, the port slot and/or the type of the removed port may be identified (at block 1315). For example, the signal(s) generated when the port is removed may identify the slot number and/or the port type.

The ports configuration table(s) and/or the user interface(s) may be updated (at block 1320) to indicate the slot has become empty. The process 1300 may then end. As described above with reference to the user interface of FIG. 3, the port configuration 361 may identify the port slots that currently include a port with solid lines and the slots that are currently empty with dashed lines. The user interface may also display the type of each port.

With continued reference to FIG. 13, when the signal(s) do/does not indicate (at block 1310) that a port is removed from a port slot, a determination may be made (at block 1325) whether the signal(s) indicate a port is inserted into an empty slot. If not, the process 1300 may end. Otherwise, the port slot and/or the type of the added port may be identified (at block 1330). For example, the signal(s) generated when the port is inserted into the slot may identify the slot number and/or the port type.

The ports configuration table(s) and/or the user interface(s) may be updated (at block 1335) to indicate the type of the added port and the port slot occupied by the added port. For example, as described above with reference to the user interface of FIG. 3, the port configuration 361 may identify the port slots that currently include a port with solid lines and the slots that are currently empty with dashed lines. The user interface may also display the type of the added port. The process 1300 may then end.

The gateway device 100 may, in some embodiments, provide alternative connectivity when the wireless communication to a cellular tower is not available, or the wireless communication to the cellular tower is below a threshold quality, or a wired connection to an ISP provider is not available. As described above, the gateway device 100, in some of the present embodiments, may include multiple SIM cards, each SIM card storing an identification for a different wireless service provider. The gateway device 100 may provide connectivity through satellite links. The gateway device 100 may provide wired connections to ISPs.

Figure 14A:
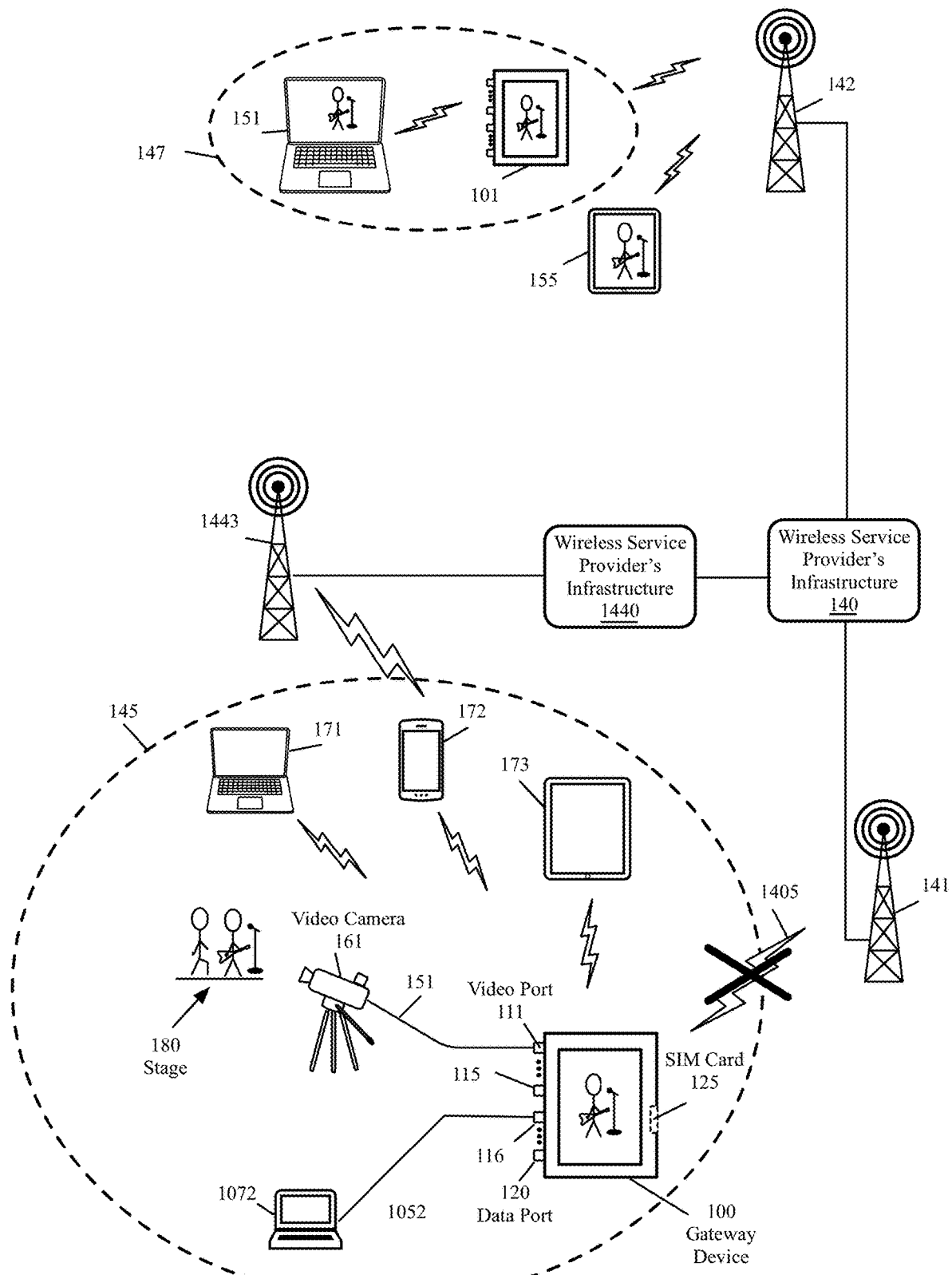
FIG. 14A is a functional block diagram illustrating an example system where a gateway device establishes a wireless connection with a cellular service provider's infrastructure through a mobile device that has connectivity with the cellular service provider, according to various aspects of the present disclosure.
Figure 14B:
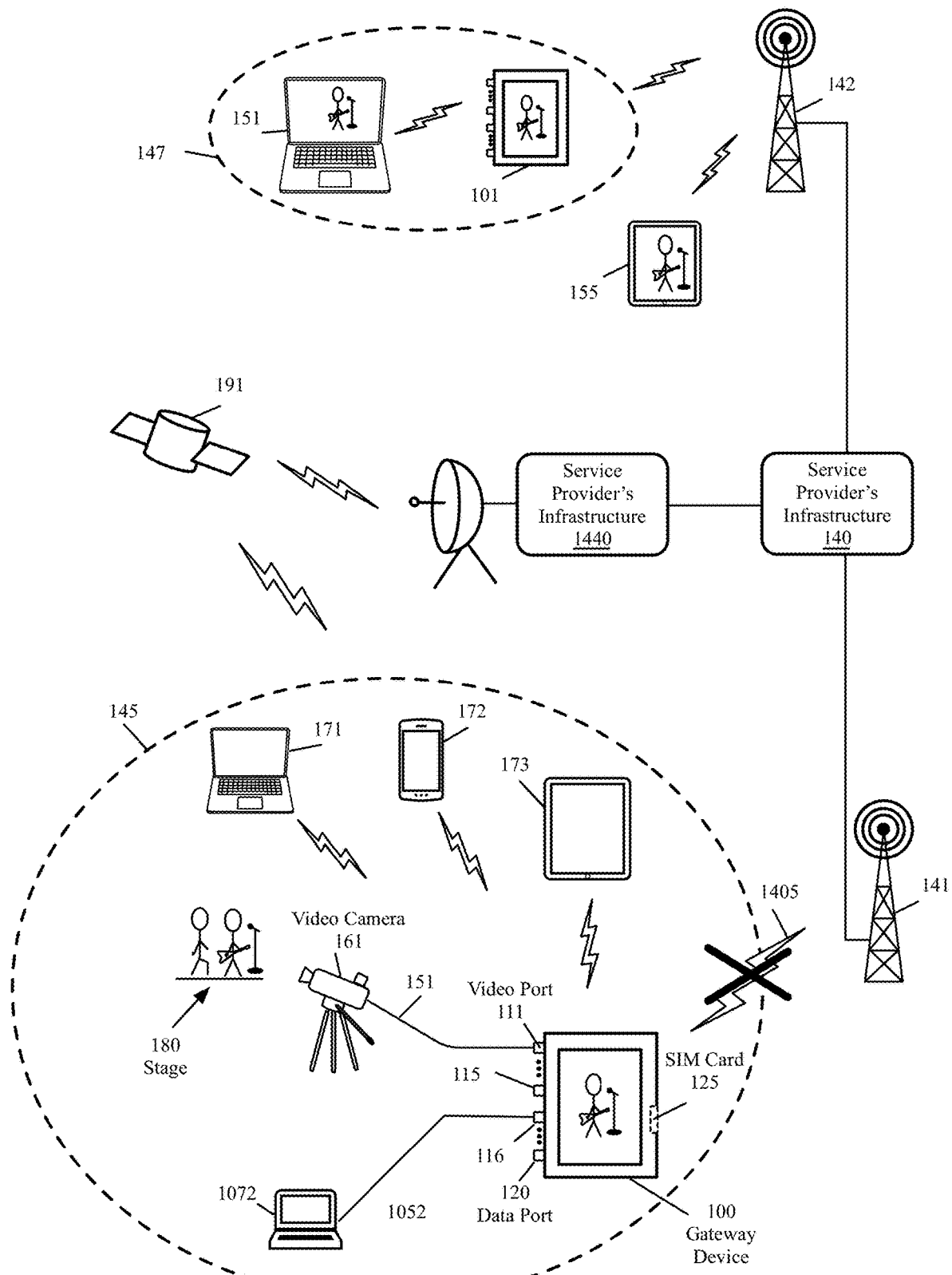
FIG. 14B is a functional block diagram illustrating an example of the system of FIG. 14B, where at least one of the networks is a satellite network, according to various aspects of the present disclosure.

The gateway device 100 may, in some embodiments, provide connectivity through entities such as mobile devices, mesh networks, third party hotspots, etc. FIG. 14A is a functional block diagram illustrating an example system where a gateway device establishes a wireless connection with a cellular service provider's infrastructure through a mobile device that has connectivity with the cellular service provider, according to various aspects of the present disclosure. FIG. 14B is a functional block diagram illustrating an example of the system of FIG. 14B, where at least one of the networks is a satellite network, according to various aspects of the present disclosure.

With reference to FIGS. 14A-14B, the gateway device 100 may determine that a wireless connection 1405 to a wireless service provider's infrastructure 140 has failed, or the performance (e.g., the bandwidth and/or the transmission speed) of the connection has fallen below a threshold. The example of FIGS. 14A-14B assumes that the gateway device 100 is unable to establish connectivity to an ISP through a wired line, to a satellite through a satellite link, or to a different wireless service provider by using the identity provided by a second SIM card embedded in the gateway device 100.

The gateway device 100 may determine that a wireless device, such as the wireless device 172 in the local network 145, may have connectivity with the infrastructure 1440 of a different wireless service provider (e.g., through the cellular tower 1443) than the wireless service provider(s) subscribed by the gateway device 100.

The electronic device 172 may be configured to allow the gateway device 100 to establish a connection with the service provider's infrastructure 1440 (to which the gateway device is subscribed) through the electronic device 172. The gateway device 100 may then be connected to the service provider's infrastructure 1440 through the service provider infrastructure 140. The service provide with the infrastructure 1440 may be, for example, a cellular network (as shown in FIG. 14A) or a satellite network (as shown in FIG. 14B).

The gateway device 100, in some embodiments, may prioritize transmissions using the link through the electronic device 172 in order to limit the bandwidth usage and/or to transmit and receive higher priority information. The gateway device 100 may periodically check the other communication links, such as the direct link to the service provider infrastructure 140 (to which the gateway device 100 is subscribed), wired link(s), satellite link(s), etc., and reestablish the link(s) once the link(s) become(s) available or the performance of the link(s) is/are above a threshold.

Although the electronic device 172 is shown to be a part of the local network 145, the gateway device 100 may establish connectivity to the service provider's infrastructure 140 through a mesh network. The electronic devices participating in a mesh network may be, for example and without limitations, privately owned electronic devices that are configured to participate in the mesh network and provide connectivity to other electronic devices for a fee.

Figure 15:
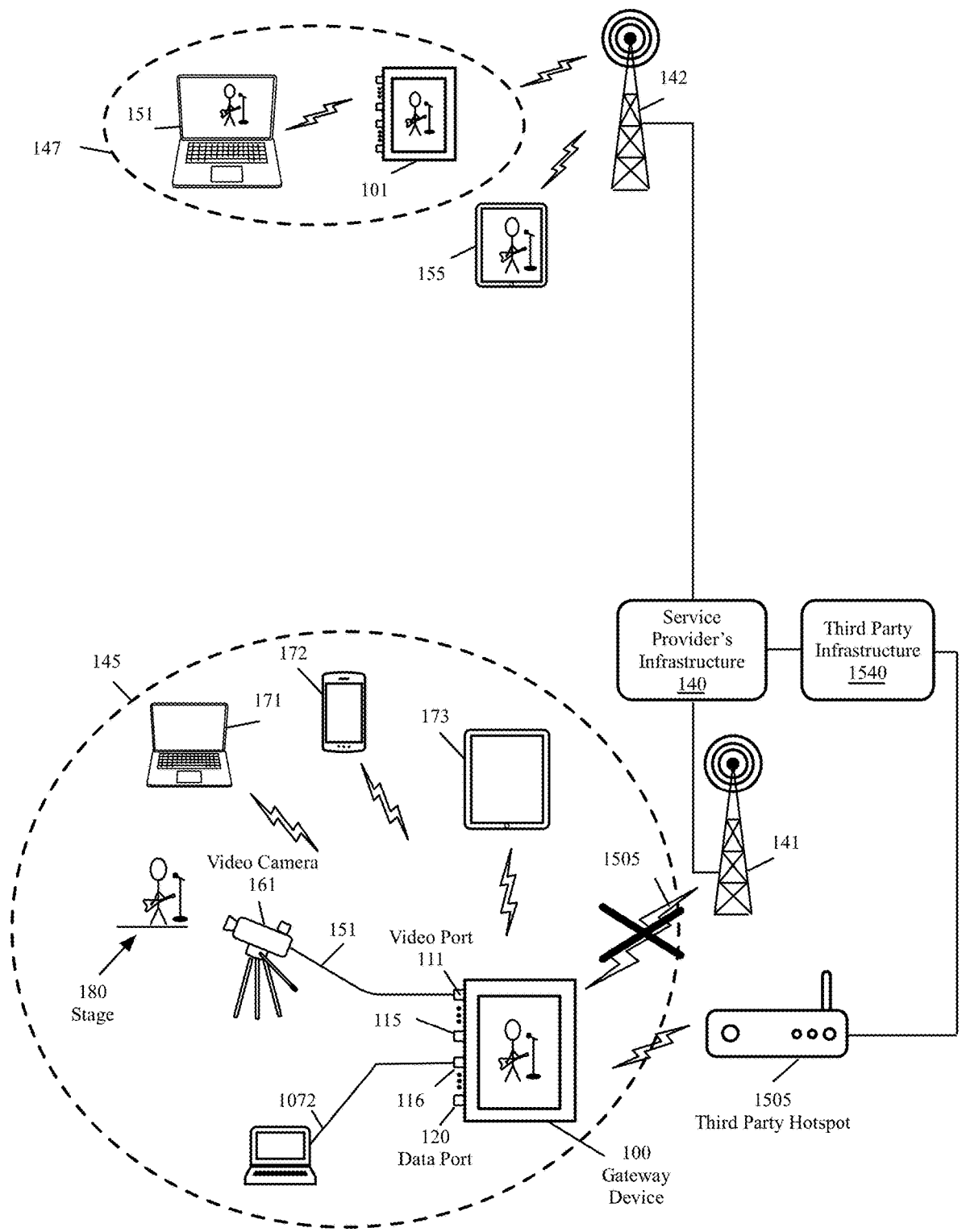
FIG. 15 is a functional block diagram illustrating an example system where a gateway device establishes a wireless connection through a third party hotspot, according to various aspects of the present disclosure.

FIG. 15 is a functional block diagram illustrating an example system where a gateway device establishes a wireless connection through a third party hotspot, according to various aspects of the present disclosure. With reference to FIG. 15, the gateway device 100 may determine that a wireless connection 1505 to a service provider 140 has failed, or the performance (e.g., the bandwidth and/or the transmission speed) of the connection has fallen below a threshold. The example of FIG. 15 assumes that the gateway device is unable to establish connectivity to an ISP through a wired line, to a satellite through a satellite link, or to a different wireless service provider by using the identity provided by a second SIM card embedded in the gateway device 100.

The gateway device 100 may establish a wireless link with a third party hotspot device 1305 through a wireless link such as, without limitations, a Wi-Fi or Bluetooth link. The third party hotspot device 1505 may be in the vicinity of the stage 180. Alternatively, the mobile gateway device 100 may be carried to a location (e.g., and without limitations, a coffee shop, a hotel, an Internet cafe, etc.) where wireless connectivity is available in order to transmit prerecorded video content to one or more destinations.

With further reference to FIG. 15, the gateway device 100 may establish a connection to the third party hotspot 1505. The gateway device 100 may then be connected to the service provider infrastructure 140 through the third party hotspot device 1505 and the third party infrastructure 1540.

Figure 16:
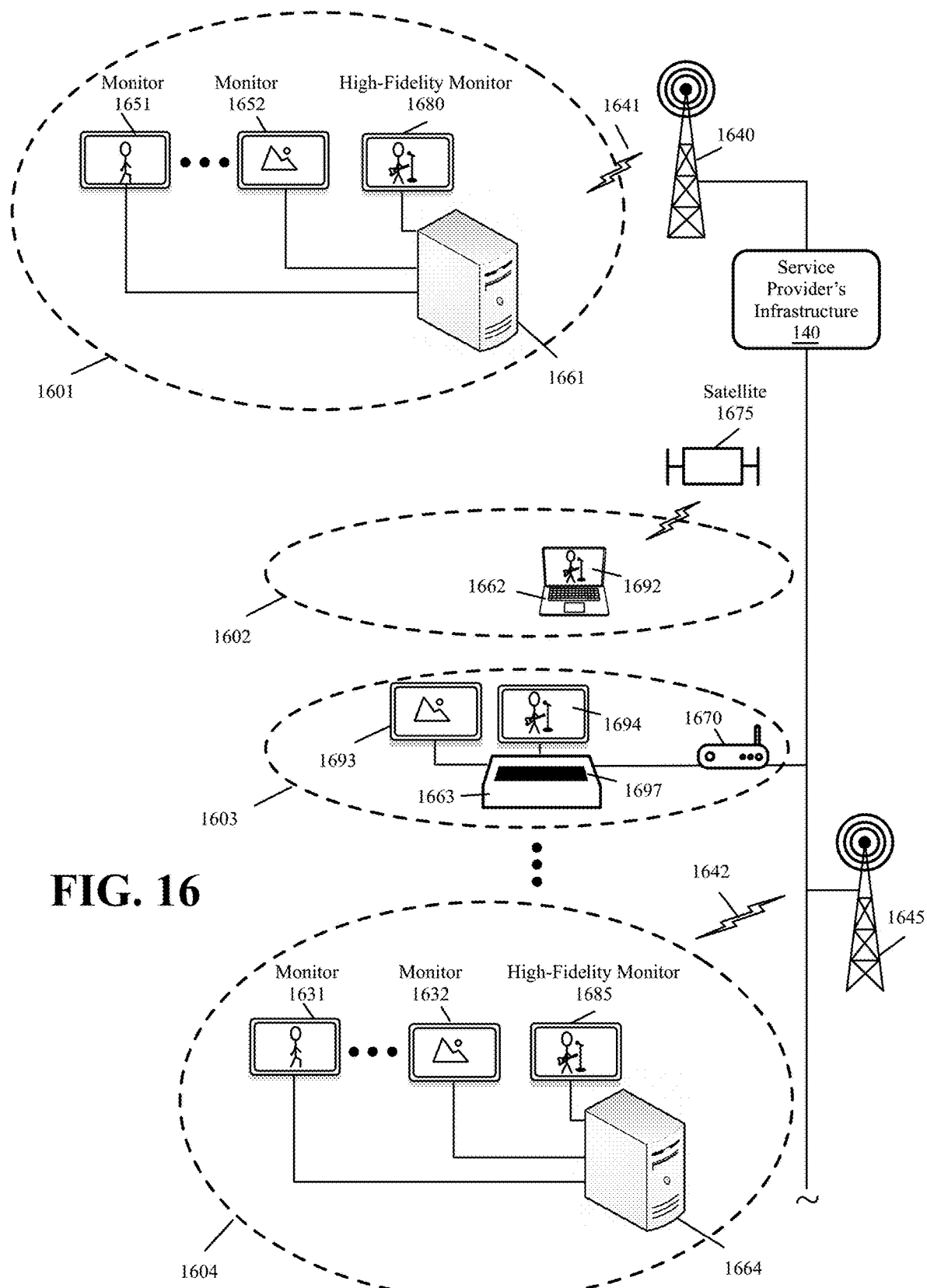
FIG. 16 is a functional block diagram illustrating an example peer-to-peer network created by several computing devices, where each peer may allow the other peers to remotely control the computing resources of the peer, according to various aspects of the present disclosure.

Some embodiments provide a peer-to-peer network where each peer may allow the other peers to remotely control the computing resources of the peer. The peer-to-peer network may, for example, and without limitations, provide an optimized utilization of the resources available to a group of corroborating persons. FIG. 16 is a functional block diagram illustrating an example peer-to-peer network created by several computing devices, where each peer may allow the other peers to remotely control the computing resources of the peer, according to various aspects of the present disclosure.

With reference to FIG. 16, the peer-to-peer network may include the nodes 1601-1604. The nodes may include the computing devices 1661-1664. The computing devices 1661-1664 may be, for example, and without limitations, gateway devices (such as the gateway devices 100-102 of FIG. 1A), desktop computers, laptop computers, etc. Some of the present embodiments may provide a software networking application that may be installed on the computing devices 1661-1664 to provide the peer-to-peer network functionalities described herein.

Each peer node 1601-1604 may have one or more display monitors. In the example of FIG. 16, the computing device 1661 may be connected to several (e.g., two, three, or more) display monitors 1651-1652 of medium fidelity. The computing device 1661 may also be connected to a high-fidelity monitor 1680. The high-fidelity monitor 1680 may have a higher resolution than the monitors 1651-1652 and may be used, for example, and without limitations, as a high-fidelity broadcast monitor to display a video stream. One example use of such a monitor may be by an editor who may wish to see a high-fidelity display of a video being produced.

The computing device 1662 may be a laptop with a medium resolution built-in display 1692. The computing device 1663 may be a desktop computer that is connected to a medium fidelity monitor 1693 and a high-fidelity monitor 1694. The computing device 1664 may be connected to several display monitors 1631-1632. The computing device 1664 may be connected to the medium fidelity monitors 1631-1632 and a high-fidelity monitor 1685.

With further reference to FIG. 16, the computing devices 1661-1664 may have one or more connections to outside networks. In the example of FIG. 15, the computing devices 1661 and 1664 may have a wireless connection to the base stations (or cellular towers) 1640 and 1645 (e.g., and without limitation, through the high-speed links 1641 and 1645, such as a 5G connection). The computing device 1662 may have a satellite network connection 1675 and the computing device 1663 may have a wired network connection through a gateway device 1670. The computing devices 1661-1664 may have additional network connections (e.g., as discussed below with reference to FIGS. 19A-19B) that are not shown for simplicity in FIG. 16.

In the example of FIG. 16, the computing devices 1661-1664 may be corroborating on a project. For example, the computing device 1661 may be initially using the monitors 1651-1652 to display, add, edit, and/or delete data and/or may be displaying a video on the high-fidelity monitor 1680. The computing device 1661 may also be transmitting a high-fidelity feed of the video that is being displayed on the monitor 1680 to the computing devices 1662-1664. The computing device 1661 may also be sharing the information (e.g., video, audio, images, data, etc.) that is displayed on one or more of the monitors 1651-1652 with one or more of the computing devices 1662-1664 that may have more than one monitor.

At some time during corroboration, one of the computing devices 1662-1664, such as, for example, the computing device 1663, may send a request to the computing device 1661 for authorization to remotely take control of the computing device 1661. Alternatively, the computing device 1661 may initiate the authorization for the computing device 1663 to remotely take control of the computing device 1661.

Once the authorization is granted by the computing device 1661, a person using the computing device 1663 may use the input devices (e.g., the keyboard 1697), the display devices (e.g., the video displays 1693-1694), and/or the cursor controlling devices (e.g., the mouse), referred herein as keyboard-video-mouse (KVM) devices, that are locally available in the node 1603 to control the remote computing device 1661. The person may remotely control the computing device 1661, e.g., by continuing corroborating in the project, adding, editing, and/or deleting files controlled by the computing device 1661, streaming video to the computing devices 1662-1664, displaying data and/or video on the monitors 1651-1652 and 1680, etc. The person at the computing device 1663 may, therefore, go from a passive viewer to an active KVM user of the computing device 1661. The remote KVM control may go back and forth between the peer nodes multiple times during a corroboration session.

In some embodiments, the computing device that is being remotely controlled may still provide access to the person at the local node, for example, to terminate the remote controlling and/or to continue corroborating with other peers. In the above example, the person at the computing device 1661 may still have sufficient control of the computing device 1661 to terminate the remote controlling of the computing device 1661 by the computing device 1663, to type messages, etc.

Some of the present embodiments may provide two-way remote controlling of the peers' computing resources, where each peer may remotely take control of another peer's computing resources after receiving the authorization from the other peer. For example, and without limitations, the computing device 1663 may have access to data that is locally available in the peer node 1603, may have a better network connection (e.g., a higher bandwidth, a lower network error rate, etc.), and/or may have better computing resources than the computing device 1661. The computing device 1661 may send an authorization request to the computing device 1663 for remotely controlling the computing device 1663 (or the computing device 1663 may initiate the authorization to the computing device 1661 for remotely controlling the computing device 1663). The person at the computing device 1661 may continue corroboration with the peers of the peer-to-peer network while remotely controlling the computing device 1663.

In some of the present embodiments, some of the peers nodes 1601-1604 may have similar computing resources and may remotely access each other's computing devices, for example, and without limitations to access data that is locally available in the other peer's node, to access software applications that may be locally available in the other peer's node, to access hardware such as video and/or audio recording equipment that may be locally available in the other peer's node, and/or to use a faster network connection of the other peer node. In the example of FIG. 16, the peer nodes 1601 and 1604 may each have access to multiple medium-fidelity monitors 1651-1652 and 1631-1632, respectively. The peer nodes 1601 and 1604 may each have high speed network connections 1641 and 1642, respectively. The peer nodes 1601 and 1604 may each have access to the high-fidelity monitors 1680 and 1685, respectively. The persons using the computing devices 1661 and 1664 may remotely control each other's computing devices based on the needs that may arrive during corroboration.

In some embodiments, a computing device, such as the computing device 1661, may request authorization from multiple remote computing devices, such as the computing devices 1661-1663, to have remote KVM control of the computing devices 1661-1663. Alternatively, the computing devices 1661-1663 may initiate authorization for computing device 1650 to have remote KVM control of the computing devices 1661-1663.

Once the authorization(s) is/are granted, the computing device 1661 may remotely control multiple computing devices such as the computing devices 1661-1663. The computing device 1661 may share the displays 1651-1652 and/or 1680 with the computing devices 1661-1663. The computing device 1650 may stream video and/or may transfer data to the computing devices 1661-1663. The computing device 1661 may control the computing resources of the remotely controlled computing devices 1661-1663, for example, and without limitations, to share what is displayed on the monitors of the computing devices 1661-1663, to send what is displayed on the monitors of the computing devices 1661-1663 to one or more electronic devices, to use the computing and networking resources of the computing devices 1661-1663 to stream video and/or to transfer data to the computing device 1650 and/or to other electronic devices.

In some embodiments, the remotely controlled computing device may be a device that is located in a location such as a data center with advanced computing resources. For example, and without limitations, the remotely controlled computing device may be configured with advanced hardware such as processing units, memory, storage, network cards, etc. The remotely controlled computing device may include one or more software applications that may be required for a particular project, the remotely controlled computing device may have fast network connections, etc.

The remotely controlled computing device may be placed at the edge of a network such as, for example, and without limitations, at the edge of a cellular network, to reduce communication latency and increase the performance of the high-bandwidth applications such as video streaming, high-speed data transfers, etc. One example of an architecture for placing computing devices at the edge of a network is multi-access edge computing (MEC) where the computing resources may be placed at the cellular base stations or other nodes located at the edge of a cellular network.

Figure 17:
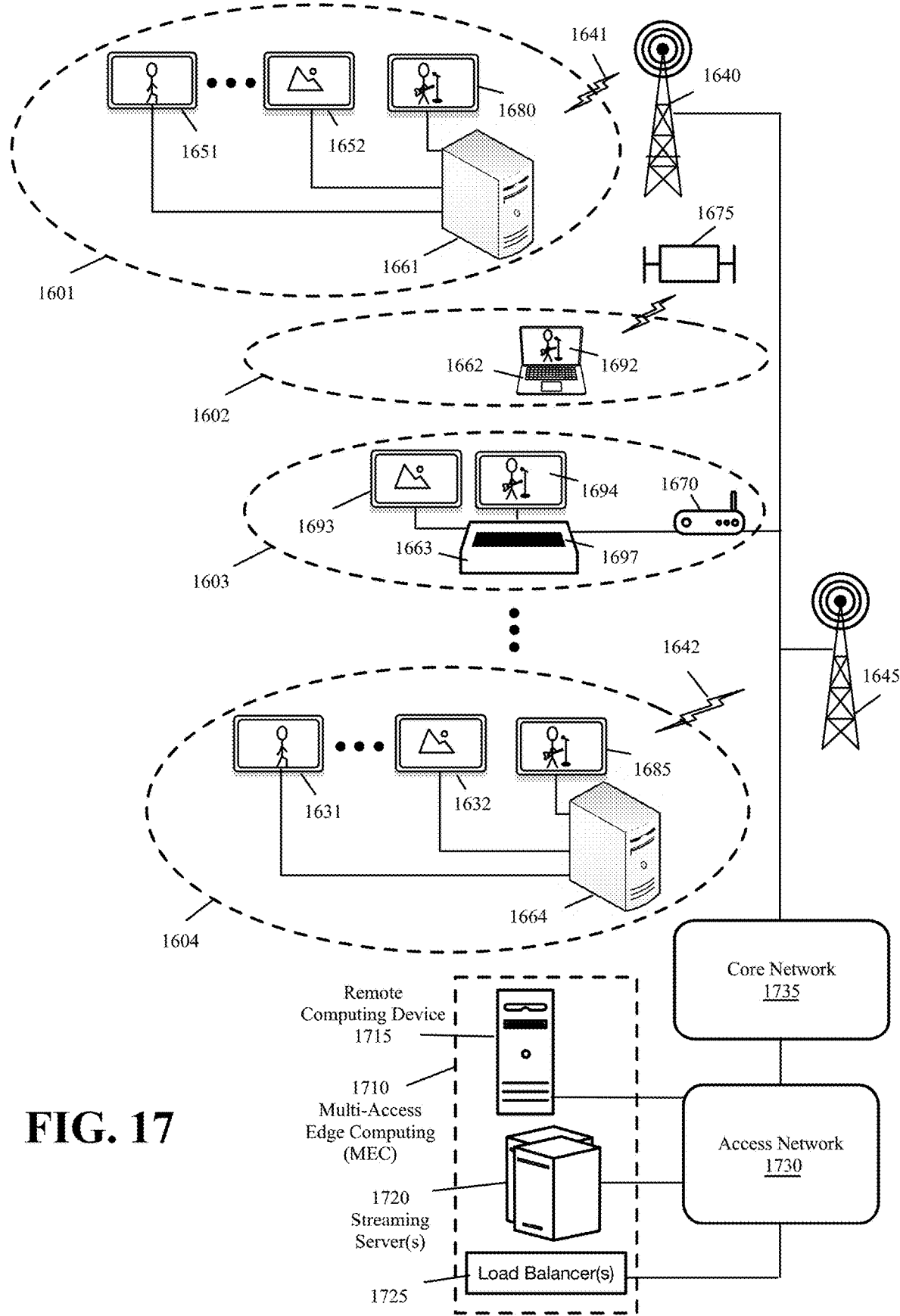
FIG. 17 is a functional block diagram illustrating an example system where a computing device at the edge of a network may be remotely controlled by other computing devices, according to various aspects of the present disclosure.

FIG. 17 is a functional block diagram illustrating an example system where a computing device at the edge of a network may be remotely controlled by other computing devices, according to various aspects of the present disclosure. The components of the nodes 1601-1604 in FIG. 17 may be similar to the corresponding components of FIG. 16.

The remote computing device 1715 may be a physical or a virtual computing device that may be located in the MEC 1710 at the edge of a network. A virtual machine (VM) may be a software computer (e.g., an emulated computer) that, like a physical computer, runs an operating system and applications. Multiple virtual machines may operate on the same host system concurrently. A virtual machine may have access to some of the physical resources of the host machine, such as, for example, and without limitations, network cards, graphics cards, processing resources, storage resources, etc.

The network may include an access network 1730 and a core network 1735. When the network is a cellular network, the access network 1730 may be referred to as a radio access network (RAN). The CN 1735 may interconnect various pieces of network and may provide a path for the exchange of information between different network components. The access network 1730 may provide connectivity between the user equipment (e.g., cellular phones, computers, tablets, or any other electronic equipment that may connect to the network) and the CN 1735. The access network 1730 may include base stations (or cellular towers) such as the base stations 1640 and 1645 and base station controllers (not shown). It should be noted that the base stations and the base station controllers may be called by different terms based on the cellular technology used.

In the example of FIG. 17, the MEC 1710 may be located adjacent to, or inside, a building where the equipment of one of the access network's base stations or base station controllers are located. Locating the computing device 1715 in the EMC 1710, which is close to the access network 1730, may improve the delivery of content and applications to the user equipment that communicate with the access network 1730. The EMC 1710 may further include one or more streaming servers 1720 that may be used to stream video to multiple destinations. Some embodiments may use one or more load balancers 1725 to balance the load among the streaming servers 1720.

In the example of FIG. 17, any of the computing devices 1661-1664 may request authorization for remotely controlling the computing device 1715. For example, the computing device 1661 may request for, and may be granted, authorization for remotely controlling the computing device 1715. The computing device 1661 may remotely control the computing device 1715 for providing high-fidelity video streaming to the computing devices 1661-1664.

The computing device 1661 may also remotely control the computing device 1715 for using the computing device's 1715 computing resources such as processor, memory, storage, application software, network connectivity, etc. The computing device 1661 may remotely control the computing device's 1715 during corroboration with the computing devices 1662-1664 as a part of a peer-to-peer network (e.g., as described above with reference to FIG. 16). The computing device 1661 may also remotely control the computing device's 1715 on a one-to-one basis, without corroborating with any other computing devices.

With reference to FIGS. 16 and 17, when a computing device, such as the computing device 1661, is streaming video and/or sharing the content of the corresponding display monitors 1651-1652 and/or 1680 with other peers, such as the peers 1662-1664, the audio and video associated with the shared content are synched. In addition, during the corroboration, the persons at the computing device 1661-1664 may be talking and exchanging comments regarding the shared content. Depending on the network capabilities of the computing devices at the peer nodes 1601-1604 (and at the MEC 1710 when the remote computing device 1715 is used), there may be a large latency between what the presenter (e.g., the participant at node 1601) may see on one of the local monitors 1651-1652, 1680 and what the participants at nodes 1602-1604 may see.

As an example, the latency may be in the order of three to seven seconds, depending on the network capabilities of the peer-to-peer network. In a creative session where the participants may watch content and may exchange ideas and comments, such a large latency may make the corroboration very difficult, if not impossible. In addition, the delay experienced by each remote node may be different, again based on the network speed at each node. As a result, a corroboration may have multiple participants that each may experience a different latency between the content that the presenter sees and the content that the reviewers (who are making comments) may see.

Figure 27:
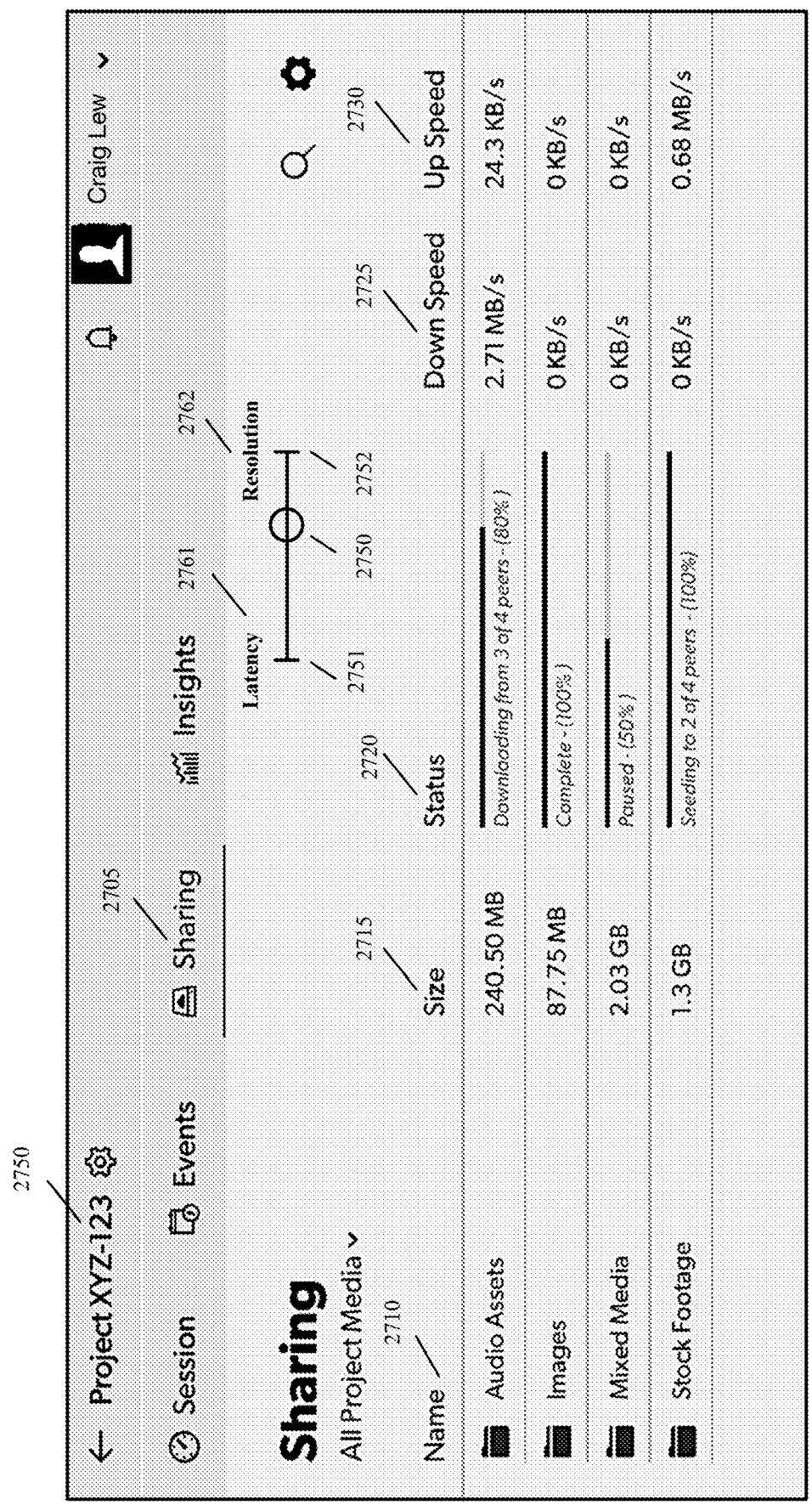
FIG. 27 is a schematic front view of an electronic device that displays a portion of the user interface showing the progress of several transactions for a project, according to various aspects of the present embodiments.

Some embodiments solve the above-mentioned latency problems by providing a tool that may be used to adjust the latency versus the video resolution during corroboration. For example, as shown in FIG. 27, some embodiments may provide a user interface 2700 that may include a control tool, such as the slider 2750. The slider may be used to throttle latency 2761 versus the resolution 2762 of the content that is sent from the source node to the participants nodes.

As an example, when the source node (e.g., the node 1601) is making an hour long presentation with few interaction between the participants, the slider 1750 may be adjusted towards a maximum resolution 1752, resulting in the participants to receive a high resolution video feed at the cost of a large latency between the content that the participant at the source node 1601 may see and the content that the other participant may see. On the other hand, when the participants are actively commenting on the content, the slider 2750 may be adjusted towards a lower latency 2751, resulting in a reduced resolution for the content that is sent to the participants. For example, the latency may be reduced to one to three seconds instead of three to seven seconds.

The user interface 2700, in some embodiments, may be used by the presenter during the corroboration to select the tradeoff between the latency and resolution. In other embodiments, both the presenter and the recipients may use a slider, such as the slider 2750, to control the tradeoff between the latency and the resolution.

Another technical advantage of a control tool, such as the slider 2750, is to intentionally select a latency to ensure all recipients (or at least a majority of the recipients) experience a relatively uniform latency. For example, the tradeoff between the resolution and the latency may be selected such that all recipients may experience two seconds of latency rather than one recipient experiencing one second of latency, another recipient experiencing three seconds of latency, and yet another recipient experiencing seven seconds of latency.

With further reference to FIGS. 16-17, some embodiments may collect metrics regarding the computing and networking capabilities of a computing device and may provide the metrics in a user interface, such as, for example, and without limitations, the user interface of FIG. 3. As an example, when a computing device, such as the computing device 1661, is selected to start a peer-to-peer corroboration, data transfer, video streaming, etc., a person using the computing device may be provided with the metric regarding the capabilities of the computing device. The capabilities may include, for example and without limitations, graphics card capabilities, processing capabilities, networking capabilities (e.g., the network cards, the network connection speed), etc. The person may be warned, through the user interface, that the computing device may not have the capabilities for the intended peer-to-peer corroboration, data transfer, video streaming, etc. Some embodiments may identify a remote computing device, such as the computing device 1715, with more favorable capabilities and may provide an option for the computing device 1661 to remotely control the computing device 1715 for the intended operations.

The metrics, in some embodiments, may be collected for physical as well as virtual machines. For example, when the computing device is a software emulated virtual machine, the same metrics may be provided to indicate whether the virtual machine has the computing and/or networking capabilities of the intended operations.

Figure 18A:
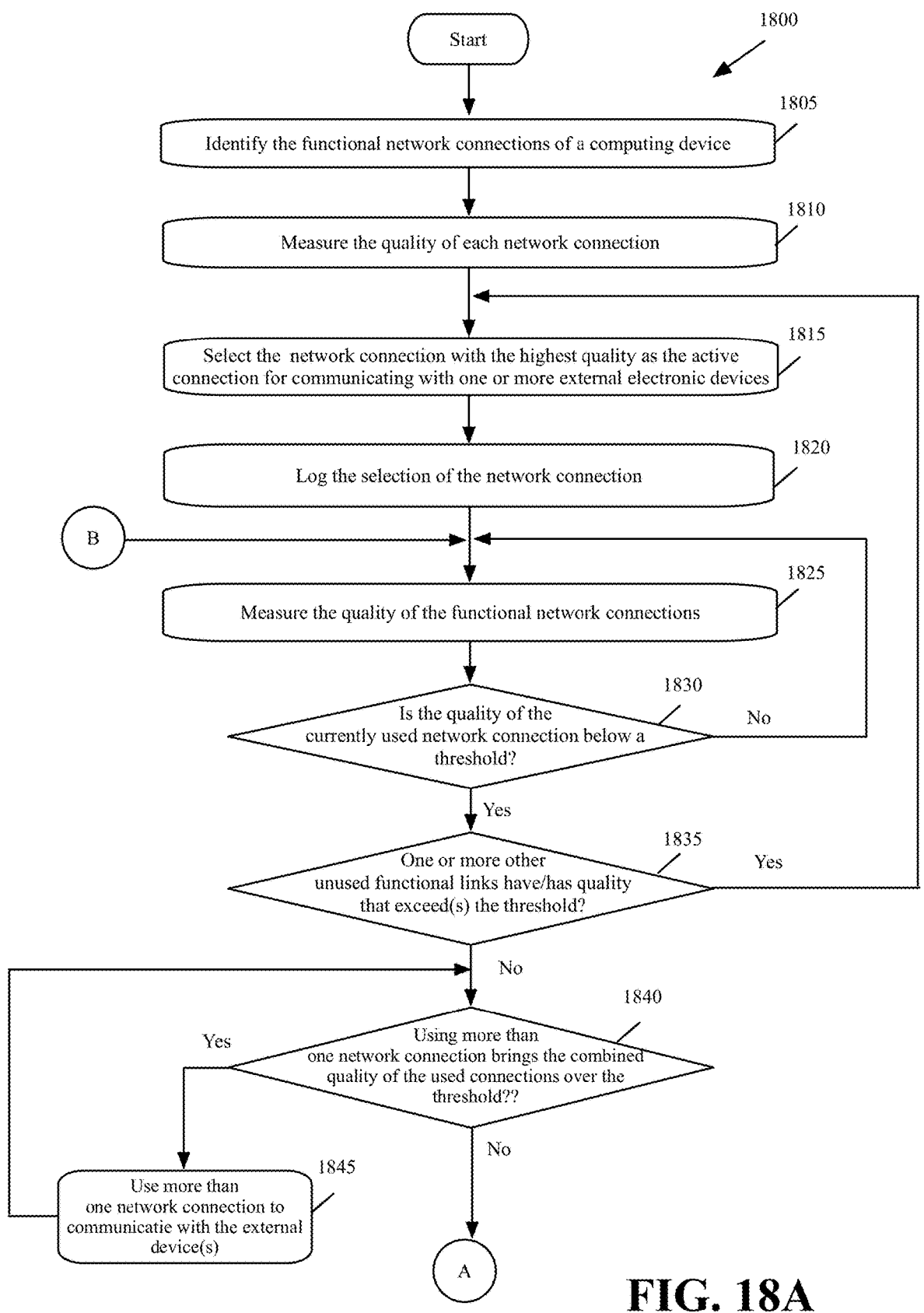
FIGS. 18A-18B are a flowchart illustrating an example process for using machine learning or artificial intelligence to find the best network connection and/or to adjust the utilization of the computing resources in response to changes in the available network bandwidth, according to various aspects of the present embodiments.
Figure 18B:
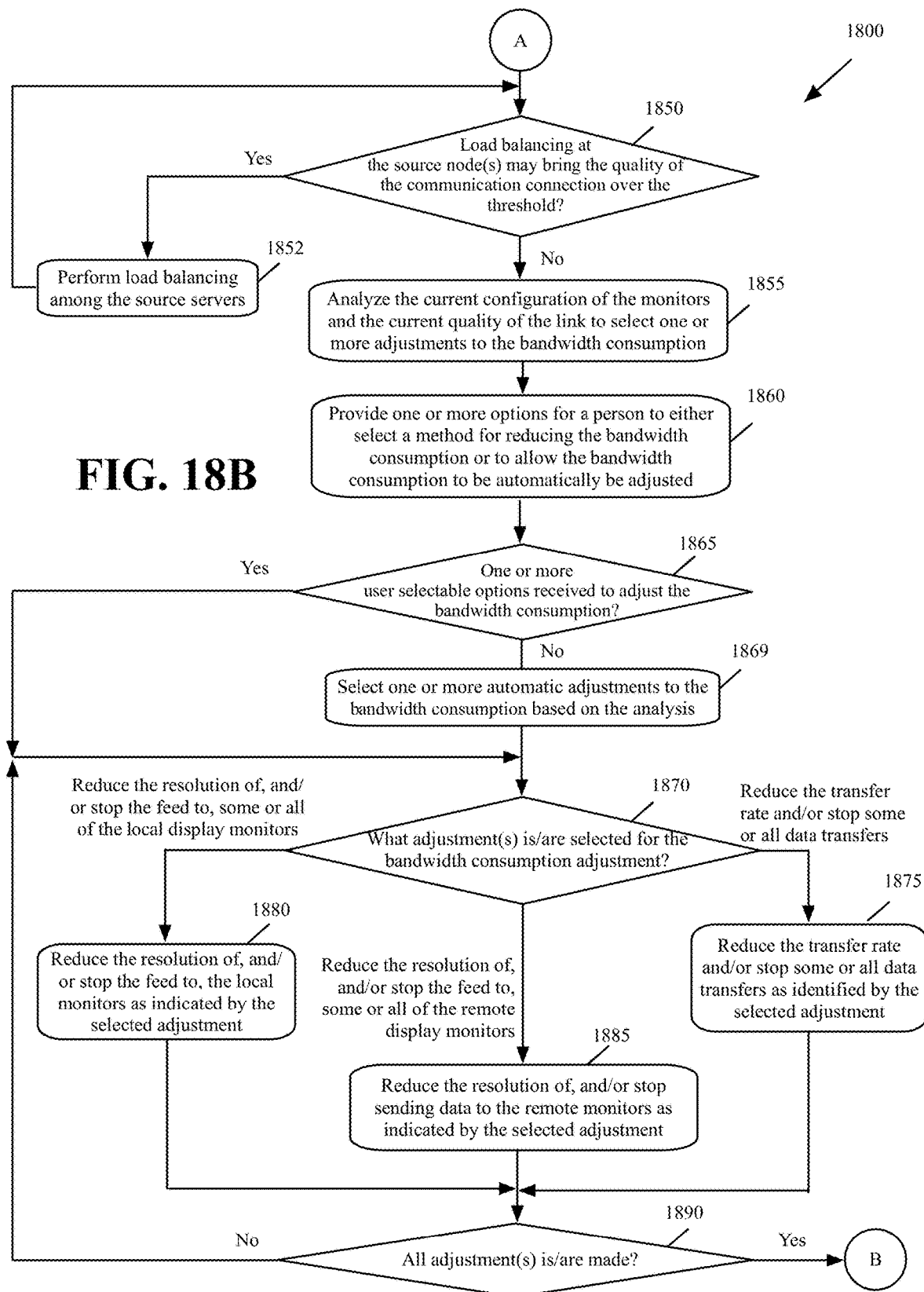

Some of the present embodiments may use machine learning (ML) or artificial intelligence (AI) to find the best network connection and/or to adjust the utilization of the computing resources in response to the fluctuations in the network bandwidth. FIGS. 18A-18B are a flowchart illustrating an example process 1800 for using ML or AI to find the best network connection and/or to adjust the utilization of the computing resources in response to changes in the available network bandwidth, according to various aspects of the present embodiments. In some of the present embodiments, the process 1800 may be performed by one or more processing units of a computing device, such as the computing device 1661 of FIGS. 16-17 and 19A-21C.

Figure 19A:
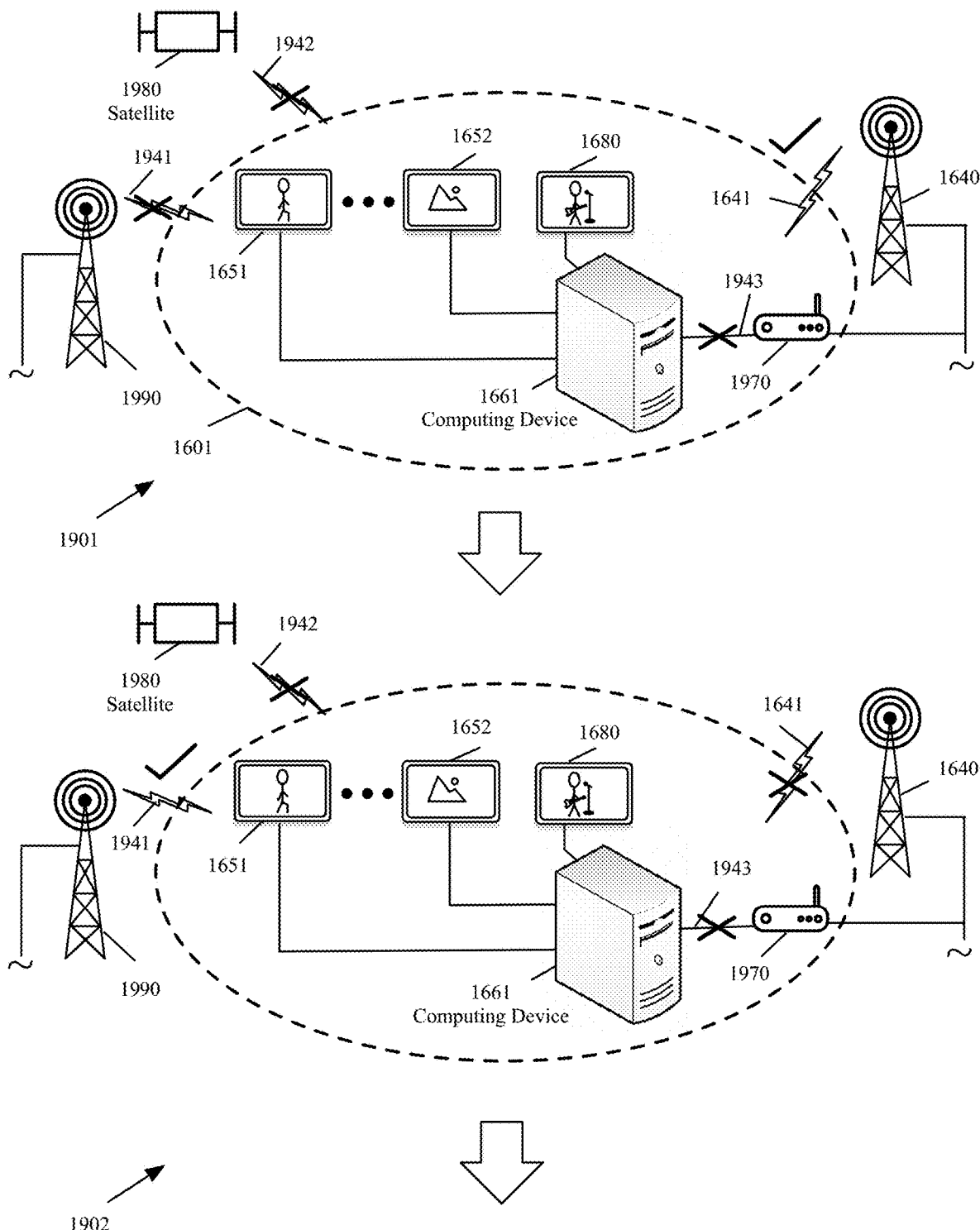
FIGS. 19A-19B show functional block diagrams illustrating the use of machine learning or artificial intelligence by a computing device to select the best available network connection, according to various aspects of the present disclosure.
Figure 19B:
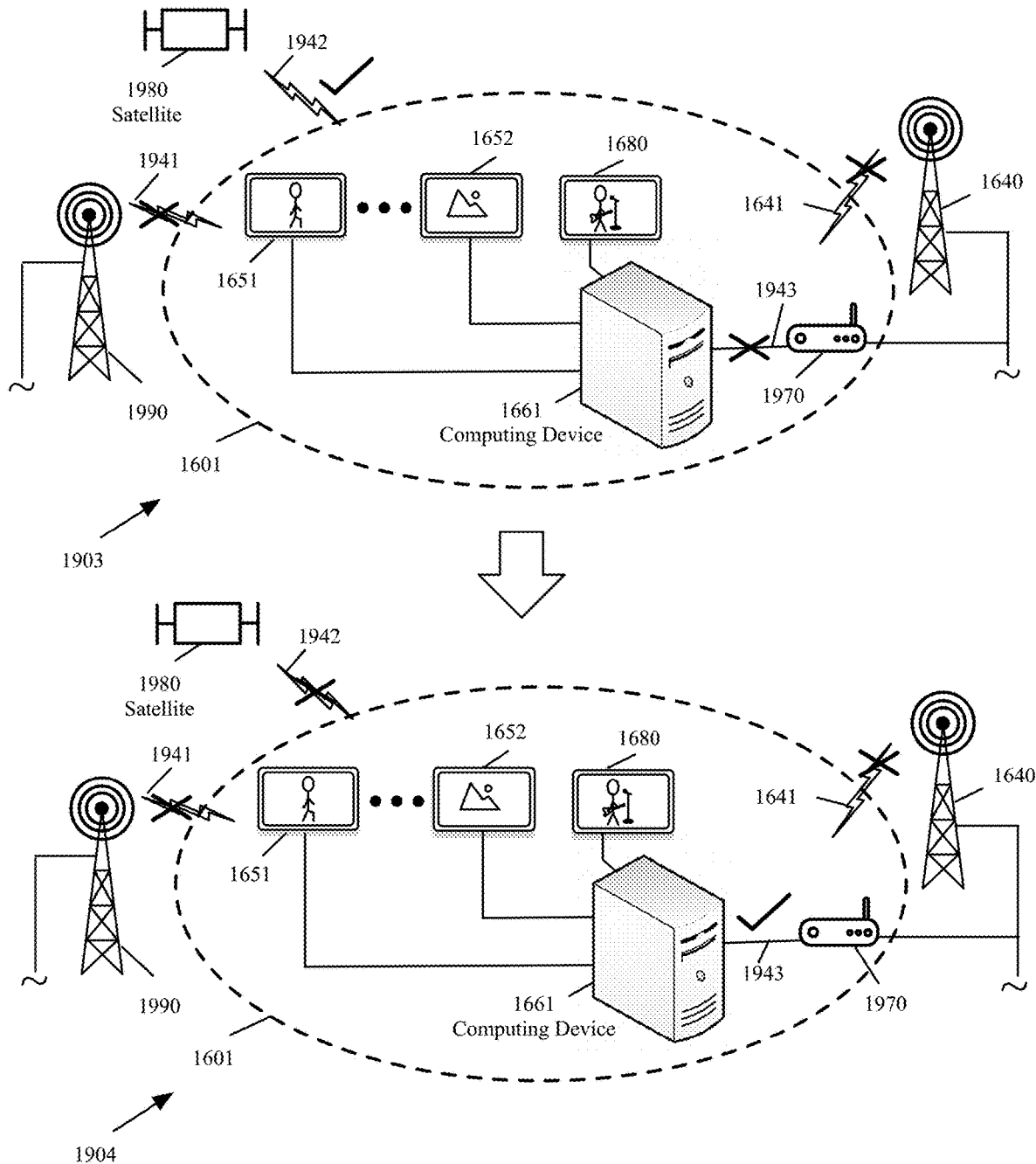
Figure 20A:
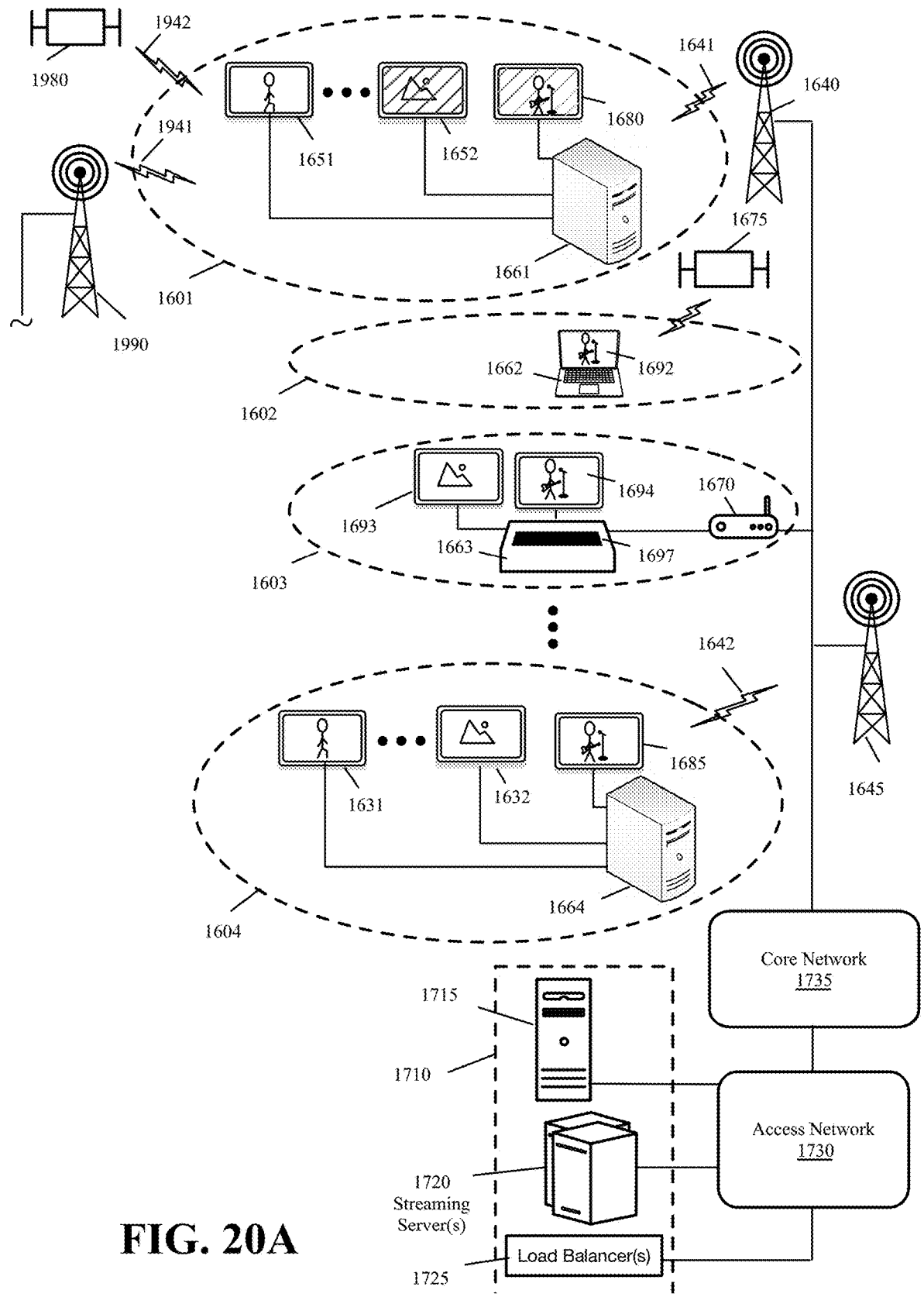
FIGS. 20A-20C show functional block diagrams illustrating the use of machine learning or artificial intelligence by a computing device to adjust the utilization of the local computing resources in response to the changes in the available network bandwidth, according to various aspects of the present disclosure.
Figure 20B:
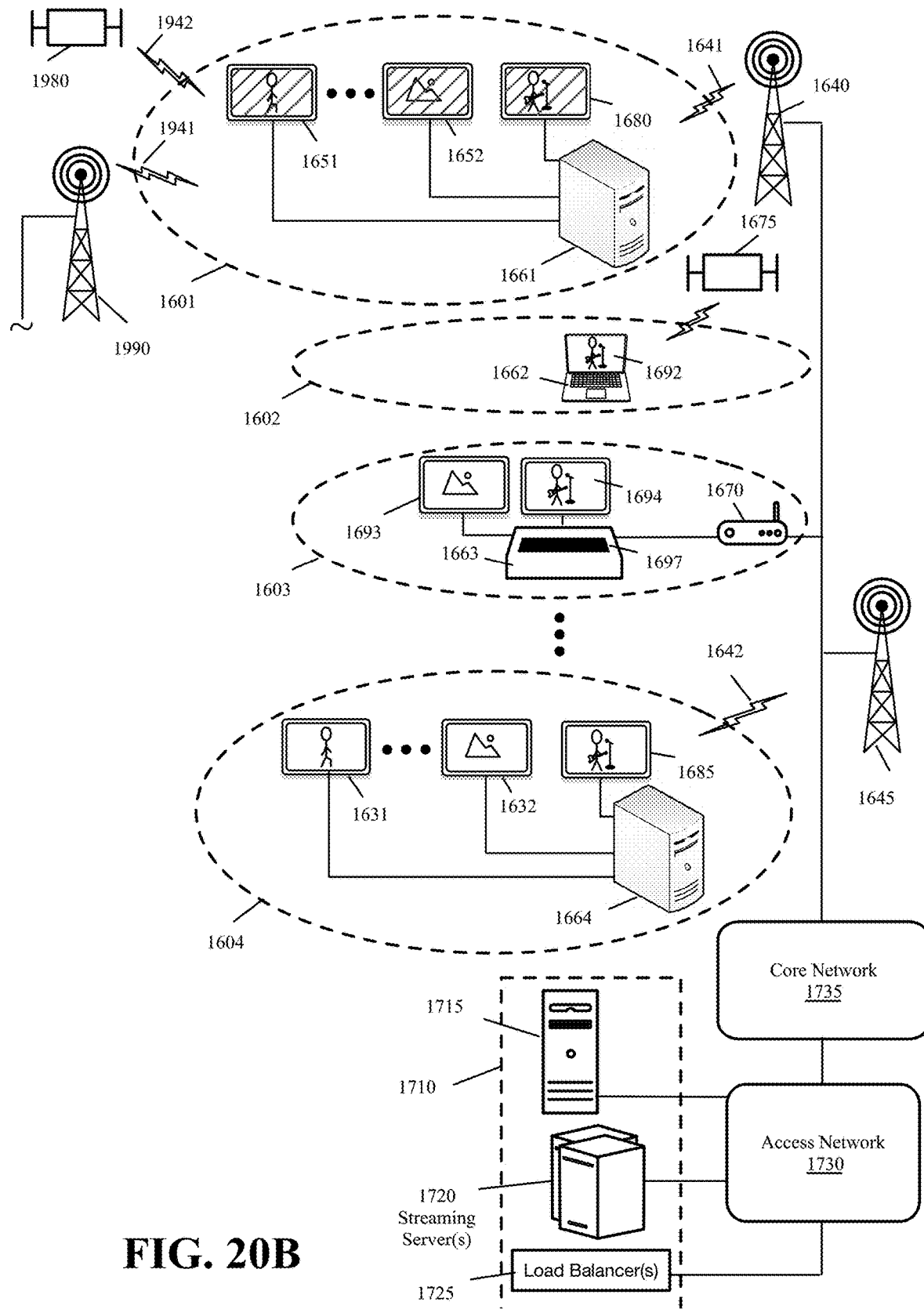
Figure 20C:
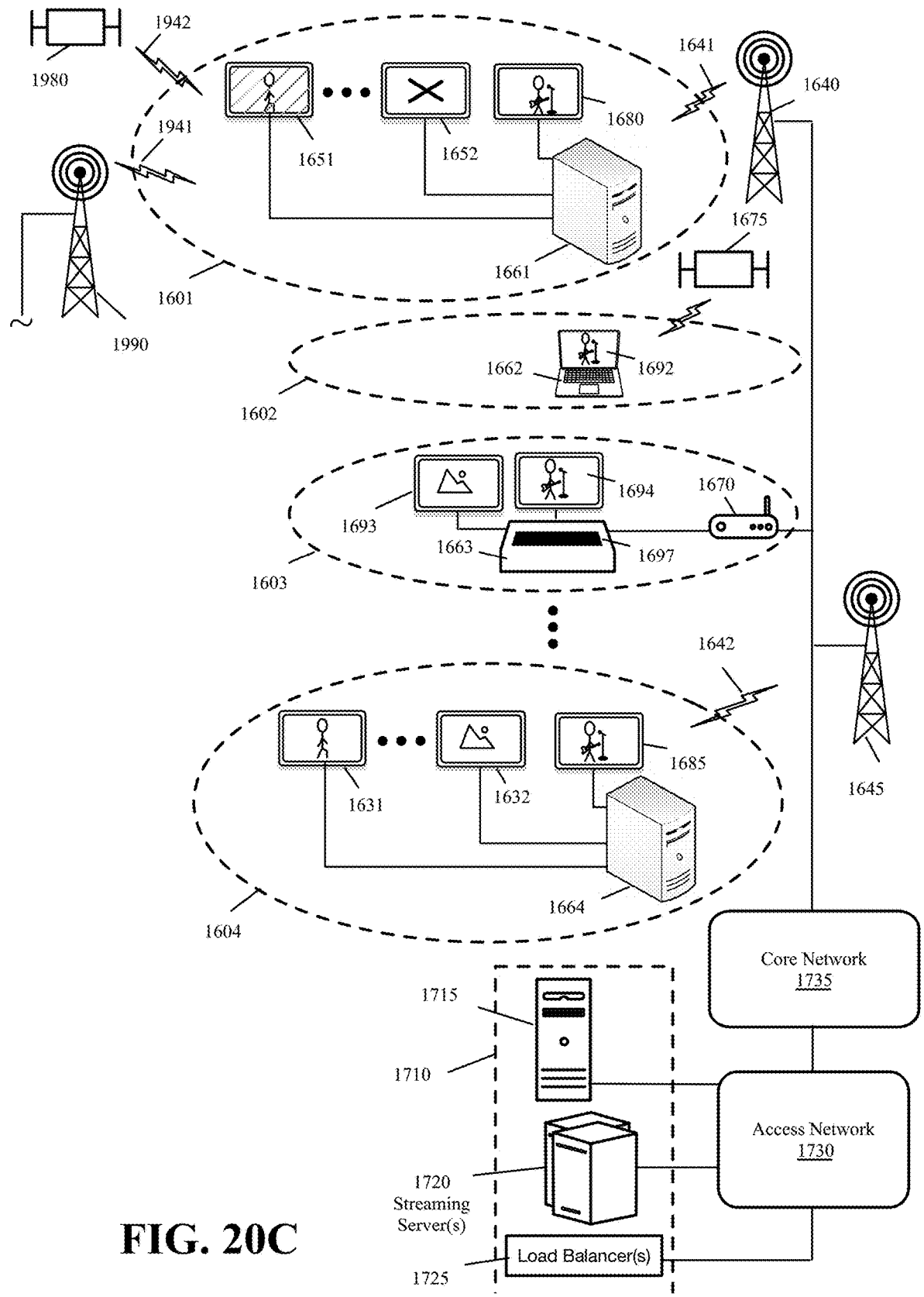
Figure 21A:
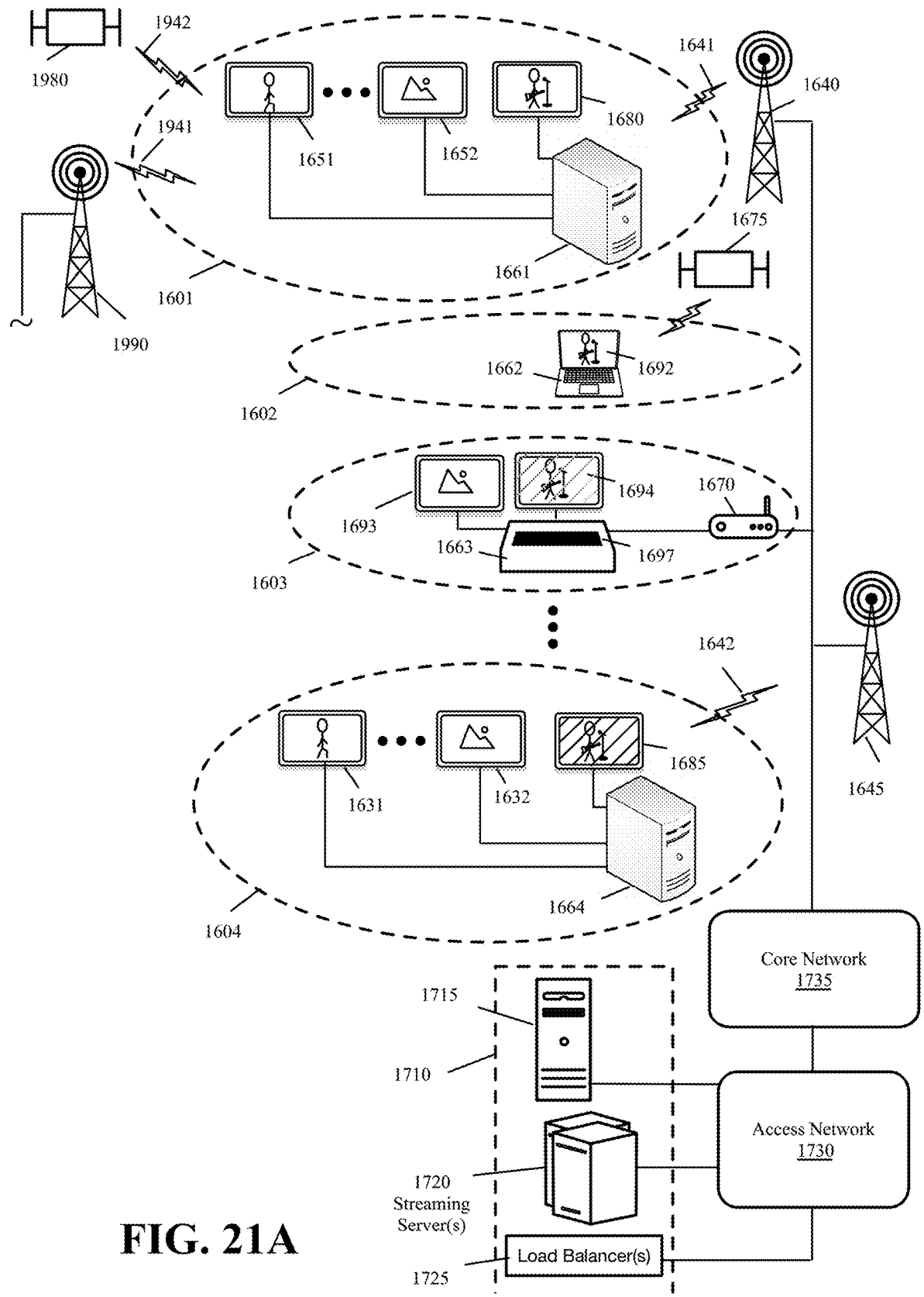
FIGS. 21A-21C show functional block diagrams illustrating the use of machine learning or artificial intelligence by a computing device to adjust the utilization of the remote computing resources in response to the changes in the available network bandwidth, according to various aspects of the present disclosure.
Figure 21B:
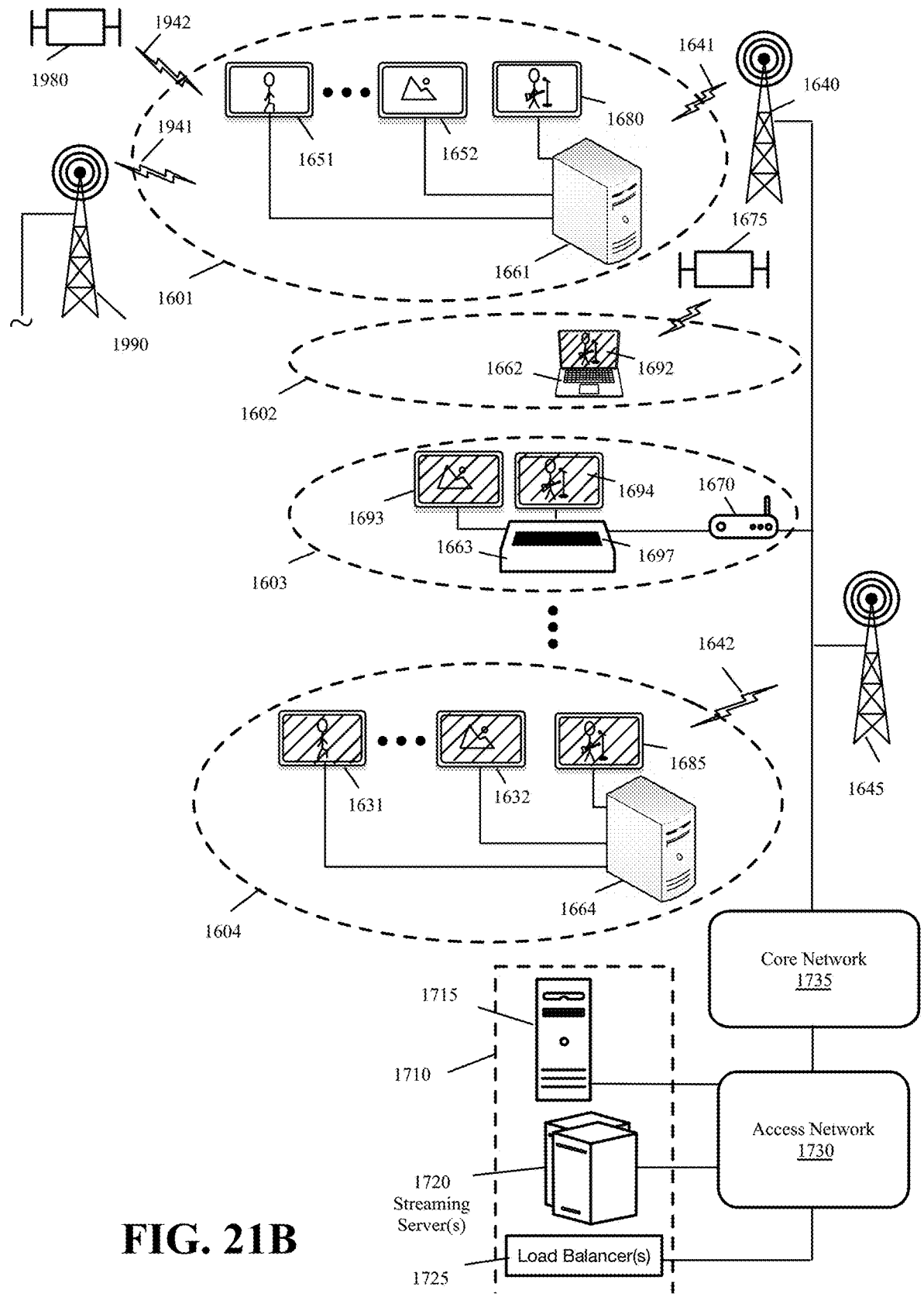
Figure 21C:
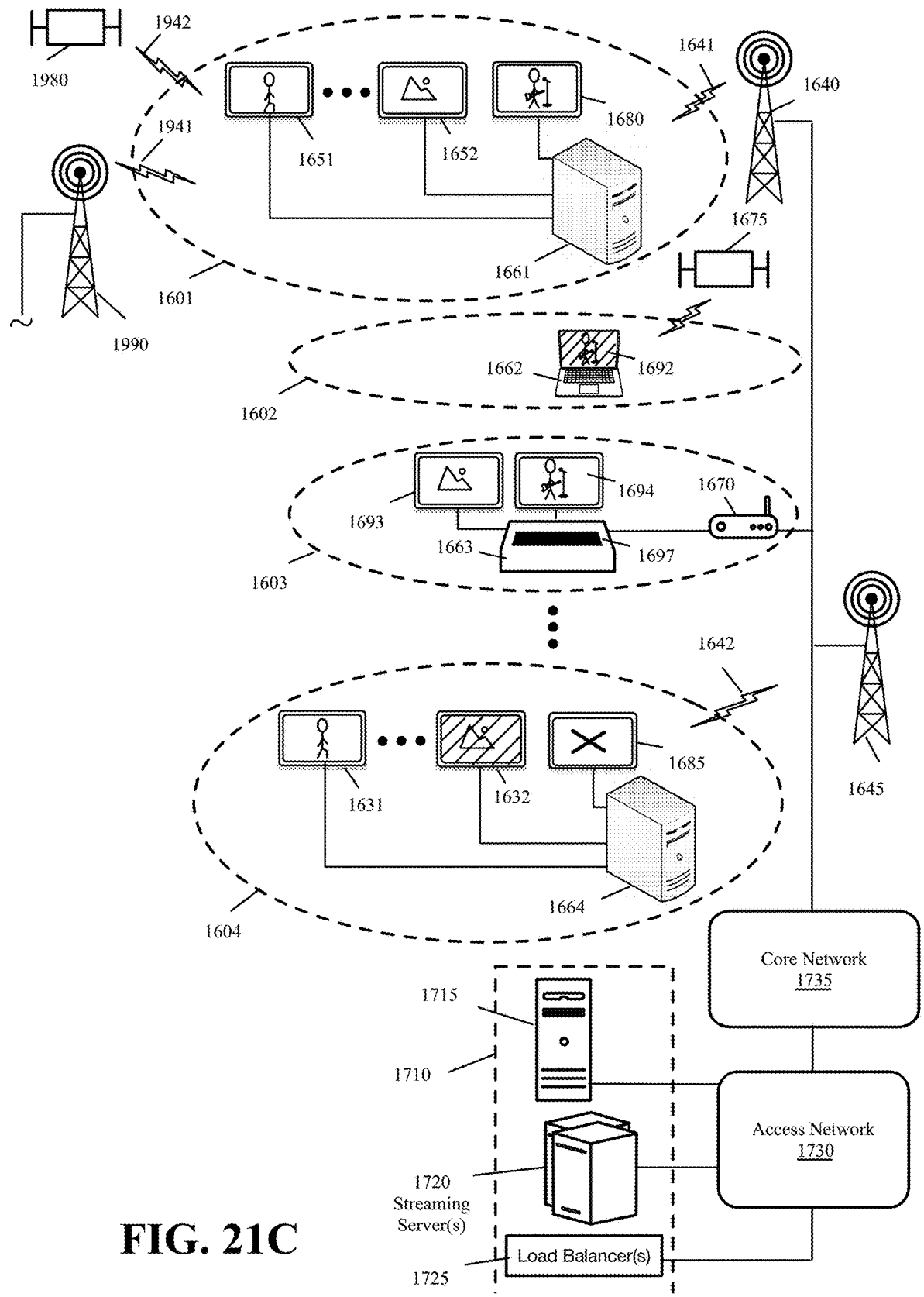

The process 1800 is described with reference to FIGS. 16-17 and 19A-21C. FIGS. 19A-19B show functional block diagrams illustrating the use of ML or AI by a computing device to select the best available network connection, according to various aspects of the present disclosure. FIGS. 20A-20C show functional block diagrams illustrating the use of ML or AI by a computing device to adjust the utilization of the local computing resources in response to the changes in the available network bandwidth, according to various aspects of the present disclosure. FIGS. 21A-21C show functional block diagrams illustrating the use of ML or AI by a computing device to adjust the utilization of the remote computing resources in response to the changes in the available network bandwidth, according to various aspects of the present disclosure.

With reference to FIG. 18A, the process 1800 may be initiated when a computing device is powered up. At block 1805, the functional network connections of the computing device may be identified. For example, the computing device 1661 of FIGS. 19A-19B may have several network connections 1640 and 1941-1943, where some or all of them may be functional (i.e., capable of being used for sending and receiving content and data) at the same time. Each network connection may provide a two-way radio link between the computing device 1661 and a communication network in a plurality of communication networks.

With reference to FIGS. 19A-19B, the computing device 1661, and the monitors 1651-1652 and 1680 may be similar to the corresponding components of FIG. 16. The network connection 1641 may be a high-speed connection, such as, for example, and without limitations, a 5G connection with a first wireless service provider. The network connection 1941 may be a high-speed connection with a second wireless service provider. The computing device 1661 may include a satellite network connection 1942 and/or a wired network connection 1943. As described above with reference to FIG. 1A, the computing device 1661 may include multiple SIM cards, where each SIM card may store an identification for a different wireless service provider. The computing device 1661 may include several different types of RF transceivers for communicating with different types of networks, such as, for example, and without limitations, 5G networks, 5G mm networks, satellite networks, etc.

Referring back to FIG. 18A, the quality of each functional network connection may be measured (at block 1810). For example, the communication speed and/or the communication error rate of each network connection 1640 and 1941-1943 may be measured. Some embodiments may use a custom made or a third party application to measure the quality of each network connection. It should be noted that some embodiments may combine blocks 1805 and 1810 and determine the functionality and the quality of each network connection based on the connection speed and/or the error rate. Next, the network connection with the highest quality may be selected (at block 1815) for communicating with one or more eternal electronic devices.

For example, one of the network connections 1640 and 1941-1943 that has the highest quality may be selected for the computing device 1661 to communicate with external devices. As shown in stage 1901 of FIG. 19A, the high-speed wireless network connection 1641 may initially be selected as the active network connection.

With reference to FIG. 18A, the selection of the network connection for communicating with the external devices may be logged (at block 1820). As described above, some embodiments may log metadata related to events including, but not limited to, the changes to the system and/or network configuration.

Next, the quality of all functional network connections may be measured (at block 1825). For example, the connection speed and/or the error rate of the functional network connections 1640 and 1941-1943 may periodically be measured.

Next, a determination may be made (at block 1830) whether the quality of the currently used network connection is below a threshold. For example, based on more or more criteria, a threshold on the speed and/or the error rate may be required. The criteria may include, for example, and without limitations, the number of external devices that are currently communicating with the computing device, the size, the rate, and/or the type of the content transfer, etc. The type of content transfer may, for example include video streaming, data upload, data download, email and text message exchanges, chat, document exchanges, etc.

When the quality of the currently used network connection is determined (at block 1830) not to be below the threshold, the processing may proceed back to block 1825, which was described above. Otherwise, a determination may be made (at block 1835) whether one or more other unused functional links have/has quality that exceed(s) the threshold. If yes, the processing may proceed to block 1815, which was described above, to select the network connection with the highest quality. Blocks 1815-1835 may be repeated as along as a network connection is available that exceeds the required threshold.

For example, with reference to stage 1902 of FIGS. 19A-19B, the network connection 1941 may become the highest quality among the network connections 1641 and 1941-1953 and may be used for communicating with external devices. At a certain time, the quality of the network connection 1941 may go below the required threshold and the network connection 1942 (as shown in stage 1903) or the network connection 1943 (as shown in stage 1904) may be selected as the network connection for the computing device 1661 to communicate with external devices.

Referring back to FIG. 18A, when no other functional links have/has quality that exceeds the threshold, a determination may be made (at block 1840) whether using more than one network connections may bring the combined quality of the used connections over the required threshold. If not, the processing may proceed to block 1850, which is described below.

Otherwise, more than one network connection may be used (at block 1845) to communicate with the external device(s). In some embodiments, a data file (or a data stream) may be broken into separate smaller data files (or data streams) and may be transmitted over different network paths (e.g., and without limitations, over different network slices, over different SD-WAN path, etc.). The separate data files (or data streams) may then be rejoined at the destination. In some embodiments, the transmission start time, the transmission end time, the transmission completion status, the identification of the transmission path, and/or the identification of each separate data file (or data stream) may be recorded and/or may be saved in one or more blockchain databases.

The processing may then proceed to block 1840, which was described above. For example, in FIGS. 19A-19B, more than one of the network connections 1641 and 1941-1943 may be used to communicate with the external devices. Some embodiments may use scheduling algorithms such as round robin, priority scheduling (e.g., the highest priority communication packets are sent to through the fastest connection), etc.

With reference to FIGS. 18A-18B, when using more than one network connections may not bring the combined quality of the used connections over the required threshold, a determination may be made (at block 1850) whether load balancing may bring the network connection quality over the required threshold. If not, the processing may proceed to block 1855, which is described below.

Otherwise, load balancing may be performed (at block 1852) to bring the communication connection quality over the required threshold. The processing may proceed to block 1850, which was described above. With reference to FIGS. 16 and 17, in a node such as the node 1601, more than one computing device 1661 may be available, which may be load balanced, for example, for sending network packets to destinations. As another example, more than one remote computing device 1715 and/or more than one streaming servers 1715 may be available. The load balancer(s) 1725 may be used to distribute network traffic among the multiple remote computing devices 1715 and/or among the multiple streaming servers 1720.

When it is determined (at block 1850) that load balancing may not bring the communication connection quality over the required threshold, analysis of the current system configuration and network utilization may be made (at block 1855) to select one or more adjustments to the bandwidth consumption. The analysis may include, for example, and without limitations, a determination of the number of local monitors, the number of remote destinations receiving video feeds, the number of remote destinations receiving data transfer, the priority of each data transfer, etc.

Next, one or more options may be provided (at block 1860) for a person using the computing device to either select a method for reducing the bandwidth consumption or to allow the bandwidth consumption to be automatically adjusted. Once there is no way to keep the network connection(s) above the required threshold, some of the present embodiments may display (at block 1860) one or more options on a user interface to provide several options for the person using the computing device to reduce the bandwidth requirements or to allow the ML or AI to automatically adjust the bandwidth consumption.

With reference to FIG. 17, examples of the options provided to a person using the computing device 1661 to reduce the bandwidth consumption may include reducing the resolution of one or more local monitors 1651-1652 and/or 1680, reducing the resolution of the video feed to one or more external devices 1662-1664, terminating the use of one or more local monitors 1651-1652 and/or 1680, terminating the video feed to one or more external devices 1662-1664, reducing the speed and/or terminating data transfer to one or more remote destinations, etc. These options are described below with reference to FIGS. 20A-21C.

Referring back to FIG. 18B, a determination may be made (at block 1865) whether one or more user selectable options are received to adjust the bandwidth consumption. If yes, the processing may proceed back to block 1870, which is described below. Otherwise, one or more automatic adjustments may be selected (at block 1869) to the bandwidth consumption based on the analysis done at block 1855.

At block 1870, a determination may be made of the adjustment(s) that is/are selected for the bandwidth consumption. When the adjustment(s) include(s) reducing the resolution of, and/or stopping the feed to, some or all of the local display monitors, the resolution of the local display monitor(s) may be reduced (at block 1880) and/or the feed to the local display identified monitor(s) may be stopped (at block 1880) as indicated by the selected adjustment. The processing may proceed back to block 1890, which is described below.

FIGS. 20A-20C illustrate several examples of reducing the resolution and/or stopping the feed to one or more local display monitors. With reference to FIG. 20A, the resolutions of the display monitors 1652 and 1653 may be reduced. The resolutions may be reduced in the same or in a different proportion based on the ML or AI analysis. The resolution of the display monitors with higher priorities may not be reduced, or may be reduced proportionally less than the resolution of the low priority monitors. The priorities of the display monitors, in some embodiments, may be configured by a system administrator and/or a person who is using a computing devices that is controlling the display monitors.

The video resolution refers to the number of distinct pixels that could be displayed on the display of a device in each dimension. The transmission bandwidth (or bitrate) refers to the number of kilobits of data transmitted (or streamed) per second. The resolution of the video displayed on a display monitor may be decreased (or increased) by encoding the video in different resolutions, such as, for example, and without limitations, 640×360 and 842×480 for standard definition (SD), 1280×720, 1920×1080 for high definition (HD), 3840×2160 for 4K video, etc. The video transmission bitrates are typically decreased (or increased) proportional to the video resolutions.

FIG. 20B illustrates an example where the resolution of all local monitors are proportionally reduced. In this example, the resolution of all local display monitors 1651-1652, and 1680 are proportionally reduced. FIG. 20C illustrates an example where the resolution of some of the local monitors is/are reduced and the feed(s) to some other monitors is/are stopped. In this example, the resolution of the display monitor 1651 is reduced and the video feed to the display monitor 1652 is stopped.

Referring back to FIG. 18B, when the adjustment(s) include(s) reducing the resolution of, and/or stopping the feed to, some or all of the remote display monitors, the resolution of the display monitor(s) may be reduced (at block 1885) and/or the feed to the display monitor(s) may be stopped (at block 1885) as indicated by the selected adjustment. The processing may then proceed back to block 1890, which is described below.

FIGS. 21A-21C illustrate several examples of reducing the resolution and/or stopping the feed to one or more remote display monitors. With reference to FIG. 21A, the resolutions of the remote display monitors 1694 and 1685 may be reduced. The resolutions may be reduced in the same or a different proportion based on the ML or AI analysis. The resolution of the display monitors with higher priorities may not be reduced, or may proportionally be reduced less than the resolution of the low priority monitors. The priorities of the display monitors, in some embodiments, may be configured by a system administrator and/or a person who is using a computing devices that is controlling the display monitors.

FIG. 21B illustrates an example where the resolution of all remote monitors are proportionally reduced. In this example, the resolution of all remote display monitors 1692-1694, 1631-1632, and 1685 may be proportionally reduced. FIG. 21C illustrates an example where the resolution of some of the remote monitors is/are reduced and the feed(s) to some other monitors is/are stopped. In this example, the resolution of the display monitors 1692 and 1632 are reduced and the video feed to the display monitor 1685 is stopped.

Referring back to FIG. 18B, when the selected adjustment(s) include(s) (at block 1870) reducing the transfer rate and/or stopping some or all data transfers, the data transfer rate(s) may be reduced (at block 1875) and/or some or all data transfers may be stopped (at block 1875) as indicated by the selected adjustment. The processing may then proceed to block 1890, which is described below. For example, as described above with reference to FIGS. 10A-10B, one or more data transfers may be done with or without video streaming. In the example of FIGS. 10A-10B, the data transfer rate for one or more of the data transfer may be reduced and/or one or more of the data transfers may be stopped in order to reduce the bandwidth consumption.

With further reference to FIGS. 18A-18B, a determination may be made (at block 1890) whether all selected adjustments have been made. If not, the processing may proceed back to block 1870, which was described above. Otherwise, the processing may proceed back to block 1820 to continue monitoring the bandwidth performance. It should be noted that once the quality of a network connection or the combination of network connections goes over the required threshold, the reductions in the display monitors may be restored, the stopped video feeds may be resumed, the reductions in the data transfer rates may be restored, and/or the stopped data transfers may be resumed.

As described above, some embodiments may store metadata related to all transactions and metadata related to all configuration changes made to the system. The metadata records may be encoded and may be stored in public or private blockchain databases. Some embodiments may provide user interfaces for displaying the past and ongoing transactions as well as the past and current system configuration.

Figure 22:
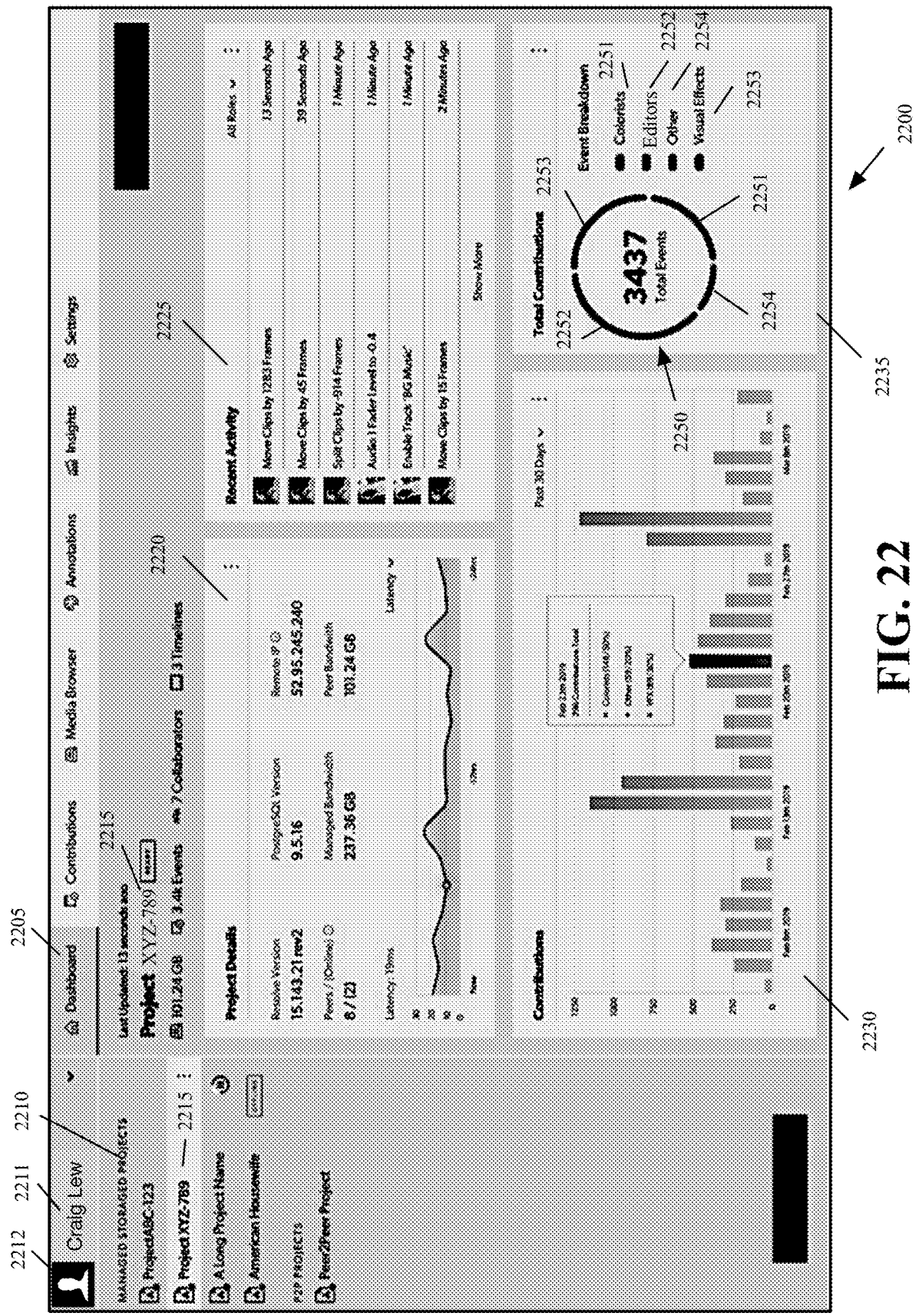
FIG. 22 is a schematic front view of an electronic device that displays an example user interface dashboard, according to various aspects of the present embodiments.

FIG. 22 is a schematic front view of an electronic device that displays an example user interface dashboard, according to various aspects of the present embodiments. The electronic device in the example of FIG. 22, and the following user interface examples, may be a gateway device or an electronic device described above.

With reference to FIG. 22, the option 2205 to show a dashboard may currently be selected. The user interface 2200 may show the name 2211 and a picture 2212 of the person who is accessing the user interface 2200. The user interface 2200 may show a list 2210 of managed storage projects. As shown, a project 2215 may be selected and the metadata related to the project may be displayed. The metadata related to the project may have been encrypted and stored in one or more blockchain databases. The metadata may be retrieved from the blockchain database(s) and may be decrypted and displayed on the user interface 2200.

The user interface 2200, in the example of FIG. 22, may display the event history of the project 2215. For example, the user interface 2200 may display the project details 2220, the recent activities 2225, the number of contribution 2230 that are made to the project over a time period, the total number of contributions 2235, etc. The project activities may include, for example, and without limitations, video streaming, data transfer, video editing, image and document exchange, messaging (e.g. text message, email, chat), etc.

The contributions to a project may include, for example, and without limitations, data and category driven activities. Depending on the type of project, the percent of contributions 2250 from persons with different types of duties may be identified in the user interface 2200. In the example of FIG. 22, the contributor's duties may include colorists 2251, editors 2252, visual effect artists 2253, or others 2254. The percent of contributions (visually shown as different sized segments of the circle 2250) may provide an indication of the department(s) and/or the collaboration(s) that have contributed to the project 2215.

Figure 23:
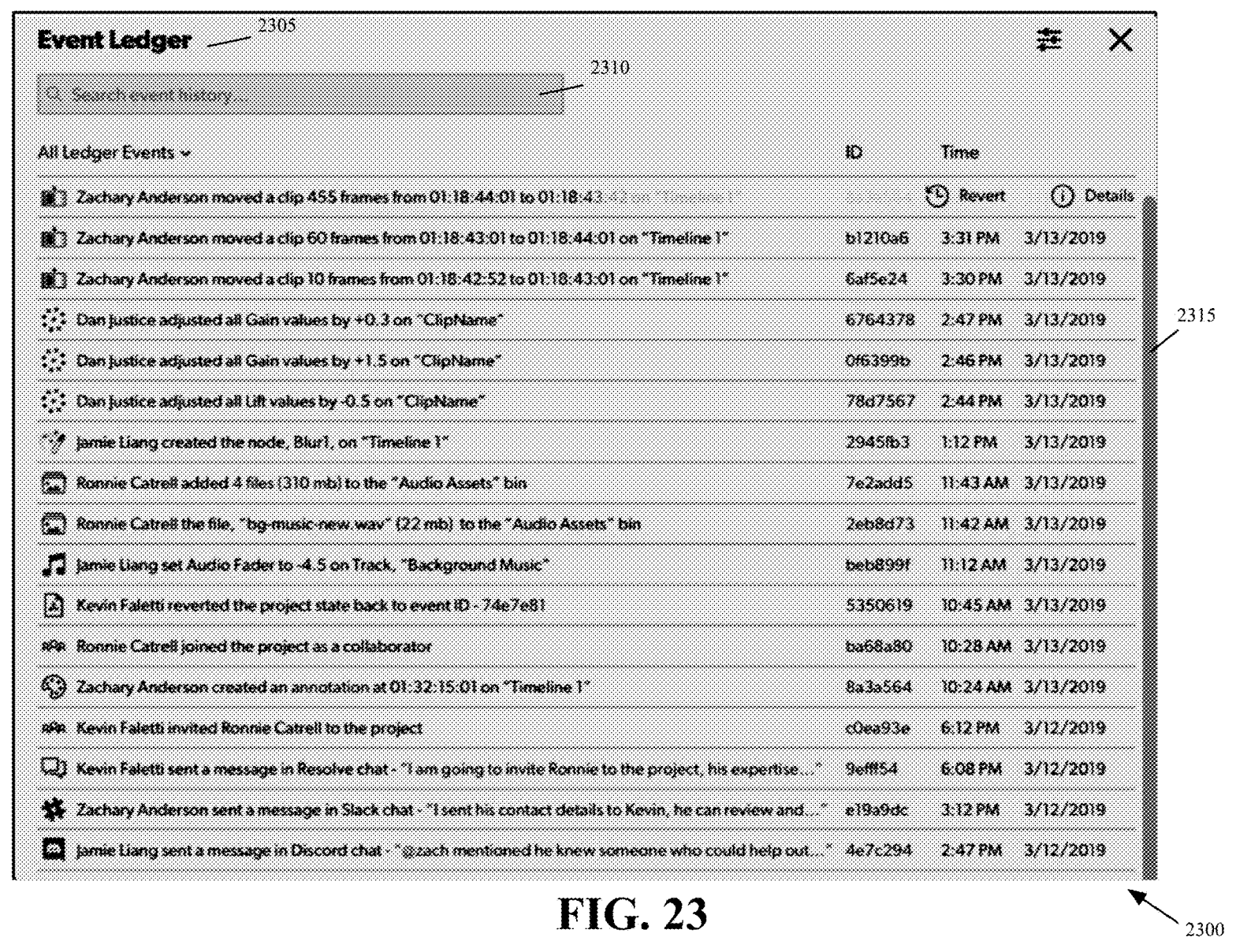

FIG. 23 is a schematic front view of an electronic device that displays a portion of an example user interface showing of a portion of a project's event history, according to various aspects of the present embodiments. With reference to FIG. 23, the user interface 2300 may display a portion of the event ledger 2305 of a project. The scrolling tool 2315 may be used to show additional event history.

The user interface 2300 may display the detailed log of all activities for a project, which may be retrieved from a secure and persistent database, such as a blockchain database. The detailed list of transactions shown by the user interface 2300 may be used, for example, and without limitations, to make sure if a transaction such as video or data transfer was completed. The event ledger 2305 may show the start and/or the end of each event, the name of the persons and/or entities participated in each event, the type of activities performed in each event, etc. The search option 2310 may allow searching for different events using one or more search keywords.

Figure 24:
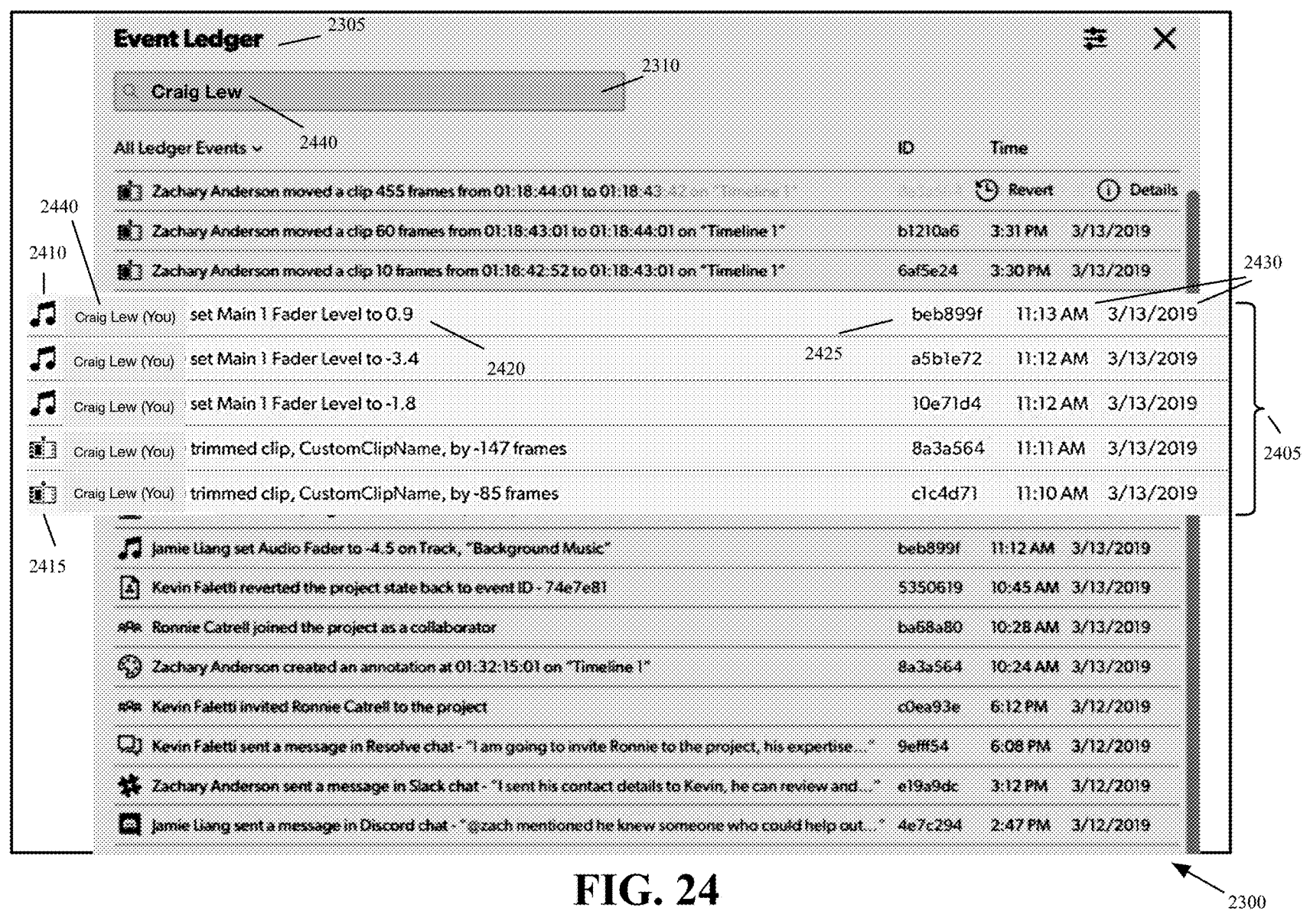

FIG. 24 is a schematic front view of an electronic device that displays a portion of the user interface of FIG. 23 after a person searches the event ledger using one or more search criteria, according to various aspects of the present embodiments. With reference to FIG. 24, a search criteria, such as, a particular person's name 2440, may have been entered in the search area 2310.

As shown, the search results 2405 may show the details of the activities performed by the particular person 2440. The details may include the file types (in this example an audio file 2410 or a video file 2415), the description of each activity 2420, the activity's identification 2425 (e.g., a file name, an event identifier, etc.), the time and date stamps 2430 of each activity, etc.

The persistent storage of the metadata related to the events and/or the persistent storage of the actual content related to the events may allow reverting a project back to a previous state. For example, a file may be transferred to a destination and may subsequently be deleted, changed, corrupted, misplaced, etc. The persistent storage of the present embodiments may allow searching for events and reverting back a project to a specific event.

Figure 25:
FIG. 25 is a schematic front view of an electronic device that displays a portion of the user interface of FIG. 23 showing a project being reverted to a previous state, according to various aspects of the present embodiments.

FIG. 25 is a schematic front view of an electronic device that displays a portion of the user interface of FIG. 23 showing a project being reverted to a previous state, according to various aspects of the present embodiments. With reference to FIG. 25, the event ledger 2305 may include a log for an event 2510. The event 2510 may show that the project has been reverted to a particular event 2515. The time and date 2520 of the reversion may also be displayed. Other details of the reversion may also be available for review by selecting the option 2525.

As an example, the event ledger 2305 may be used for troubleshooting and/or as an analytic tool when a file never gets to a destination or is otherwise deleted, changed, or misplaced at the destination. The event ledger 2305 may be used to search for the events related to the file and go back to a particular event and reinitiate the event to restore the file.

As another example, a person such as an editor or an effects artist, may have edited and changed a file several times. The person may revert back to a previous version of the file when a persistent storage of the events related to the file and the contents of the file corresponding to each event are permanently stored.

Figure 26:
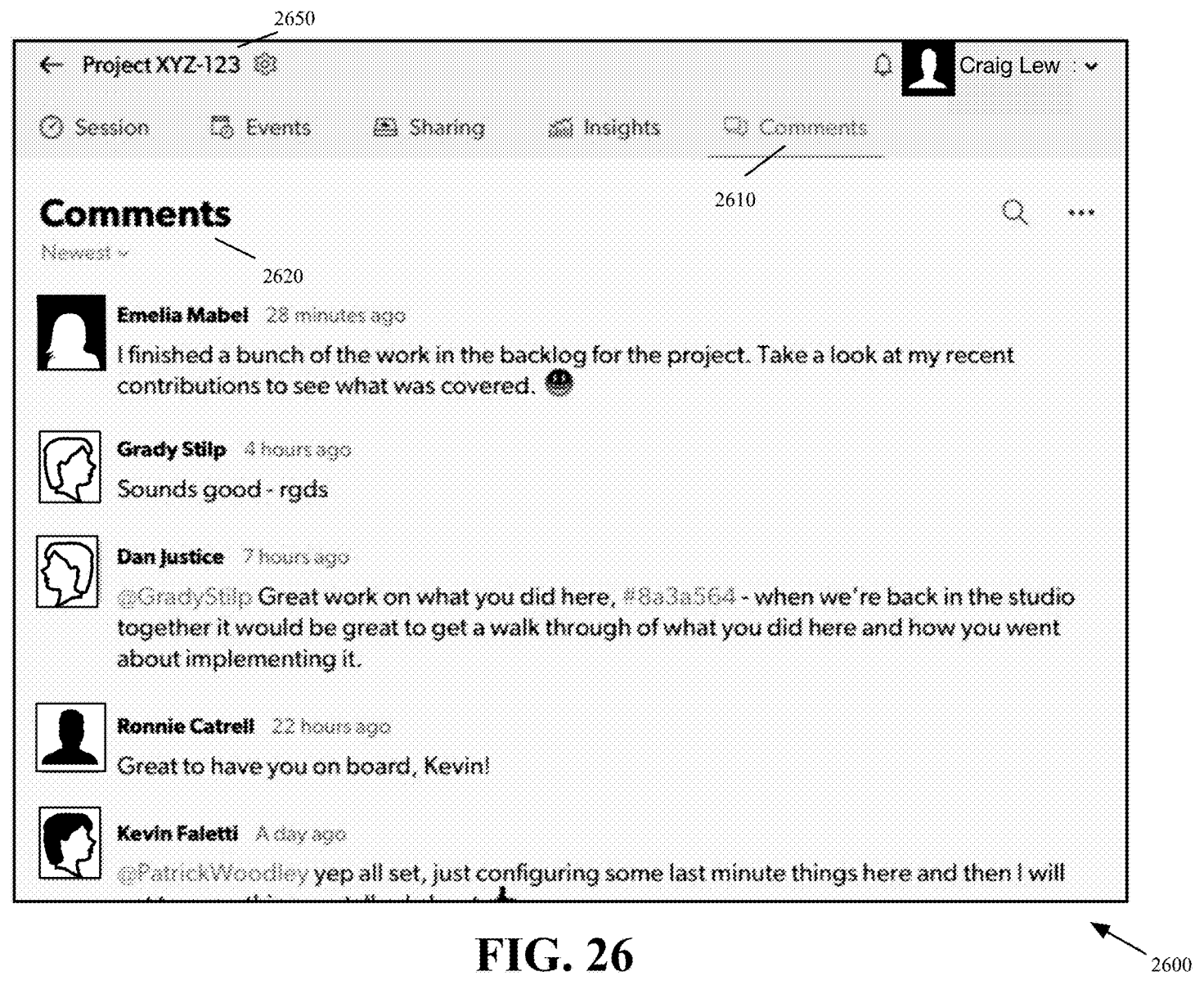

The persistent storage of the event may show the threads associated to a specific transaction or project. FIG. 26 is a schematic front view of an electronic device that displays a portion of the user interface showing comments exchanged during the course of a project, according to various aspects of the present embodiments. With reference to FIG. 26, the comments option 2610 may be selected.

The user interface 2600 may show a list 2620 of chats and comments that are exchanged during the course of a project 2650. The user interface 2600 may allow to quickly identify the persons involved in the project 2650 and their comments and/or their specific contributions.

In addition to the event history, some embodiments provide the status of the transactions that are in progress. FIG. 27 is a schematic front view of an electronic device that displays a portion of a user interface showing the progress of several transactions for a project, according to various aspects of the present embodiments. FIG. 3, described above, include a dashboard that may show the overall activity of the system. The user interface 2700 of FIG. 27 may show the progress of the current transactions for a particular project 2750.

As shown, the sharing option 2705 may be selected and the user interface 2700 may show that several files are currently being shared. The user interface 2700 may show the types 2710 of the files, the sizes 2715 of the files, the completion status 2720 of each transaction, the download speed 2725 of each transaction, and the upload speed 2730 of each transaction. The slider 2750 may be used to make tradeoffs between the latency 2761 versus the resolution, as described above with reference to FIGS. 16-17.

Many of the above-described features and applications may be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, random access memory (RAM), read-only-memory (ROM), read-only compact discs (CD-ROM), erasable programmable read-only memories (EPROMs), electrically erasable programmable read-only memories (EEPROMs), flash memory (e.g., secured digital (SD) cards, mini-SD cards, micro-SD cards, etc.), magnetic and/or solid state hard drives, ultra-density optical discs, any other optical or magnetic media, and floppy disks. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions may be implemented as sub-parts of a larger program while remaining distinct software inventions. In some embodiments, multiple software inventions may also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 28:
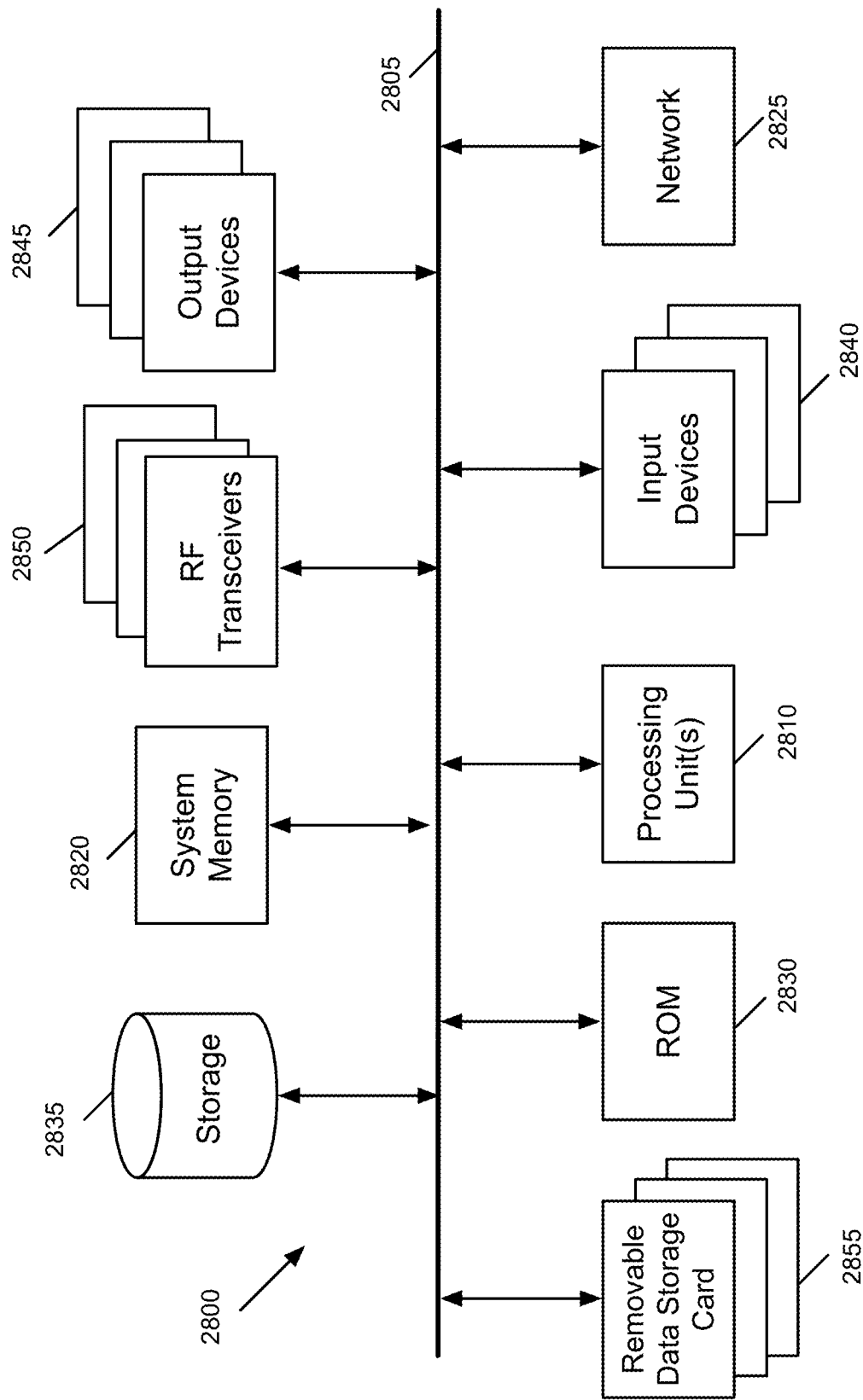
FIG. 28 is a functional block diagram illustrating an example electronic system, according to various aspects of the present disclosure.

FIG. 28 is a functional block diagram illustrating an example electronic system 2800, according to various aspects of the present disclosure. With reference to FIG. 28, some embodiments of the invention, such as for example, and without limitations, the gateway devices, the electronic devices, the servers, etc., described above, may be implemented using the electronic system 2800. The electronic system 2800 may be used to execute any of the processes, methods, controls, or operating system applications described above. The electronic system 2800 may be a computer (e.g., a desktop computer, personal computer, tablet computer, server computer, mainframe, a blade computer etc.), a phone (e.g., a smartphone), a personal digital assistant (PDA), or any other sort of electronic device. Such an electronic system may include various types of computer readable media and interfaces for various other types of computer readable media. The electronic system 2800 may include a bus 2805, processing unit(s) 2810, a system memory 2820, a read-only memory (ROM) 2830, a permanent storage device 2835, input devices 2840, output devices 2845, one or more RF transceivers 2850, and one or more removable data storage cards 2855.

The bus 2805 may collectively represent all system, peripheral, and chipset buses that communicatively connect the numerous internal devices of the electronic system 2800. For example, the bus 2805 may communicatively connect the processing unit(s) 2810 with the read-only memory 2830, the system memory 2820, and the permanent storage device 2835.

From these various memory units, the processing unit(s) 2810 may retrieve instructions to execute and data to process in order to execute the processes of the invention. The processing unit(s) may be a single processor or a multi-core processor in different embodiments.

The read-only-memory 2830 may store static data and instructions that are needed by the processing unit(s) 2810 and other modules of the electronic system. The permanent storage device 2835, on the other hand, may be a read-and-write memory device. This device is a non-volatile memory unit that may store instructions and data even when the electronic system 2800 is off. Some embodiments of the invention may use a mass-storage device (such as a magnetic or optical disk and its corresponding disk drive) as the permanent storage device 2835.

Other embodiments may use a removable storage device (such as a floppy disk, flash drive, etc.) as the permanent storage device. Like the permanent storage device 2835, the system memory 2820 may be a read-and-write memory device. However, unlike storage device 2835, the system memory may be a volatile read-and-write memory, such as random access memory. The system memory may store some of the instructions and data that the processor needs at runtime. In some embodiments, the invention's processes may be stored in the system memory 2820, the permanent storage device 2835, and/or the read-only memory 2830.

From these various memory units, the processing unit(s) 2810 may retrieve instructions to execute and data to process in order to execute the processes of some embodiments.

The bus 2805 may also connect to the input and output devices 2840 and 2845. The input devices may enable the user to communicate information and select commands to the electronic system. The input devices 2840 may include alphanumeric keyboards and pointing devices (also called "cursor control devices"). The output devices 2845 may display images generated by the electronic system. The output devices may include printers and display devices, such as cathode ray tubes (CRT) or liquid crystal displays (LCD). Some embodiments may include devices such as a touchscreen that function as both input and output devices.

Finally, as shown in FIG. 28, the bus 2805 may also couple the electronic system 2800 to a network 2825 through a network adapter (not shown). In this manner, the computer may be a part of a network of computers (such as a local area network ("LAN"), a wide area network ("WAN"), an Intranet, or a network of networks, such as the Internet. Any or all components of the electronic system 2800 may be used in conjunction with the invention.

Some embodiments may include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments may be performed by one or more integrated circuits, such as application specific integrated circuits (ASICs) or field programmable gate arrays (FPGAs). In some embodiments, such integrated circuits may execute instructions that are stored on the circuit itself. Some of the present embodiments may include flexible circuit, also rereferred to as flexible printed circuit boards (PCBs). The flexible circuits may provide dynamic flexing and increased heat dissipation and may be used in the embodiments that require circuits with smaller footprint, increased package density, more tolerance to vibrations, and/or less weight.

As used in this specification, the terms "computer," "server," "processor," and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

In a first aspect, a gateway device is provided. The gateway device comprises a plurality of radio frequency (RF) transceivers. Each RF transceiver is for providing a network connection between the gateway device and a corresponding wireless communication network in a plurality of wireless communication networks. The gateway device comprises a processor for receiving raw video being recorded by a video camera connected to the gateway device, receiving an identification of a set of one or more destination devices to receive a livestream video from the gateway device, determining a quality of the network connections between the gateway device and the plurality of wireless communication networks, the quality of a network connection comprising at least one of a communication speed and a communication error rate of the network connection, selecting a wireless communication network with a highest quality network connection for communicating with the set of destination devices, encoding the raw video into a compressed video stream, and livestreaming the compressed video stream to the set of destinations devices through the RF transceiver corresponding to the selected wireless communication network.

In an embodiment of the first aspect, the processor is for encrypting the compressed video stream prior to the livestreaming of the compressed video stream.

An embodiment of the first aspect further comprises a display, and the processor is for displaying, on the display of the gateway device, a timestamped status of a start of the livestreaming, and displaying, on the display of the gateway device, a timestamped status of an end of the livestreaming.

Another embodiment of the first aspect further comprises a display, and the processor is for receiving a signal when the video camera is connected to or removed from the gateway device, and displaying, on the display of the gateway device, a timestamped status of the video camera connected to or removed from the gateway device.

Another embodiment of the first aspect further comprises a display, and the processor is for displaying, on the display of the gateway device, a timestamped status when a successful network connection is established between the gateway device and the selected wireless communication network, and displaying, on the display of the gateway device, a timestamped status of a signal quality of the network connection when the signal quality drops below a threshold.

In another embodiment of the first aspect, the processor is for creating a record comprising one or more of the identifications of the set of destination devices, a starting time of the livestreaming, an ending time of the livestreaming, and a completion status of the livestreaming, and transmitting the record to one or more blockchain databases to provide a verifiable record of the livestreaming.

In another embodiment of the first aspect, the processor is for receiving one or more signals when the video camera is connected to or removed from the gateway device, creating a timestamped status of the video camera being connected to or removed from the gateway device, and transmitting the record to one or more blockchain databases to provide a verifiable record of the connection and removal of the video camera.

In another embodiment of the first aspect, the selected wireless communication network is one of a cellular wireless communication network and a satellite communication network, where the plurality of RF transceivers comprises a short-range RF transceiver for communicating with a set of one or more electronic devices of a local area network (LAN), and the processor is for determining that the network connection to the selected wireless communication network has failed, establishing a wireless connection to a first electronic device in the set of electronic devices through the short-range RF transceiver, the first electronic device having a network connection to a second wireless communication network different than the selected wireless communication network, and transmitting the compressed video stream to the set of destination devices through the wireless connection established to the first electronic device and the network connection between first electronic device and the second wireless communication network.

In another embodiment of the first aspect, the selected wireless communication network is a cellular wireless communication network, where the plurality of RF transceivers comprises an RF transceiver for communicating with a satellite wireless communication network, and the processor is for determining that the network connection to the cellular wireless communication network has failed, establishing a wireless connection to the satellite wireless communication network through the RF transceiver for communicating with the satellite wireless communication network, and transmitting the compressed video stream to the set of destination devices through the satellite wireless communication network.

In another embodiment of the first aspect, the selected wireless communication network is a satellite wireless communication network, the plurality of RF transceivers comprises an RF transceiver for communicating with a cellular wireless communication network, and the processor is for determining that the network connection to the satellite wireless communication network has failed, establishing a wireless connection to the cellular wireless communication network through the RF transceiver for communicating with the cellular wireless communication network, and transmitting the compressed video stream to the set of destination devices through the cellular wireless communication network.

Another embodiment of the first aspect further comprises a plurality of subscriber identification module (SIM) cards. Each SIM card stores an identity of the gateway device for connecting the gateway device to a service provider's wireless communication network, and the processor is for determining that the quality of the network connection to the selected wireless communication network is below a threshold, where the selected wireless communication network is associated with a first SIM card of the gateway device, selecting a wireless communication network associated with a second SIM card of the gateway device, and simultaneously livestreaming the compressed video stream to a first subset of the set of destinations devices through the RF transceiver corresponding to the selected wireless communication network, and to a second subset of the set of destinations devices through the RF transceiver corresponding to the wireless communication network associated with a second SIM card of the gateway device.

In another embodiment of the first aspect, the selected wireless communication network comprises a plurality of network slices for multiplexing of independent logical networks on a same physical network. Each network slice has a weighted characteristic comprising weighting on one or more of a communication bandwidth, a latency, a reliability, a data security, and a quality of service (QoS), and the processor is for determining a network characteristic required for livestreaming the compressed video stream to the set of destination devices, selecting a network slice based on the determined network characteristic, and livestreaming the compressed video stream through the selected network slice to the set of destinations devices.

In another embodiment of the first aspect, the gateway device is wirelessly connected to an electronic device, and the processor is for receiving a set of signals from the electronic device to start or stop the livestreaming of the compressed video stream to one or more of the destinations devices, and starting or stopping the livestreaming of the compressed video stream to the one or more destinations devices based on the received set of signals.

Another embodiment of the first aspect further comprises a display, and the processor is for providing a user interface tool for adjusting a latency of the livestreaming of the compressed video stream versus a resolution of the compressed video stream, receiving a selection of the user interface tool, and adjusting the latency of the livestreaming of the compressed video stream versus the resolution of the compressed video stream based on the selection of the user interface tool.

In another embodiment of the first aspect, the gateway device is configured to a be part of a software-defined wide area network (SD-WAN), the SD-WAN comprises a plurality of communication paths, and the processor is for determining a network characteristic required for livestreaming the compressed video stream to the set of destination devices, selecting a SD-WAN path based on the determined network characteristic, and livestreaming the compressed video stream through the selected SD-WAN path to the set of destination devices.

In another embodiment of the first aspect, the destination devices comprise one or more of a storage device of a cloud storage service and a computing device.

Another embodiment of the first aspect further comprises a locking switch, and a plurality of communication ports, when the locking switch is in a locked position, the plurality of RF transceivers and the plurality of communication ports are locked in a fixed position, and when the locking switch is an unlocked position, the plurality of RF transceivers and the plurality of communication ports are removable, where removing an RF transceiver or a communication port creates an empty port slot for receiving an RF transceiver or a communication port.

In another embodiment of the first aspect, an empty slot of a removed communication port is for receiving a communication port or an RF transceiver, where an empty slot of a removed RF transceiver is for receiving a communication port, an RF transceiver of a same type as removed RF transceiver, or an RF transceiver of a different type as removed RF transceiver.

Another embodiment of the first aspect further comprises a plurality of communication ports, and a plurality of slots for inserting and removing the communication ports and the RF transceivers, where an empty slot of a removed communication port is for receiving a communication port or an RF transceiver, where an empty slot of a removed RF transceiver is for receiving a communication port, an RF transceiver of a same wireless communication network as the wireless communication network corresponding to the removed RF transceiver, or an RF transceiver of a different wireless communication network as the wireless communication network corresponding to the removed RF transceiver.

Another embodiment of the first aspect further comprises a display, and the processor is for receiving one or more signals when a communication port or an RF transceiver is removed, receiving one or more signals when a communication port or an RF transceiver is placed in an empty slot, displaying, on the display of the gateway device, a time stamped message indicating the removal of the communication port or the RF transceiver, and displaying, on the display of the gateway device, a time stamped message indicating the placement of the communication port or the RF transceiver in the empty slot.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A gateway device, comprising:
a plurality of radio frequency (RF) transceivers, each RF transceiver for providing a network connection between the gateway device and a corresponding wireless communication network in a plurality of wireless communication networks; and
a processor for:
receiving raw video being recorded by a video camera connected to the gateway device;
receiving an identification of a set of one or more destination devices to receive a livestream video from the gateway device;
determining a quality of the network connections between the gateway device and the plurality of wireless communication networks, the quality of a network connection comprising at least one of a communication speed and a communication error rate of the network connection;
selecting a wireless communication network, in the plurality of wireless communication networks, with a highest quality network connection for communicating with the set of destination devices, wherein the quality of the network connection between the gateway device and the selected network is above a threshold;
encoding the raw video into a compressed video stream; and
livestreaming the compressed video stream to the set of destinations devices through the RF transceiver corresponding to the selected wireless communication network.

2. The gateway device of claim 1, wherein the processor is for encrypting the compressed video stream prior to the livestreaming of the compressed video stream.

3. The gateway device of claim 1 further comprising a display, wherein the processor is for:
displaying, on the display of the gateway device, a timestamped status of a start of the livestreaming; and displaying, on the display of the gateway device, a timestamped status of an end of the livestreaming.

4. The gateway device of claim 1 further comprising a display, wherein the processor is for:
   receiving a signal indicating that the video camera is connected to or removed from the gateway device; and
   displaying, on the display of the gateway device, a timestamped status of the video camera connected to or removed from the gateway device.

5. The gateway device of claim 1 further comprising a display, wherein the processor is for:
   displaying, on the display of the gateway device, a timestamped status when in response to determining that a successful network connection is established between the gateway device and the selected wireless communication network; and
   displaying, on the display of the gateway device, a timestamped status of a signal quality of the network connection in response to determining that the signal quality drops below the threshold.

6. The gateway device of claim 1, wherein the processor is for:
   creating a record comprising one or more of the identifications of the set of destination devices, a starting time of the livestreaming, an ending time of the livestreaming, and a completion status of the livestreaming; and
   transmitting the record to one or more blockchain databases to provide a verifiable record of the livestreaming.

7. The gateway device of claim 1, wherein the processor is for:
   receiving one or more signals indicating that the video camera is connected to or removed from the gateway device;
   creating a record comprising a timestamped status of the video camera being connected to or removed from the gateway device; and
   transmitting the record to one or more blockchain databases to provide a verifiable record of the connection and removal of the video camera.

8. The gateway device of claim 1, wherein the selected wireless communication network is one of a cellular wireless communication network and a satellite communication network, wherein the plurality of RF transceivers comprises a short-range RF transceiver for communicating with a set of one or more electronic devices of a local area network (LAN), wherein the processor is for:
   determining that the network connection to the selected wireless communication network has failed;
   establishing a wireless connection to a first electronic device in the set of electronic devices through the short-range RF transceiver, the first electronic device having a network connection to a second wireless communication network different than the selected wireless communication network; and
   transmitting the compressed video stream to the set of destination devices through the wireless connection established to the first electronic device and the network connection between first electronic device and the second wireless communication network.

9. The gateway device of claim 1, wherein the selected wireless communication network is a cellular wireless communication network, wherein the plurality of RF transceivers comprises an RF transceiver for communicating with a satellite wireless communication network, wherein the processor is for:
   determining that the network connection to the cellular wireless communication network has failed;
   establishing a wireless connection to the satellite wireless communication network through the RF transceiver for communicating with the satellite wireless communication network; and
   transmitting the compressed video stream to the set of destination devices through the satellite wireless communication network.

10. The gateway device of claim 1, wherein the selected wireless communication network is a satellite wireless communication network, wherein the plurality of RF transceivers comprises an RF transceiver for communicating with a cellular wireless communication network, wherein the processor is for:
    determining that the network connection to the satellite wireless communication network has failed;
    establishing a wireless connection to the cellular wireless communication network through the RF transceiver for communicating with the cellular wireless communication network; and
    transmitting the compressed video stream to the set of destination devices through the cellular wireless communication network.

11. The gateway device of claim 1 further comprising:
    a plurality of subscriber identification module (SIM) cards, each SIM card storing an identity of the gateway device for connecting the gateway device to a service provider's wireless communication network, wherein the processor is for:
       determining that the quality of the network connection to the selected wireless communication network is below the threshold, wherein the selected wireless communication network is associated with a first SIM card of the gateway device;
       selecting a wireless communication network associated with a second SIM card of the gateway device; and
       simultaneously livestreaming the compressed video stream to a first subset of the set of destinations devices through the RF transceiver corresponding to the selected wireless communication network, and to a second subset of the set of destinations devices through the RF transceiver corresponding to the wireless communication network associated with the second SIM card of the gateway device.

12. The gateway device of claim 1, wherein the selected wireless communication network comprises a plurality of network slices for multiplexing of independent logical networks on a same physical network, each network slice having a weighted characteristic comprising weighting on one or more of a communication bandwidth, a latency, a reliability, a data security, and a quality of service (QOS), wherein the processor is for:
    determining a network characteristic required for livestreaming the compressed video stream to the set of destination devices;
    selecting a network slice based on the determined network characteristic; and
    livestreaming the compressed video stream through the selected network slice to the set of destinations devices.

13. The gateway device of claim 1, wherein the gateway device is wirelessly connected to an electronic device, wherein the processor is for:
    receiving a set of signals from the electronic device to start or stop the livestreaming of the compressed video stream to one or more of the destinations devices; and starting or stopping the livestreaming of the compressed video stream to the one or more destinations devices based on the received set of signals.

14. The gateway device of claim 1 further comprising a display, wherein the processor is for:
providing a user interface tool for adjusting a latency of the livestreaming of the compressed video stream versus a resolution of the compressed video stream;
receiving a selection of the user interface tool; and
adjusting the latency of the livestreaming of the compressed video stream versus the resolution of the compressed video stream based on the selection of the user interface tool.

15. The gateway device of claim 1, wherein the gateway device is configured to a be part of a software-defined wide area network (SD-WAN), the SD-WAN comprising a plurality of communication paths, wherein the processor is for:
determining a network characteristic required for livestreaming the compressed video stream to the set of destination devices;
selecting a SD-WAN path based on the determined network characteristic; and
livestreaming the compressed video stream through the selected SD-WAN path to the set of destination devices.

16. The gateway device of claim 1, wherein the set of destination devices comprises one or more of a storage device of a cloud storage service and a computing device.

17. The gateway device of claim 1 further comprising:
a locking switch; and
a plurality of communication ports;
wherein after the locking switch is in a locked position, the plurality of RF transceivers and the plurality of communication ports are locked in a fixed position; and
wherein after the locking switch is an unlocked position, the plurality of RF transceivers and the plurality of communication ports are removable, wherein removing an RF transceiver or a communication port creates an empty port slot for receiving an RF transceiver or a communication port.

18. The gateway device of claim 17, wherein an empty slot of a removed communication port is for receiving a communication port or an RF transceiver, wherein an empty slot of a removed RF transceiver is for receiving a communication port, an RF transceiver of a same type as the removed RF transceiver, or an RF transceiver of a different type as the removed RF transceiver.

19. The gateway device of claim 1 further comprising:
a plurality of communication ports; and
a plurality of slots for inserting and removing the communication ports and the RF transceivers;
wherein an empty slot of a removed communication port is for receiving a communication port or an RF transceiver, and wherein an empty slot of a removed RF transceiver is for receiving a communication port, an RF transceiver of a same wireless communication network as the wireless communication network corresponding to the removed RF transceiver, or an RF transceiver of a different wireless communication network as the wireless communication network corresponding to the removed RF transceiver.

20. The gateway device of claim 19 further comprising a display, wherein the processor is for:
receiving one or more signals indicating that a communication port or an RF transceiver is removed;
receiving one or more signals indicating that a communication port or an RF transceiver is placed in an empty slot;
displaying, on the display of the gateway device, a time stamped message indicating the removal of the communication port or the RF transceiver; and
displaying, on the display of the gateway device, a time stamped message indicating the placement of the communication port or the RF transceiver in the empty slot.

21. The gateway device of claim 1, wherein the selected wireless communication network is a first wireless communication network, wherein the processor is for:
determining that the quality of the network connection between the gateway device and the first network is below the threshold;
in response to the determining that the quality of the network connection between the gateway device and the first wireless communication network is below the threshold, selecting a second wireless communication network, in the plurality of wireless communication networks, with a highest quality network connection for communicating with the set of destination devices, wherein the quality of the network connection between the gateway device and the second wireless communication network is above the threshold.

* * * * *